US008600712B1

(12) United States Patent
Harvey

(10) Patent No.: US 8,600,712 B1
(45) Date of Patent: Dec. 3, 2013

(54) SYSTEM AND METHOD FOR DESIGNING AND SIMULATING A FIREWORKS SHOW

(76) Inventor: William Harvey, Palo Alto, CA (US)

( * ) Notice: Subject to any disclaimer, the term of this patent is extended or adjusted under 35 U.S.C. 154(b) by 641 days.

(21) Appl. No.: 12/844,767

(22) Filed: Jul. 27, 2010

(51) Int. Cl.
*G06G 7/48* (2006.01)
*G06F 17/00* (2006.01)
*G09G 5/00* (2006.01)

(52) U.S. Cl.
USPC .................... 703/6; 463/2; 345/632; 345/633

(58) Field of Classification Search
USPC .............................. 703/6; 463/2; 345/632, 633
See application file for complete search history.

(56) References Cited

U.S. PATENT DOCUMENTS

| | | | |
|---|---|---|---|
| 5,339,741 A | 8/1994 | Craven et al. | |
| 5,659,793 A * | 8/1997 | Escobar et al. | 715/202 |
| 6,393,990 B1 | 5/2002 | Fagan | |
| 6,646,642 B1 * | 11/2003 | Fukui et al. | 345/473 |
| 6,683,613 B1 * | 1/2004 | Herbstman et al. | 345/475 |
| 6,686,919 B1 * | 2/2004 | Kanetaka et al. | 345/473 |
| 6,724,385 B2 * | 4/2004 | Takatsuka et al. | 345/427 |
| 6,778,948 B1 * | 8/2004 | Kanetaka et al. | 703/22 |
| 8,382,589 B2 * | 2/2013 | Koo | 463/35 |
| 2008/0155478 A1 | 6/2008 | Stross | 715/849 |
| 2009/0048814 A1 * | 2/2009 | Lee et al. | 703/5 |
| 2010/0004770 A1 * | 1/2010 | Rameau et al. | 700/98 |
| 2011/0010191 A1 * | 1/2011 | Deluz | 705/2 |
| 2011/0165939 A1 * | 7/2011 | Borst et al. | 463/29 |
| 2012/0249557 A1 * | 10/2012 | Ferguson et al. | 345/473 |
| 2012/0271603 A1 * | 10/2012 | Lee et al. | 703/6 |

FOREIGN PATENT DOCUMENTS

EP          1014309       6/2000

OTHER PUBLICATIONS

Manual pmfcsim User Manual USPTO certified English translation combined documents, pp. 1-84, Date Oct. 18, 2006.*
FINALE_Fireworks_Firework_Customization, pp. 1-21, Dec. 1, 2009.*
FINALE_Fireworks_Firework_Customization Dating page, p. 1 of 1, Mar. 16, 2013.*
Original Spanish User Manual PMFC Simualtion word document converted to PDF, Oct. 18, 2006 pp. 1-24.*
Original Spanish User Manual PMFC word document converted to PDF, Oct. 18, 2006 pp. 1-51 (Net pages).*

* cited by examiner

*Primary Examiner* — Akash Saxena
(74) *Attorney, Agent, or Firm* — Inventive Patent Law P.C.; Jim H. Salter

(57) ABSTRACT

A system and method for enabling computer users to design and simulate a fireworks show is disclosed. A particular embodiment includes storing firework data in a database, the firework data including firework specification data including parameters corresponding to attributes of a particular firework; using a processor to automatically construct in a user interface a visual firework simulation from the firework data, the visual firework simulation including visual elements that are also part of the user interface, the visual firework simulation depicting a sky field representing a location of a fireworks show and the spatial location of visual elements therein, the visual elements including fireworks, launch positions, and trajectories being simulated by the visual firework using the user interface to directly manipulate the visual elements of the visual firework simulation, including dragging the visual elements in the sky field of the visual firework simulation: using the processor to automatically adjust the firework data according to the user's direct manipulation of the visual elements; and using the processor to automatically update the visual firework simulation and the visual elements in real time in response to the user's direct manipulation of the visual elements and the adjustment of the firework data.

26 Claims, 53 Drawing Sheets

| Break Time | Launch Time | Pre-Fire | Rail | Cue | Position | Product Number | Req Shell Description | Size |
|---|---|---|---|---|---|---|---|---|
| 01:06.0 | 01:05.3 | 0.2 | 1 | 2 | Front 1 | APC29 | 1 100 Shot Z Shape Crackling Mine w/ Variegated Tails To Ti Salutes | 100 Shot |
| 01:05.5 | 01:05.3 | 0.2 | 3 | 2 | Front 2 | APC29 | 1 100 Shot Z Shape Crackling Mine w/ Variegated Tails To Ti Salutes | 100 Shot |
| 01:05.5 | 01:05.3 | 0.2 | 5 | 2 | Front 3 | APC29 | 1 100 Shot Z Shape Crackling Mine w/ Variegated Tails To Ti Salutes | 100 Shot |
| 01:05.5 | 01:05.3 | 0.2 | 7 | 2 | Front 4 | APC29 | 1 100 Shot Z Shape Crackling Mine w/ Variegated Tails To Ti Salutes | 100 Shot |
| 01:05.5 | 01:05.3 | 0.2 | 9 | 2 | Front 5 | APC29 | 1 100 Shot Z Shape Crackling Mine w/ Variegated Tails To Ti Salutes | 100 Shot |
| 01:08.7 | 01:03.7 | 5 | 16 | 18 | LEFT 8 | AMD4450 | 1 Super Brocade to Electric Yellow w/ Big Lemon Pistil | 8 inch |
| 01:08.7 | 01:03.7 | 5 | 31 | 18 | RIGHT 8 | AMD4450 | 1 Super Brocade to Electric Yellow w/ Big Lemon Pistil | 8 inch |
| 01:16.0 | 01:12.2 | 3.8 | 11 | 29 | LEFT 5 | APS27 | 2 Red Peony w/ Brocade Crown Waterfall Pistil w/ Rising Glitter Tail | 5 inch |
| 01:16.0 | 01:12.2 | 3.8 | 22 | 30 | MIDDLE 5 | APS27 | 2 Red Peony w/ Brocade Crown Waterfall Pistil w/ Rising Glitter Tail | 5 inch |
| 01:16.0 | 01:12.2 | 3.8 | 26 | 29 | RIGHT 5 | APS27 | 2 Red Peony w/ Brocade Crown Waterfall Pistil w/ Rising Glitter Tail | 5 inch |
| 01:22.0 | 01:18.2 | 3.8 | 11 | 17 | LEFT 5 | APS11 | 2 Silver Strobe | 5 inch |
| 01:22.0 | 01:18.2 | 3.8 | 22 | 21 | MIDDLE 5 | APS11 | 2 Silver Strobe | 5 inch |
| 01:22.0 | 01:18.2 | 3.8 | 26 | 17 | RIGHT 5 | APS11 | 2 Silver Strobe | 5 inch |
| 01:28.0 | 01:24.2 | 3.8 | 12 | 8 | LEFT 5 | APS52 | 2 Blue Peony w/ Brocade Pistil | 5 inch |
| 01:28.0 | 01:24.2 | 3.8 | 23 | 9 | MIDDLE 5 | APS52 | 2 Blue Peony w/ Brocade Pistil | 5 inch |
| 01:28.0 | 01:24.2 | 3.8 | 27 | 8 | RIGHT 5 | APS52 | 2 Blue Peony w/ Brocade Pistil | 5 inch |
| 01:34.0 | 01:30.2 | 3.8 | 11 | 30 | LEFT 5 | APS27 | 2 Red Peony w/ Brocade Crown Waterfall Pistil w/ Rising Glitter Tail | 5 inch |
| 01:34.0 | 01:30.2 | 3.8 | 22 | 31 | MIDDLE 5 | APS27 | 2 Red Peony w/ Brocade Crown Waterfall Pistil w/ Rising Glitter Tail | 5 inch |
| 01:34.0 | 01:30.2 | 3.8 | 26 | 30 | RIGHT 5 | APS27 | 2 Red Peony w/ Brocade Crown Waterfall Pistil w/ Rising Glitter Tail | 5 inch |
| 01:40.0 | 01:36.2 | 3.8 | 11 | 18 | LEFT 5 | APS11 | 2 Silver Strobe | 5 inch |
| 01:40.0 | 01:36.2 | 3.8 | 22 | 22 | MIDDLE 5 | APS11 | 2 Silver Strobe | 5 inch |
| 01:40.0 | 01:36.2 | 3.8 | 26 | 18 | RIGHT 5 | APS11 | 2 Silver Strobe | 5 inch |
| 01:46.0 | 01:42.2 | 3.8 | 12 | 9 | LEFT 5 | APS52 | 2 Blue Peony w/ Brocade Pistil | 5 inch |
| 01:46.0 | 01:42.2 | 3.8 | 23 | 10 | MIDDLE 5 | APS52 | 2 Blue Peony w/ Brocade Pistil | 5 inch |
| 01:46.0 | 01:42.2 | 3.8 | 27 | 9 | RIGHT 5 | APS52 | 2 Blue Peony w/ Brocade Pistil | 5 inch |
| 01:52.0 | 01:49.0 | 3 | 4 | 2 | Front 2 | APF41 | 3 Chain of 10: Ti Salute w/ Rising Whistle | 3 inch |
| 01:52.0 | 01:49.0 | 3 | 8 | 2 | Front 4 | APF41 | 3 Chain of 10: Ti Salute w/ Rising Whistle | 3 inch |
| 01:53.0 | 01:49.6 | 3.4 | 19 | 5 | MIDDLE 4 | APF15 | 3 Chain of 8: Silver Strobe w/ Silver Tail | 4 inch |
| 01:54.0 | 01:50.2 | 3.8 | 11 | 12 | LEFT 5 | APF25 | 1 Chain of 6: Silver Strobe w/ Silver Tail | 5 inch |
| 01:54.0 | 01:50.2 | 3.8 | 26 | 12 | RIGHT 5 | APF25 | 1 Chain of 6: Silver Strobe w/ Silver Tail | 5 inch |
| 01:55.0 | 01:50.8 | 4.2 | 14 | 29 | LEFT 6 | APS20 | 3 Silver Strobe | 6 inch |
| 01:55.0 | 01:50.8 | 4.2 | 24 | 26 | MIDDLE 6 | APS20 | 3 Silver Strobe | 6 inch |

Figure 46

SYSTEM AND METHOD FOR DESIGNING AND SIMULATING A FIREWORKS SHOW

TECHNICAL FIELD

This patent application relates to computer-implemented simulation systems, according to one embodiment, and more specifically to using a computer system for designing and simulating a fireworks show.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2009-2010 Finale Fireworks, All Rights Reserved.

BACKGROUND

Fireworks shows have become very popular at holiday events, entertainment venues, or other outdoor gatherings. These fireworks shows involve the launching of a sequence of fireworks in various patterns, angles, heights, and timings to produce an optimal visual experience for an audience. Sometimes, the fireworks show is synchronized to a sound track. In some cases, manual launch boards are used to launch and detonate a series of fireworks in a desired sequence at a desired pace. In more sophisticated systems, computerized launching systems are used to enable computer control of the launch sequence. In either case, it is beneficial to be able to generate and simulate a fireworks show in a software system prior to the launch of any actual fireworks. The software fireworks simulator allows a designer to choreograph a fireworks show in various ways. However, currently available fireworks show simulators are difficult to operate because the user interface and editing operations are decoupled from the visual simulation.

BRIEF DESCRIPTION OF THE DRAWINGS

The various embodiments is illustrated by way of example, and not by way of limitation, in the figures of the accompanying drawings in which:

FIG. 46 illustrates an example embodiment of a portion of a firework show data set or spreadsheet;

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

In the various embodiments described herein, a system and method for enabling computer users to design and simulate a fireworks show is disclosed. In various embodiments, a software application program is used to enable the development of a fireworks show and to simulate the effects of the fireworks show on the display screen of a computer system.

Figure 1:
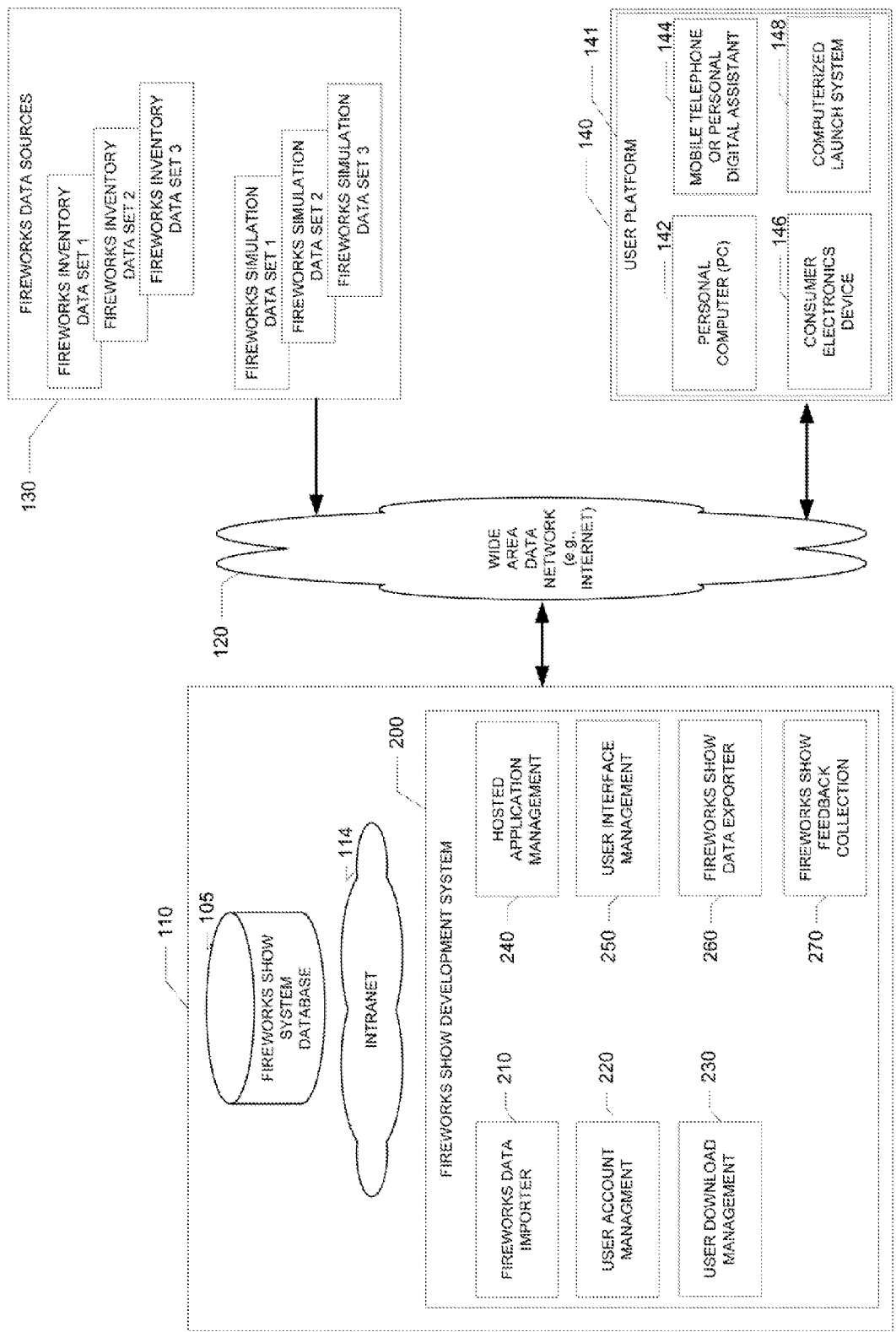
FIG. 1 illustrates an example embodiment of a system for enabling computer users to design and simulate a fireworks show in an example embodiment.

Referring now to FIG. 1, in an example embodiment, a system for enabling computer users to design and simulate a fireworks show is disclosed. In various example embodiments, an application or service, typically provided by or operating on a host site (e.g., a website) 110, is provided to simplify and facilitate the downloading or hosted use of the fireworks show development system 200 of an example embodiment. In a particular embodiment, the fireworks show development system 200 can be downloaded from the host site 110 by a user at a user platform 140. Alternatively, the fireworks show development system 200 can be hosted by the host site 110 for a networked user at a user platform 140.

Referring again to FIG. 1, the fireworks show development system 200 can be in network communication with a plurality of fireworks data sources 130. The fireworks data sources 130 can include firework simulation data sources, such as a firework manufacturer that creates firework simulations and uploads the data corresponding to these firework simulations (firework simulation data set) to the host site 110. In an example embodiment, the following command selections can be used to upload and save a selected firework simulation data set: ("Inventory>Save selected firework to My Fireworks"). The fireworks data sources 130 can also include sources of firework inventory data sets, which include firework specifications for particular brands or types of specific fireworks. The firework inventory data sets might be provided by a firework manufacturer or display operator who uploads a spreadsheet of firework inventory data to the host site 110. The spreadsheet of firework inventory data can include a set of parameters associated with various attributes of each specific type of firework. In a particular embodiment, uploading a spreadsheet of firework inventory data can cause the fireworks show development system 200 on the host site 110 to automatically construct simulations for the uploaded firework specifications based on all the information the fireworks show development system 200 has in its database 105. The data of database 105 is detailed below. If the fireworks show development system 200 is able to find a previously developed specially-made simulation created by, for example, the firework manufacturer by matching the firework product identifier (ID) in the inventory spreadsheet to a product ID uploaded along with the simulation by the manufacturer, then the manufacturer simulation can be associated with the particular firework product and used by the fireworks show development system 200 to simulate the firework product. If the fireworks show development system 200 cannot find any such matches of previously developed firework simulations, the fireworks show development system 200 can automatically construct a firework simulation based on the firework specifications, which can include the name of the firework, and perhaps a set of parameters associated with various attributes of the specific type of firework. The fireworks show development system 200 can use this information to create a decent simulation for the particular type of firework, e.g., "Gold Palm to White Strobe" or "Gold Willow with Glitter". In some cases, the automatically constructed simulations can be good enough to enable a user to design a fireworks show. Additionally, the user can modify a previously developed simulation or an automatically constructed simulation to improve the accuracy of the simulation. Once the user uploads modified simulations to host site 110, then the next time the user uploads a firework inventory that contains that particular firework, such as the user might do for another show that uses a different set of fireworks that includes some but not all previously used fireworks, then the fireworks show development system 200 can subsequently use the modified simulation and thereby provide better results for the firework inventory upload as time goes on.

One or more of the fireworks data sources 130 can be provided by one or more third party providers operating at various locations in a network ecosystem. It will be apparent to those of ordinary skill in the art that fireworks data sources 130 can be any of a variety of networked third party providers as described in more detail below. In a particular embodiment, a source list maintained at the host site 110 can be used as a summary or list of all fireworks data sources 130 which users or the host site 110 may visit/access and from which users or the host site 110 can obtain fireworks data. The host site 110, fireworks data sources 130, and user platforms 140 may communicate and transfer data and information in the data network ecosystem shown in FIG. 1 via a wide area data network (e.g., the Internet) 120. Various components of the host site 110 can also communicate internally via a conventional intranet or local area network (LAN) 114.

Networks 120 and 114 are configured to couple one computing device with another computing device. Networks 120 and 114 may be enabled to employ any form of computer readable media for communicating information from one electronic device to another. Network 120 can include the Internet in addition to LAN 114, wide area networks (WANs), direct connections, such as through a universal serial bus (USB) port, other forms of computer-readable media, or any combination thereof. On an interconnected set of LANs, including those based on differing architectures and protocols, a router and/or gateway device acts as a link between LANs, enabling messages to be sent between computing devices. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communication links known to those of ordinary skill in the art. Furthermore, remote computers and other related electronic devices can be remotely connected to either LANs or WANs via a modem and temporary telephone link.

Networks 120 and 114 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Networks 120 and 114 may also include an autonomous system of terminals, gateways, routers, and the like connected by wireless radio links or wireless transceivers. These connectors may be configured to move freely and randomly and organize themselves arbitrarily, such that the topology of networks 120 and 114 may change rapidly and arbitrarily.

Networks 120 and 114 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, 4G, and future access networks may enable wide area coverage for mobile devices, such as one or more of client devices 141, with various degrees of mobility. For example, networks 120 and 114 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Networks 120 and 114 may also be constructed for use with various other wired and wireless communication protocols, including TCP/IP, UDP, SIP, SMS, RTP, WAP, CDMA, TDMA, EDGE, UMTS, GPRS, GSM, UWB, WiMax, IEEE 802.11x, and the like. In essence, networks 120 and 114 may include virtually any wired and/or wireless communication mechanisms by which information may travel between one computing device and another computing device, network, and the like. In one embodiment, network 114 may represent a LAN that is configured behind a firewall (not shown), within a business data center, for example.

The fireworks data sources 130 may include any of a variety of providers of network transportable digital data. The network transportable digital data can be transported in any of a family of file formats and associated mechanisms usable to enable a host site 110 and a user platform 140 to receive data from a fireworks data source 130 over a network 120. In one embodiment, the file format can be a MICROSOFT Excel spreadsheet format or a CSV (Comma Separated Values) format; however, the various embodiments are not so limited, and other file formats and transport protocols may be used. For example, data formats other than Excel or CSV or formats other than open/standard formats can be supported by various embodiments. Any electronic file format, such as Microsoft Access Database Format (MDB), Portable Document Format (PDF), audio (e.g., Motion Picture Experts Group Audio Layer 3—MP3, and the like), video (e.g., MP4, and the like), and any proprietary interchange format defined by specific sites can be supported by the various embodiments described herein. Moreover, a fireworks data source 130 may provide more than one fireworks data set.

In a particular embodiment, a user platform 140 with one or more client devices 141 enables a user to access data and simulations from the fireworks show development system 200 via the host 110 and network 120. Client devices 141 may include virtually any computing device that is configured to send and receive information over a network, such as network 120. Such client devices 141 may include portable devices 144, such as, cellular telephones, smart phones, display pagers, radio frequency (RF) devices, infrared (IR) devices, global positioning devices (GPS), Personal Digital Assistants (PDAs), handheld computers, wearable computers, tablet computers, integrated devices combining one or more of the preceding devices, and the like. Client devices 141 may also include other computing devices, such as personal computers 142, multiprocessor systems, microprocessor-based or programmable consumer electronics, network PC's, and the like. Client devices 141 may also include other processing devices, such as consumer electronic (CE) devices 146 and/or computerized firework launching systems 148, which are known to those of ordinary skill in the art. As such, client devices 141 may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and/or send digital information.

Client devices 141 may also include at least one client application that is configured to receive simulation data or/or control data from another computing device via a wired or wireless network transmission. The client application may include a capability to provide and receive textual data, graphical data, video data, audio data, and the like. Moreover, client devices 141 may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like.

Referring still to FIG. 1, host site 110 of an example embodiment is shown to include a fireworks show development system 200, intranet 114, and fireworks show system database 105. Fireworks show development system 200 includes fireworks data importer 210, user account management module 220, user download management module 230, hosted application management module 240, user interface management module 250, fireworks show data exporter module 260, and fireworks feedback collection module 270. Each of these modules can be implemented as software components executing within an executable environment of fireworks show development system 200 operating on host site 110. Each of these modules of an example embodiment is described in more detail below in connection with the figures provided herein.

Figure 2:
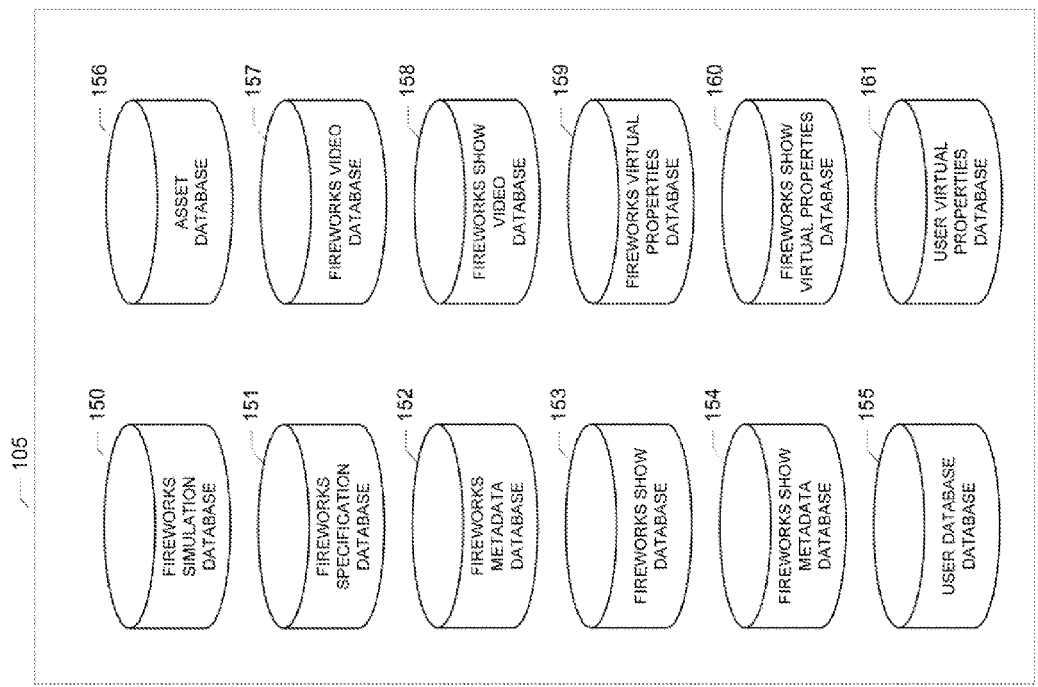
FIG. 2 illustrates a detail of the databases used in an example embodiment.

Referring now to FIG. 2, the components of database 105 are illustrated for an example embodiment. Each of these database 105 components is described in detail below.

Fireworks Simulation Database 150—A user can save a simulation of an individual firework to the host site 110, so other users can browse and download the saved firework simulation. In an example embodiment, the following command sequence can be used to save a firework simulation: (menu items: "Inventory>Save selected firework to My Fireworks" and "Inventory>Browse/Add fireworks"). These firework simulations, which are collections of simulation parameters and simulation programs, can be automatically created by the fireworks show development system 200 from firework specification data, or they can be created by the user by editing simulation parameters through a graphical user interface. For example, the simulation parameters might include the color of the stars or the length of the trails of sparks that result from a firework's detonation in the sky. The firework simulations can be stored in Fireworks Simulation Database 150. Additionally, firework manufacturers, like DOMINATOR FIREWORKS, have already spent a lot of time creating simulations of their real-world fireworks. These already-created firework simulations can be uploaded to the fireworks show development system 200 from the firework data sources 130. These uploaded simulations and the simulations automatically created by the fireworks show development system 200 can be stored in Fireworks Simulation Database 150.

Fireworks Specification Database 151—Making simulations one by one for all of an inventory of thousands of firework varieties can be tedious work for display operators, who may use fireworks from a variety of manufactures and may even use some custom fireworks that they make themselves. Many users prefer to upload a spreadsheet of fireworks specification data for their inventory of fireworks, and to have the fireworks show development system 200 automatically create simulations according to the fireworks specification data in the database 151. Firework display operators like accurate visual simulations, but often don't have the time to create the simulations; so, uploading their firework inventory spreadsheet data is good enough if the fireworks show development system 200 can construct simulations that match the critical firework specifications (e.g., pre-fire time for shells, the number of shots (tubes) in a cake, the overall time duration of the firework, and the like). For example, a 36 shot, 25 second cake shoots 36 small shells in 25 seconds total. The overall time duration for this type of cake is a critical firework specification parameter. When a display operator uploads a firework inventory spreadsheet to host site 110, the fireworks show development system 200 can store the firework inventory data into database 151. The fireworks show development system 200 can then use the uploaded firework inventory data to automatically construct a related firework simulation. The data for the constructed simulation can be stored in the database 150. If an operator doesn't like the constructed simulation, the operator can modify the simulation and upload the modified simulation to the fireworks show development system 200. The uploaded modified simulation is stored in the database 150. The fireworks show development system 200 can then use this uploaded modified simulation to do a better job of constructing a simulation for a firework with the same firework specification in the future, for this operator, who might upload a firework inventory spreadsheet again for another show, or an entirely different operator.

Fireworks Metadata Database 152—This database can be used for storage of reviews, comments, digital rights information, etc., for the firework simulations stored in database 150.

Fireworks Show Database 153—This database can be used for storage of firework show data and portions of firework shows that users have created and saved to the host site 110, which other users can access, subject to access privileges. In a particular embodiment, users in a workgroup are able to share firework shows over the network privately within the workgroup, for example.

Fireworks Show Metadata Database 154—This database can be used for storage of reviews, comments, digital rights information, etc., for the firework shows stored in database 153.

User Database 155—This database can be used for storage of user account information, user profiles, user privileges, etc.

Asset Database 156—This database can be used for storage of uploaded music, sound effects, and images that can be used in fireworks and fireworks shows, subject to rights management.

Fireworks Video Database 157—This database can be used for storage of videos of fireworks simulations, which are hosted by host site 110 for people to see on the web.

Fireworks Show Video Database 158—This database can be used for storage of videos of shows, which are hosted by host site 110 for people to see. There is already a large library of shows at, www.finalefireworks.com/shows.

In addition to the databases (150 through 158) described above, a particular embodiment includes three additional databases of virtual information that can be used for a game version of the fireworks simulation system. These additional databases include the following: Fireworks Virtual Properties Database 159, Fireworks Show Virtual Properties Database 160, and User Virtual Properties Database 161. These additional databases are described in more detail below.

Fireworks Virtual Properties Database 159—This database can be used for storage of virtual firework information, such as the virtual price or availability of a firework for a game.

Fireworks Show Virtual Properties Database 160—This database can be used for storage of virtual firework show information, such as the virtual popularity of a firework show for the game.

User Virtual Properties Database 161—This database can be used for storage of virtual user information, such as the user's virtual money, user reputation, score, etc.

Referring again to FIG. 1, the fireworks show development system 200 can include a fireworks data importer 210. The fireworks data importer 210 receives uploaded fireworks specification data sets and fireworks inventory data sets from the data sources 130 and stores the received data in the appropriate portion of database 105, such as Fireworks Simulation Database 150 and Fireworks Specification Database 151.

Figure 3:
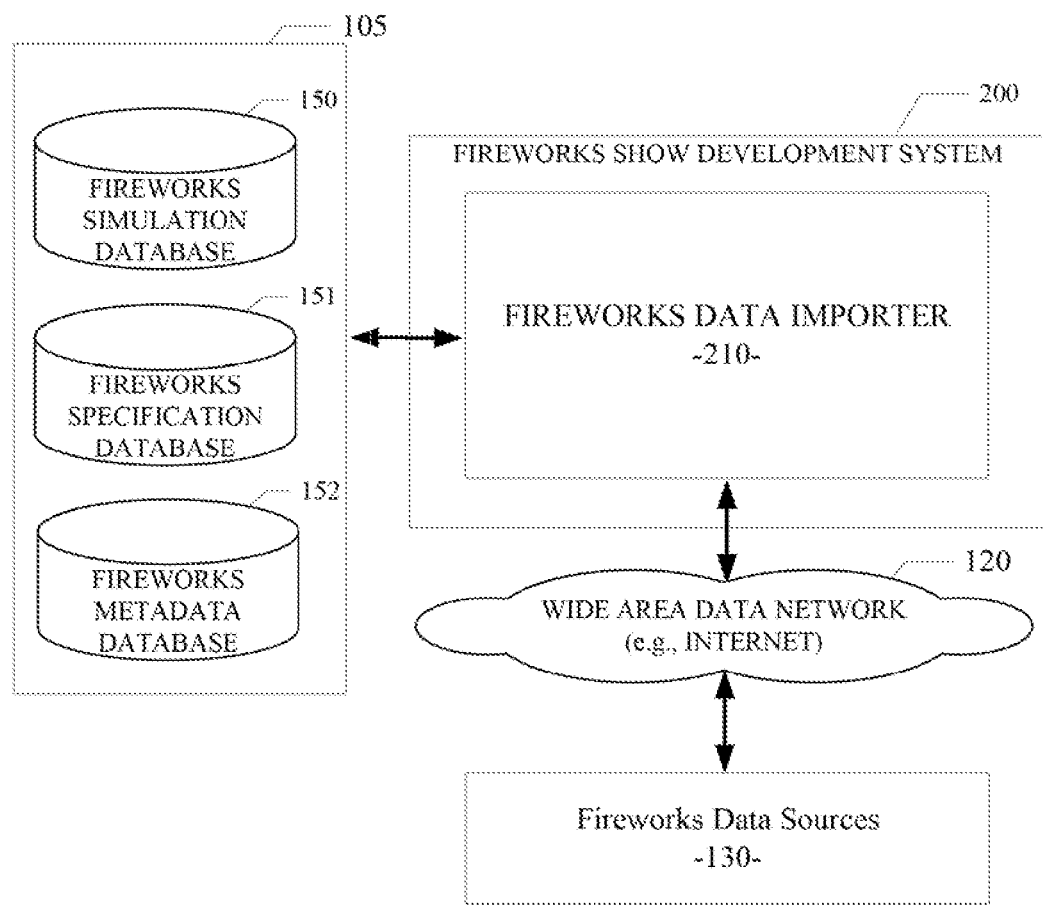
FIG. 3 illustrates a detail of the fireworks data importer of an example embodiment.

Referring now to FIG. 3, a detail of the fireworks data importer 210 in an example embodiment is illustrated. As shown, fireworks data importer 210 is in data communication via network 120 with a plurality of fireworks data sources 130, one or more portions of database 105, and the other processing modules of the fireworks show development system 200 (not shown in FIG. 3). In general, the fireworks data importer 210 is responsible for collecting and processing fireworks data items (e.g., fireworks simulations and fireworks inventory specifications) received from a variety of fireworks data sources 130. In a particular embodiment, these fireworks data sources 130 can include individual or aggregated data sources as described above. Aggregated data sources can represent any of a variety of conventional sites or services that pull or receive fireworks data items from various sources and collect the fireworks data items in a local collector. The local collector of a fireworks data source 130 may then provide these fireworks data items to host site 110 via the wide area data network 120.

Fireworks data importer 210 can be configured to interface with any of the fireworks data sources 130 via wide area data network 120. Because of the variety of fireworks data sources 130 providing data to fireworks data importer 210, the fireworks data importer 210 needs to manage the interface to the various fireworks data sources 130. This data source interface or data management process performed by fireworks data importer 210 can include retaining meta information on each data item, document, or object received from a fireworks data source 130. This retained meta information can include an identifier or address of the corresponding data item, document, or object received from a fireworks data source 130, an identifier or address of the corresponding fireworks data source 130, the timing or versioning associated with the data item, document, or object, including the time when the latest update of an item was received, and the like. This meta information related to the data items, documents, or objects received from fireworks data sources 130 can be stored in database 152.

The data management process performed by fireworks data importer 210 can also include performing any transcoding, decompression, decryption, formatting, and/or the like that may be necessary to process and/or simulate a particular data item received from a fireworks data source 130 via host site 110. The data management process performed by fireworks data importer 210 can also include the fetching, staging, and processing of particular fireworks data items as users of fireworks data sources 130 use the fireworks data importer 210 as described herein.

In one embodiment, a fireworks show data exporter module 260 and a fireworks feedback collection module 270 is provided. The fireworks show data exporter module 260 handles the exporting of fireworks data and firework show data to external systems, including networked systems. The fireworks show data exporter module 260 can also control the export of scripts, spreadsheets, and other data sets created or modified by the fireworks show development system 200 of an example embodiment. The fireworks feedback collection module 270 can collect information from $3^{rd}$ party users, the collected information including rating information, comments, customer feedback, and the like that indicate the extent to which particular viewers liked or disliked a particular fireworks show. The collected feedback can be correlated to the particular fireworks show to which the feedback relates.

Figure 4:
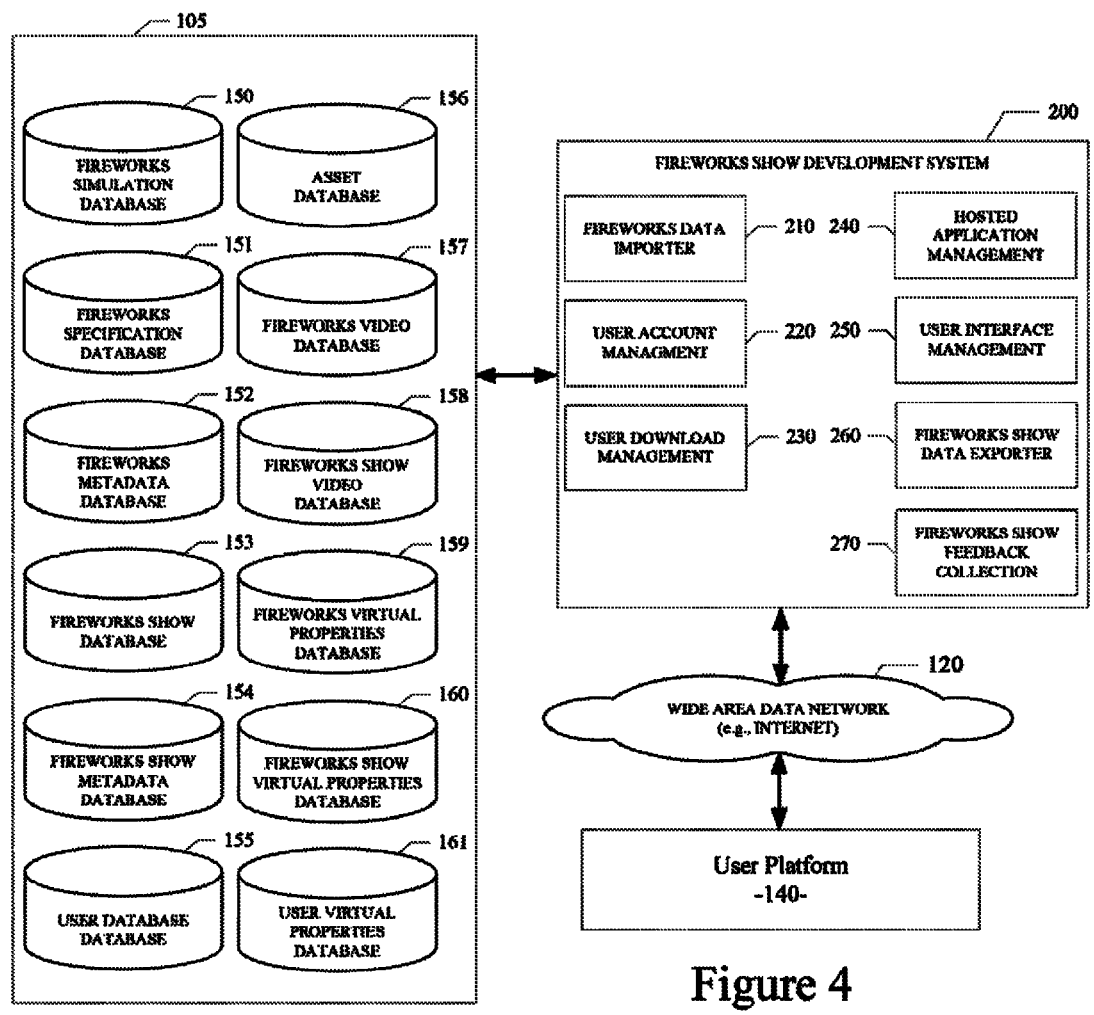
FIG. 4 illustrates a detail of the fireworks show development system of an example embodiment from a user perspective.

Referring now to FIG. 4, a detail of the fireworks show development system 200 of an example embodiment from a user perspective is illustrated. As described above, the fireworks show development system 200 can be downloaded to a user device 141 of user platform 140 or executed on host system 110. The fireworks show development system 200 may communicate and transfer data and information in the network ecosystem via a wide area data network (e.g., the Internet) 120. In this manner, the fireworks show development system 200 may communicate and transfer data and information with a user of a user device 141 of user platform 140. In general, the user can interact with the fireworks show development system 200 via a graphical user interface (GUI) implemented in an example embodiment as a set of webpages described in more detail below.

The fireworks show development system 200 of an example embodiment provides a user account management module 220. The user account management module 220 provides the functionality and interfaces for a user to register with the host site 110 and create, modify, and manage a user account and related user information data sets. As part of the creation of a user information data set, a user can assign a unique identifier (also denoted a user identifier or user ID) to the user information data set. Alternatively, the user account management module 220 can automatically create and assign the user ID to the user information data set. In one embodiment, the user ID can be a unique eight digit number. In an alternative embodiment, the user ID can be an alphanumeric string of arbitrary length, which can be used to uniquely identify a particular user information data set and corresponding user. The user information data sets can be stored in user database 155.

Once the user ID is created using any of the embodiments described above, the user ID can be used by a user to access and configure user-specific information in a user information data set retained on host site 110 in a conventional manner. In a particular embodiment, a user profile can be created and maintained in user database 155. Additionally, other user data for particular users can be maintained by user account management module 220. This other user data can include a user history, a user rating, and the like. It will be apparent to those of ordinary skill in the art that other user information may similarly be configured and retained in user data 155 by the user account management module 220. Thus, for various embodiments, a user can register with the host site 110 and use host site 110, and the user account management module 220 therein, to create and maintain a user information data set and a corresponding unique user ID.

Referring again to FIG. 4, the fireworks show development system 200 of an example embodiment is shown to include a user download management module 230 and a hosted application management module 240. As one option, the fireworks show development system 200, or a portion thereof, can be downloaded to a user device 141 of user platform 140 and executed locally on a user device 141. The downloading of the fireworks show development system 200 application can be accomplished using conventional software downloading functionality. As a second option, the fireworks show development system 200 can be hosted by the host site 110 and executed remotely, from the user's perspective, on host system 110. In one embodiment, the fireworks show development system 200 can be implemented as a service in a service oriented architecture. In any case, the functionality performed by the fireworks show development system 200 is as described herein, whether the application is executed locally or remotely.

Referring again to FIG. 4, the fireworks show development system 200 of an example embodiment is shown to include a user interface management module 250. The user interface management module 250 handles the presentation of various user interface displays, display screen, windows, frames, or the like. In an alternative embodiment, the user interface can be implemented as a series of web pages. These various user interface displays are provided to present information and firework simulation images to a user of the fireworks show development system 200 of an example embodiment. The user interface management module 250 also receives user inputs and configures the various user interface displays in conformity with the user inputs, command selections, and the like.

Although the various user interface displays provided by the user interface management module 250 are nearly infinitely varied, several sample user interface sequences are provided herein and in the corresponding figures to describe various features of the disclosed embodiments.

User Interface in an Example Embodiment for Editing Fireworks on a Timeline—

Figure 5:
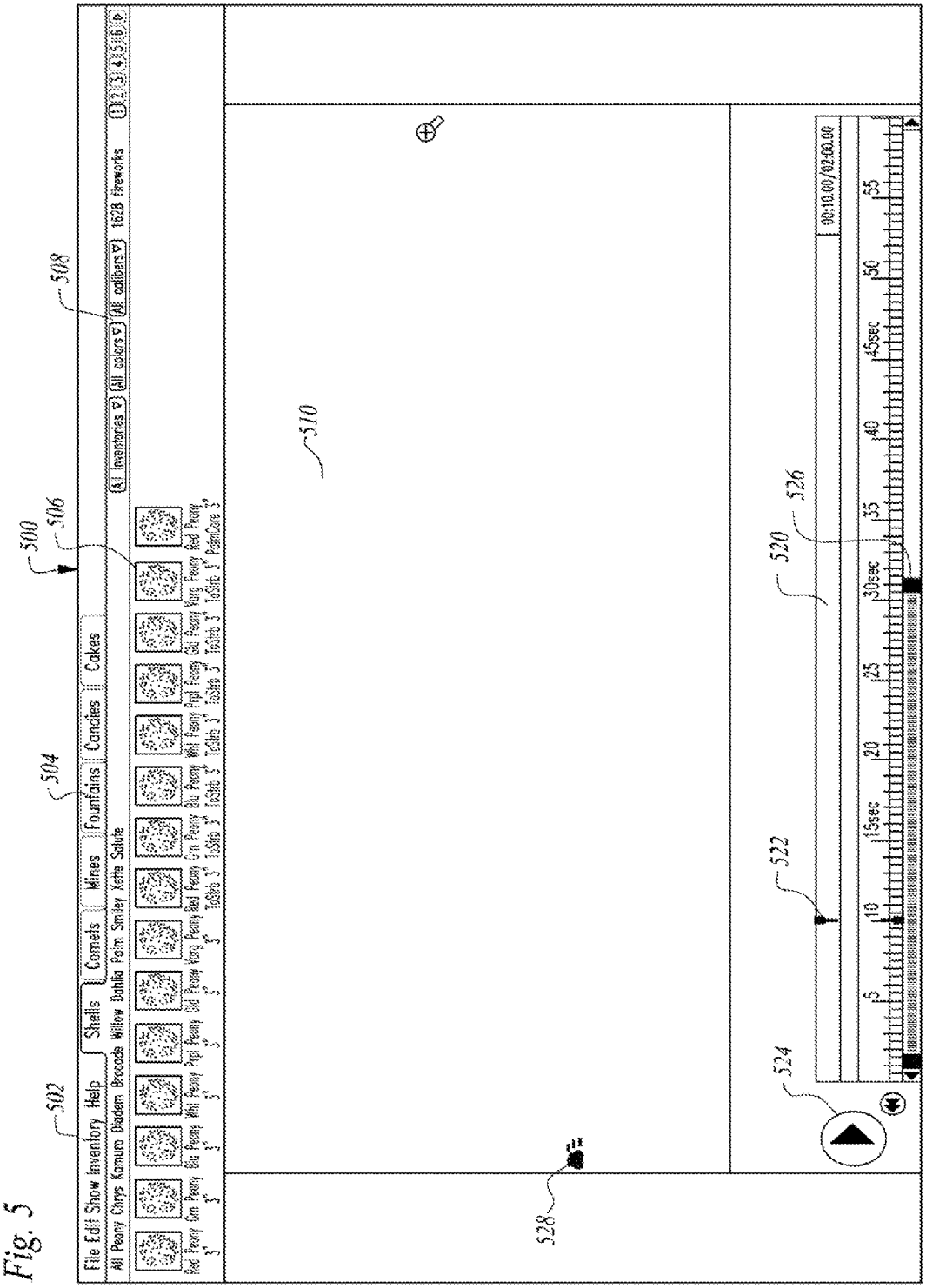
FIGS. 5-9, 9A, 9B, and 9C illustrate example user interface screen snapshots of example embodiments.

Referring now to FIGS. 5-45, several sample user interface screen snapshots and sequences are illustrated. These sample user interface sequences illustrate various features, structures, and operations of various example embodiments. Referring to FIG. 5, for each these sample user interface sequences, a user interface screen 500 or display image is presented. The user interface 500 includes a set of command options 502, a selection of firework category tabs 504, a selection or graphical inventory of individual drag/drop firework types 506 within a particular firework category, and a set of selectable firework attribute filters to constrain the selection of individual drag/drop firework types 506 to a desired subset having the selected attributes (e.g., particular inventory or firework manufacturer, firework color, firework shell caliber, and the like).

Figure 6:
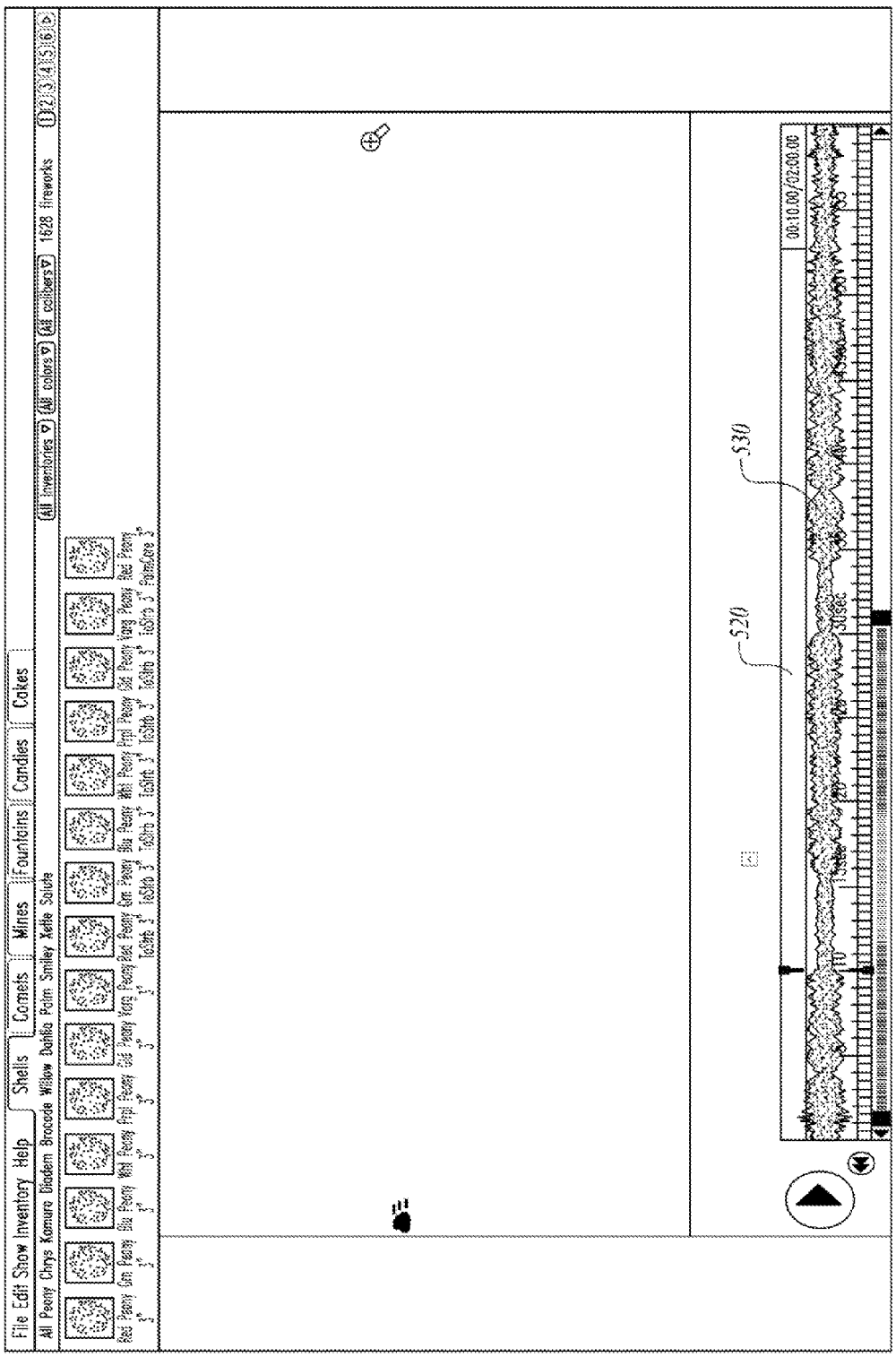

Additionally, as shown in the example of FIG. 5, the sample user interface screen 500 includes a selectable background image 510, a timeline 520, a playhead or current timeline marker (CTM) 522, and a play/pause button 524. Because fireworks shows can go on for a period of time, sometimes thirty minutes or even an hour, the designer of a fireworks show, who is using visual simulation software, needs to be able to navigate backward and forward in time to see what the show looks like at different times. For this reason, the visual simulation software of an example embodiment provides a timeline 520 and a playhead or CTM 522 that indicates the specific time on the timeline that is being displayed visually over the background image 510 portion of the user interface screen 500. As shown in FIG. 6, timeline 520 can also display a waveform 530 of a sound track extending from the beginning of the show to the end of the show, so the designer can align the playhead 522 with points in the music that are recognizable in the waveform 530. Sometimes, the designer may want to align fireworks with beats of the music, for example.

Conventional software programs for designing and simulating fireworks shows have drawn "cue markers" on a timeline at specific times and allowed users to associate with each cue marker the fireworks that are to be ignited or viewed at that point in time. With this conventional feature, a designer can see a visual representation of the ignition points (launch times) or break points (times of visual impact, such as the detonation of a shell in the sky) in the show as a series of cue markers, typically drawn as vertical lines overlaying the waveform on a horizontal, scrolling panel that covers the duration of the show. The user can see a textual list of fireworks attached to each cue marker in a spreadsheet-like table in a separate user interface panel. However, there are serious problems with this conventional representation. For example: (1) the designer cannot see at a glance how many fireworks are ignited at each cue marker and thus has no idea what the density of effects in the show is; (2) the designer cannot see the durations of individual fireworks on the timeline, and thus cannot tell when a firework is ignited or how long it lasts (typically the cue marker indicates the firework's point of visual impact (the "break"), rather than the point of ignition or launch time); (3) if the firework has multiple breaks, such as cakes or candles that emit multiple shells in a sequence, the designer cannot tell when those breaks occur; (4) the designer cannot select fireworks individually based on their position in the timeline, nor can the designer see at a glance the time positions of the selected fireworks; and (5) the designer cannot directly manipulate the timing of fireworks in the visual representation of the show's time based information. The various embodiments described herein solve these problems by providing a visual representation or image of the individual fireworks' durations and break points on the timeline 520, thereby enabling the user to select and manipulate these visual representations directly on the timeline 520.

Figure 7:
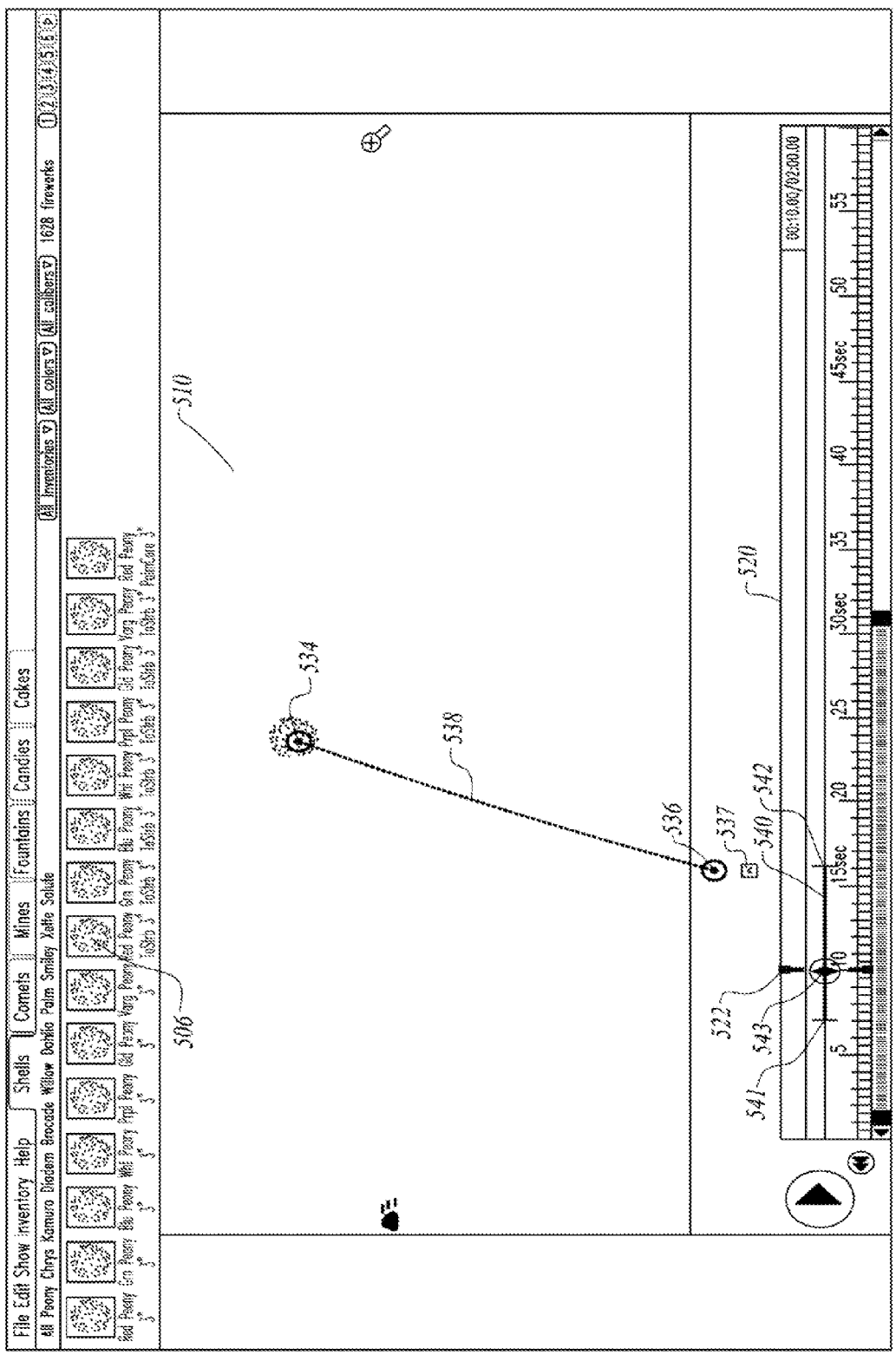

Referring now to FIG. 7, the sample user interface screen illustrates the result after a user has selected a particular firework type from the graphical inventory of individual drag/drop firework types 506 and dragged a graphical icon representing the selected firework type to a location over the background image 510 (denoted herein as the "sky field" user interface (UI) element or region). In a particular embodiment, the location to which the graphical icon of the selected firework type is dragged represents the location 534 of the firework's break location, which corresponds to a particular height and angle orientation relative to a launch position 536 for the selected firework. A break image or graphical display object is used to visually display the break location corresponding to the firework. In a particular embodiment, the selected firework snaps to a default or pre-configured launch location of the user's choosing. Once the user drags the graphical icon of the selected firework type to the desired location 534, a graphical display object (e.g., a circle) is displayed at the launch position 536, a graphical display object (e.g., a colored burst pattern) is displayed at the firework's break location 534, and a graphical representation of the firework's flight trajectory 538 is displayed between the launch position 536 and break location 534. As described in more detail below, the trajectory is automatically adjusted for the selectable wind condition. In this manner, a user can employ a graphical drag and drop operation to add a collection of fireworks for a particular firework show using the user interface features described herein.

Figure 8:
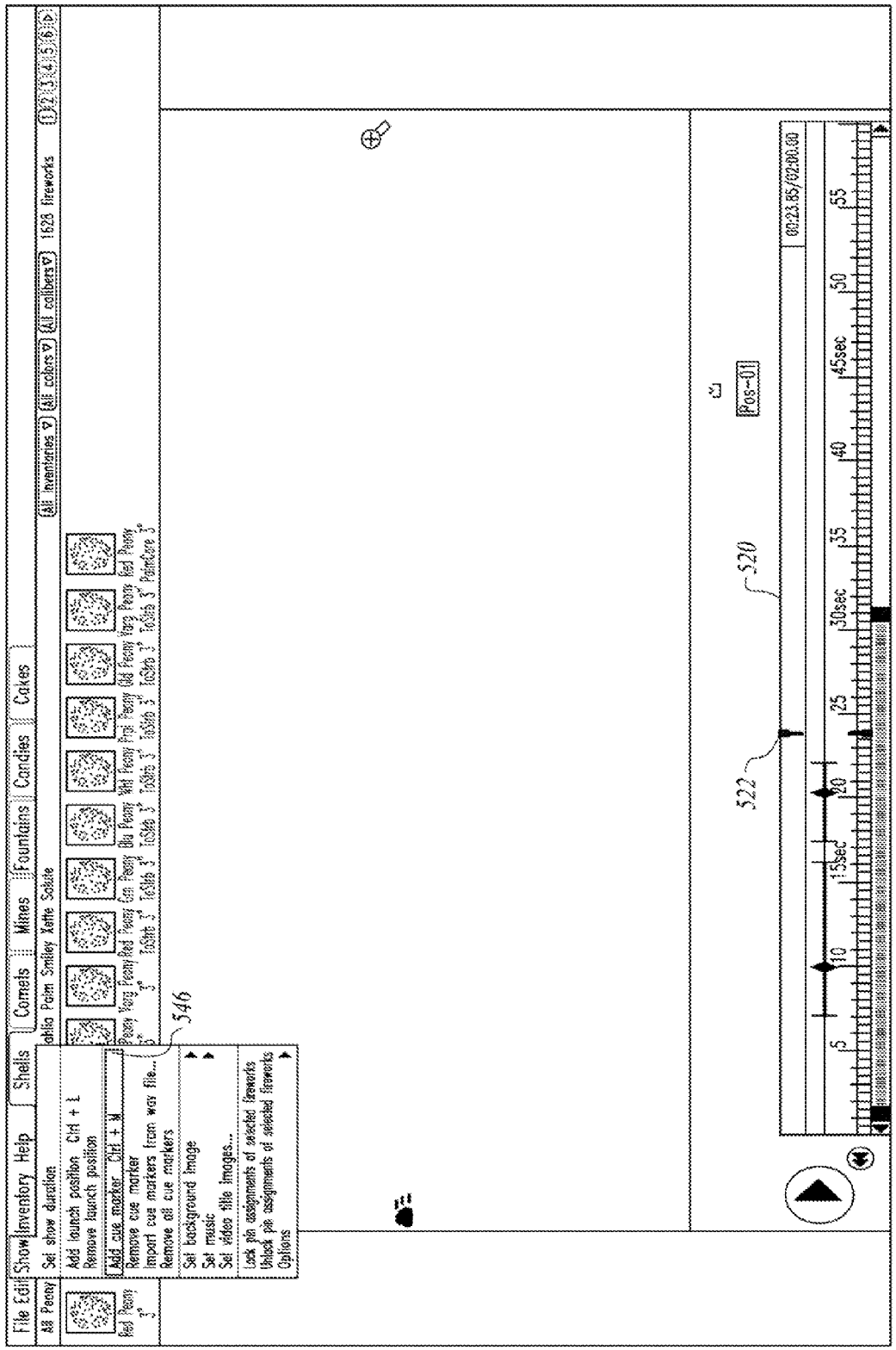
Figure 9:
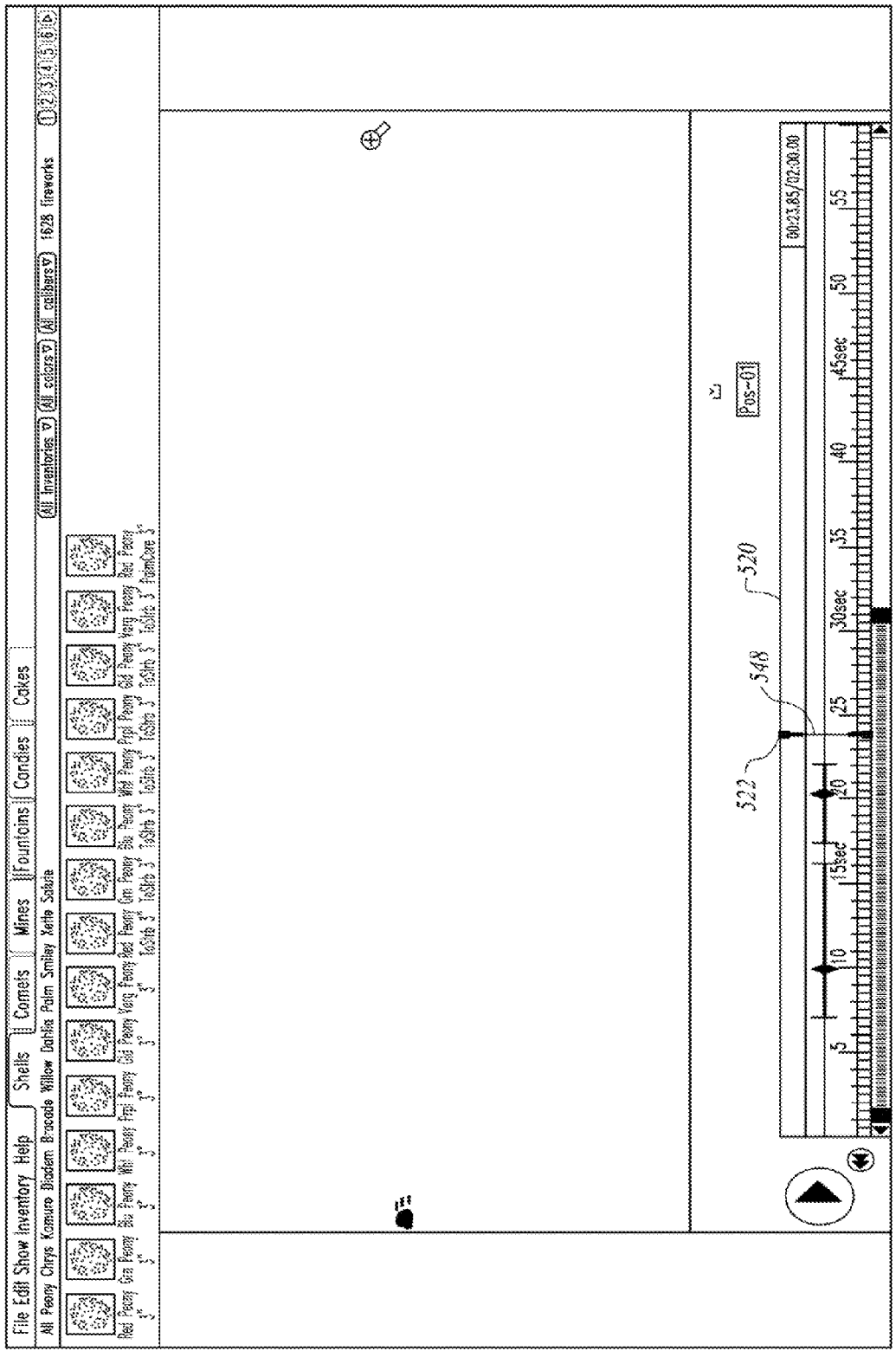

Once a user employs the graphical drag and drop operation to add one or more selected fireworks onto the sky field region 510 as described above, an embodiment displays for each firework in the show a colored, horizontal firework timing bar 540 on the timeline 520 extending from the firework's ignition point 541 on the timeline to the last point at which the effect is visible, the dissipation point 542. Each firework timing bar 540 also includes a "blip" 543 indicating its first break, and small vertical hash marks indicating subsequent breaks, if the firework has multiple breaks. The blip 543 indicating the first break is the principal point in the firework's lifetime that the show designer synchronizes with other fireworks and with the music, so the blip 543 is the primary user interface handle for selecting, deselecting, and sliding the firework in time. Naturally, the blip 543 is the primary point of the firework's lifetime that snaps to the cue markers, which a designer may optionally lay down in an embodiment by clicking "Show>Add cue marker". For example, FIGS. 8-9 illustrate an example of the use of cue markers in one embodiment. In FIG. 8, a user can select one of the drop-down commands 546 by selecting the "Show>Add cue marker". The resulting cue marker 548 is shown on timeline 520 at the playhead 522 position in FIG. 9. Unlike conventional fireworks show design software, the embodiments described herein do not require cue markers; they are completely optional with the various embodiments. As described herein, the various embodiments enable the user to edit the fireworks directly, so no cue markers are required. The firework timing bars 540 stack vertically for fireworks whose blips 543 occur at the same point in time or in an overlapping time period, allowing the user to select the fireworks individually by clicking on them, which would be impossible if the fireworks were all overlapping. An example of a collection of stacked timing bars including a single selected timing bar 540 is illustrated in FIG. 9A.

In one embodiment, the cue markers 548 of FIG. 9 provide additional functionality for manually fired fireworks shows. Unlike computer fired firework shows, manually fired firework shows are fired by a human pressing a button or touching a switch to trigger the electrical impulse on a pin that ignites a desired firework at a precise time. When designing a show that will be fired manually, a designer may want to use cue markers to aggregate fireworks that will be attached and ignited by the same pin, rather than using cue markers to aggregate fireworks that will break at exactly the same time. Because fireworks of different sizes have different delays between their launch time and the time of first break (this time period is denoted herein as the "pre-fire" time), cue markers used for aggregating fireworks that are to be fired on the same pin need to operate differently from cue markers used for aggregating fireworks that break at the same time. Obviously, fireworks of different sizes can be launched at the same time, or can break at the same time; but, fireworks of different sizes generally cannot both be launched at the same time and break at the same time because their pre-fire times between launch and break are different. An embodiment provides a special command option ("Show>Options>Align pre-fires on cue markers for manual fire"). This command option causes cue markers to perform special operations on the fireworks attached to them in order to cause those fireworks to launch at the same time even if they are different sizes. Whenever a firework is attached or unattached from a cue marker while this option is active, a particular embodiment can reposition in time all of the fireworks attached to that cue marker such that all fireworks at the cue marker launch at the same time, and the break of the firework with the shortest pre-fire time occurs at the cue marker. Thus, when this mode is active, the cue marker will be aligned with the earliest of the breaks of the fireworks attached to the cue marker. If there are fireworks of different pre-fire times attached to the cue marker, the later breaks will occur after the cue marker.

Figure 9A:
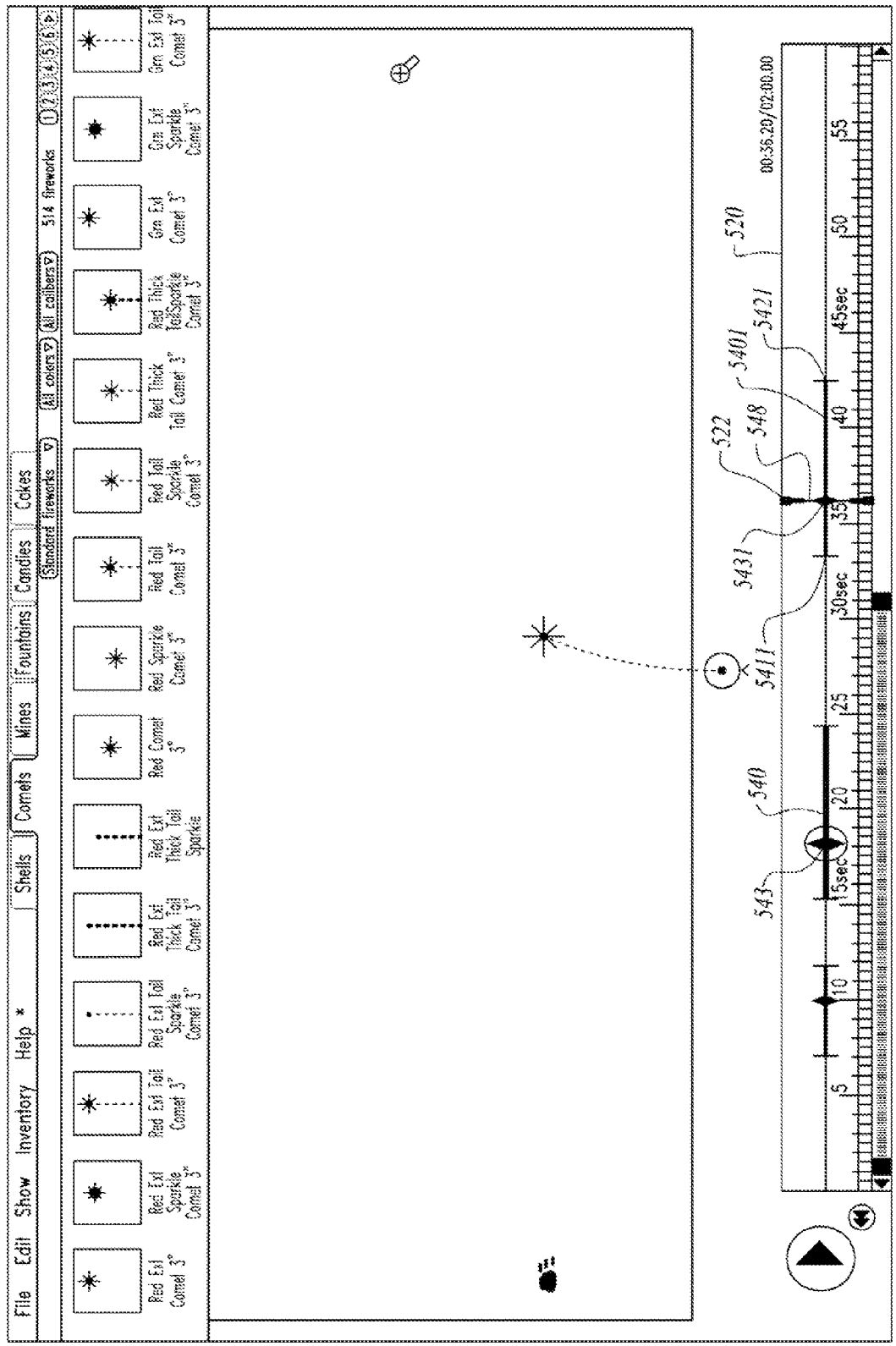
Figure 9B:
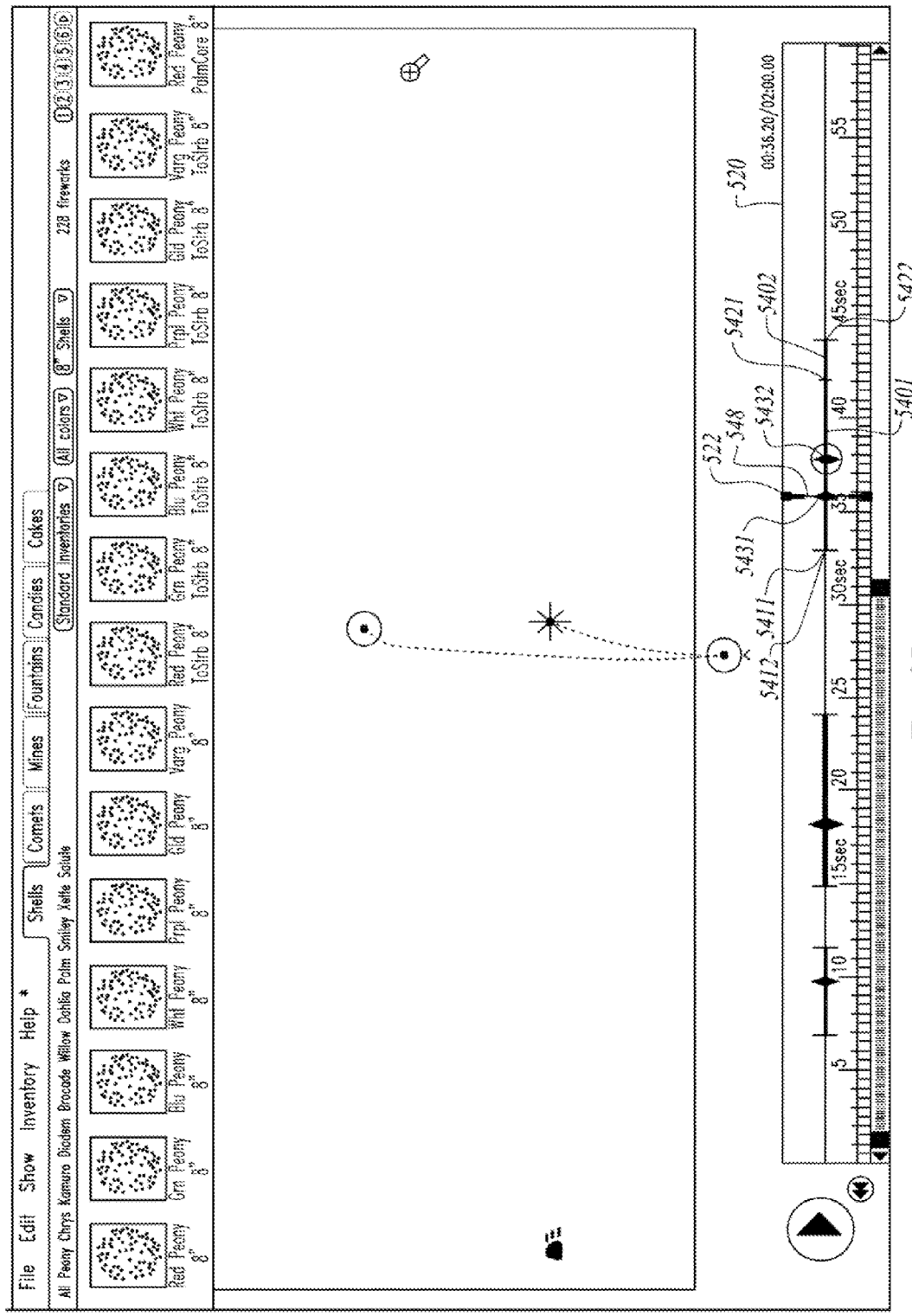
Figure 9C:
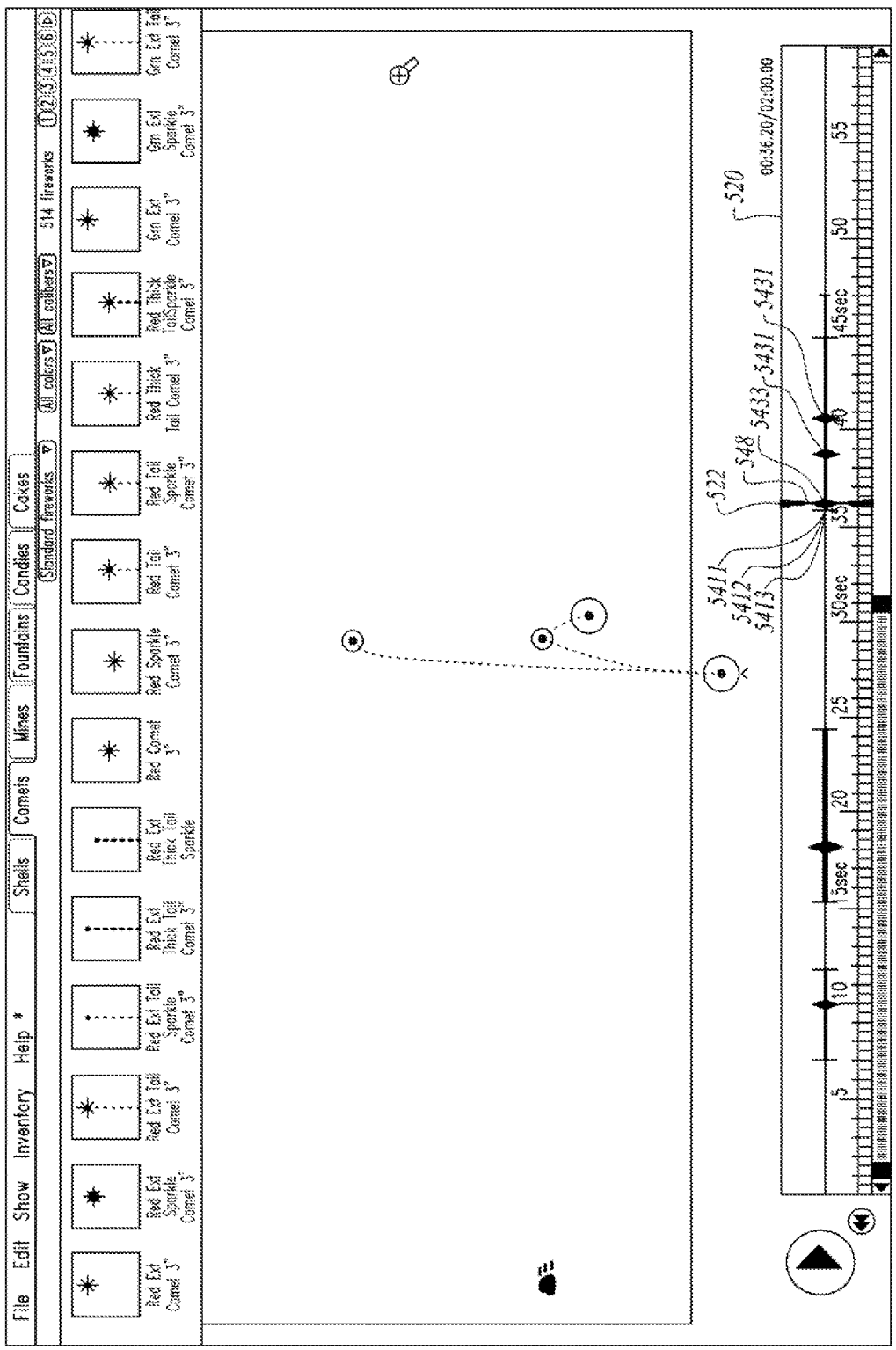

FIGS. 9A, 9B, and 9C illustrate the special operations of cue markers for manually fired shows in a particular embodiment. For example, in FIG. 9A, a 3" shell has been added to the timeline 520 at a time coinciding with the cue marker 548. With the shell's "blip" 5431 coinciding with the cue marker 548, the shell's launch point 5411 occurs at approximately 33.5 seconds. The 3" shell's timing bar 5401 is displayed on the timeline 520 and the 3" shell's dissipation point is shown at time 5421. FIG. 9B shows the situation after adding an 8" shell to the timeline 520 at a time coinciding with the same cue marker 548. The 8" shell's pre-fire time is nearly 5 seconds, larger in comparison to the pre-fire time of the 3" shell, which is only 3 seconds. With the "Align pre-fires on cue markers for manual fire" command option of an embodiment on/active, as described above, the cue marker functionality performs operations that cause all fireworks attached to the cue marker 548 to launch at the same time, that time being such that the earliest break of the attached fireworks occurs at a time coinciding with the cue marker 548. In the example of FIG. 9A through FIG. 9C, the earliest break comes from the 3" shell at time 5431 shown in FIG. 9B, which thereby forces the 8" shell to launch at the same time. Thus, as shown in the example of FIG. 9B, the 3" shell launches at time 5411 and the 8" shell launches at time 5412, both at the same time. The cue marker functionality forces these launch times to coincide. It is apparent as shown on the timing bar 5402 for the 8" shell in FIG. 9B that the 8" shell's blip 5432 indicates that the 8" shell's break will occur after the cue marker 548, not coinciding with the cue marker 548 as it would if the "Align pre-fires on cue markers for manual fire" command option were off/inactive. FIG. 9C shows the result of attaching a third firework to the cue marker 548, the third firework having a short pre-fire time of just 0.3 seconds. One may observe in FIG. 9C from the blips and timing bars of the original 3" and 8" shells that the cue marker functionality has shifted the blip time 5431 of the 3" shell and the blip time 5432 of the 8" shell on the timeline 520 to align their launch times 5411 and 5412 with the launch time 5413 of the earliest breaking attached firework, which is now the third firework, having a pre-fire time of 0.3 seconds and a break time shown by the blip 5433, which is aligned at the cue marker 548.

Figure 10:
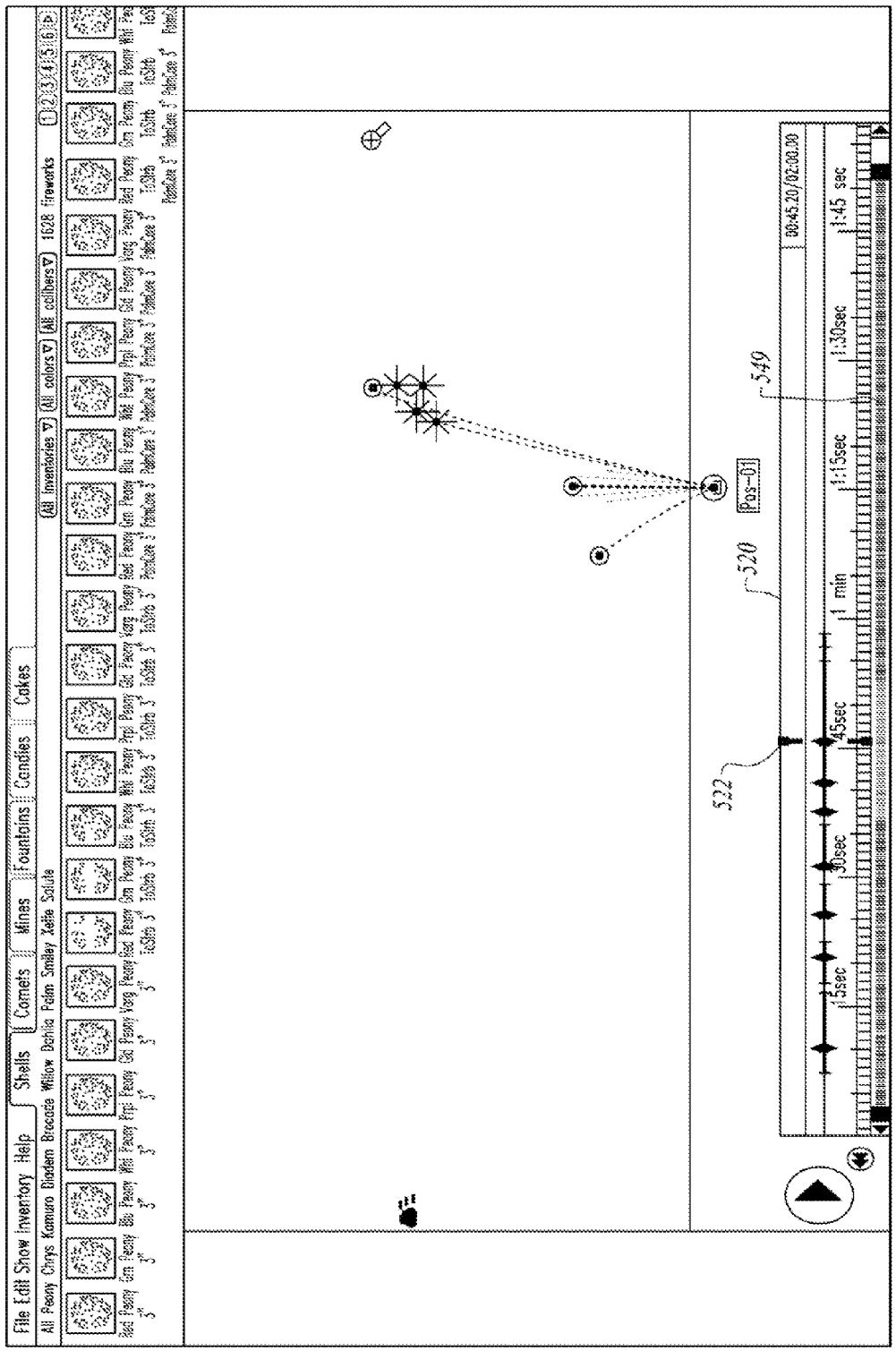
FIG. 10 illustrates one embodiment of a "Scruncher Bar" or timeline expander bar.

Referring now to FIG. 10, one embodiment provides a "Scruncher Bar" or timeline expander bar 549 that expands or contracts the magnification level of the timeline 520, allowing a user to zoom in to see a section of the timeline 520 in precise detail or zoom out to see an overview of the whole show. When the firework timeline bars of the fireworks overlap, their colors combine and become brighter. Thus, when the designer zooms out using expander bar 549, the designer can see an indication of the density of the show by the brightness of the groups of firework timing bars 540.

Drag and Drop User Interface for Show Design—

As described above with regard to FIG. 7, a user can manipulate a pointing device (e.g., a computer mouse) to visually drag a firework effect icon from an Inventory UI element 506 to the sky field UI element 510. As described in more detail below, the user can also drag and drop launch positions from which fireworks are launched. Once dragged and dropped into the sky field UI element 510, fireworks and/or launch positions can be moved and re-positioned in the sky field UI element 510 by clicking on the icon representing the object to be moved and moving the object to the desired new position. FIGS. 11 through 23 illustrate the drag and drop user interface of an example embodiment. These figures are described in more detail below.

Figure 11:
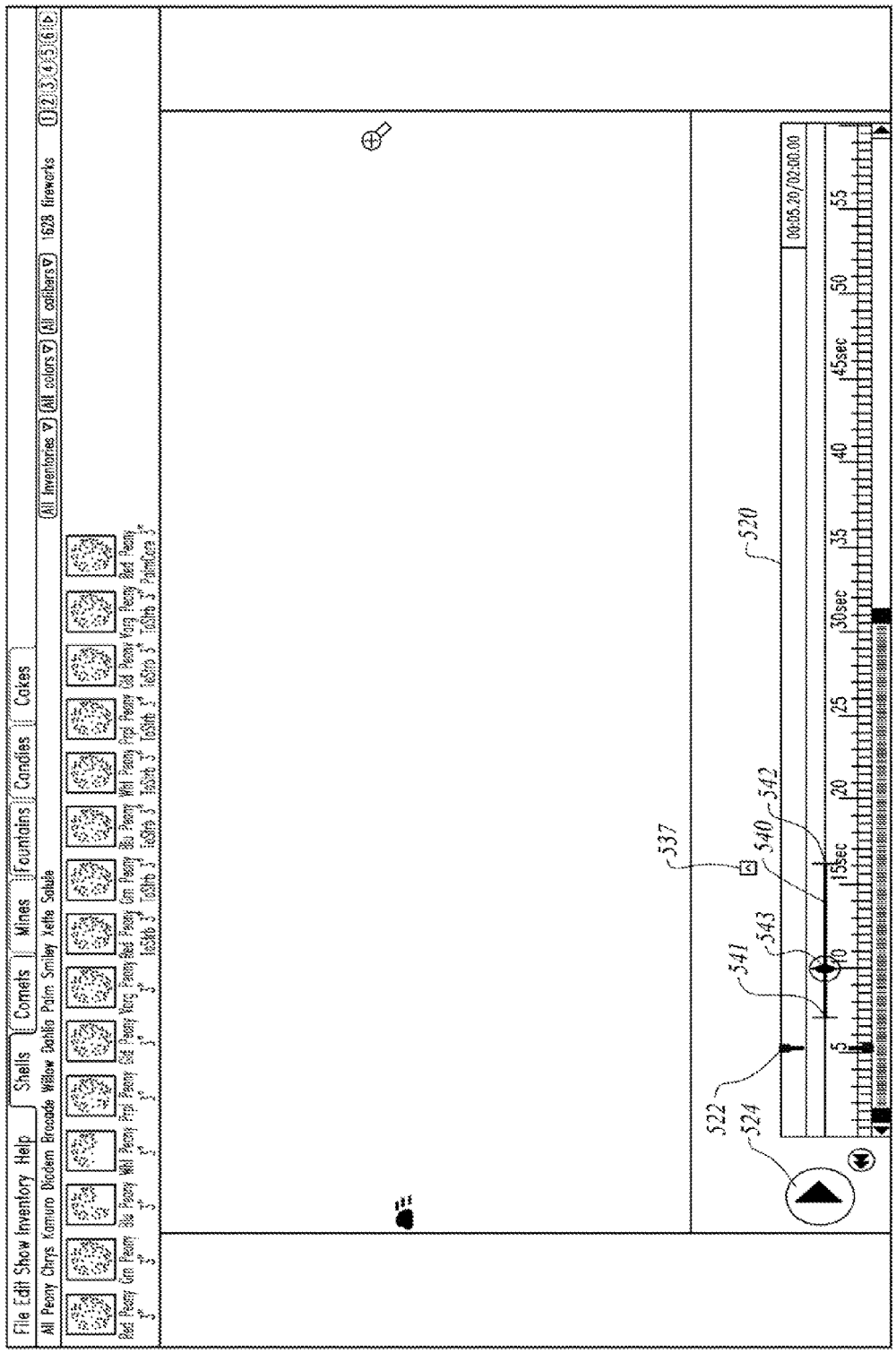
FIG. 11 illustrates an example user interface screen shot wherein a user has used the pointing device to move the playhead to a position to the left of the launch time for the firework.
Figure 12:
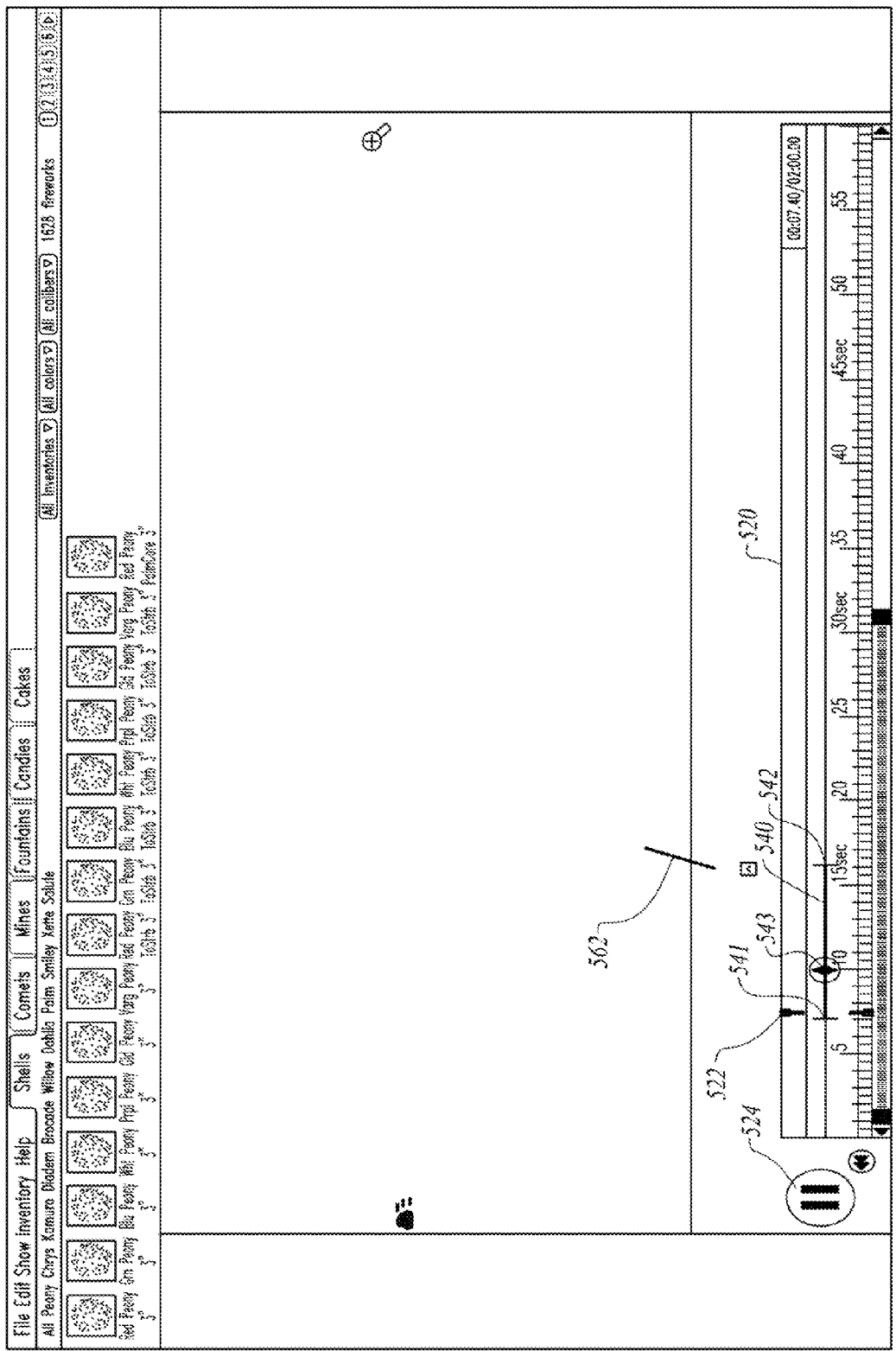
FIG. 12 illustrates an image of the launch of a firework.
Figure 13:
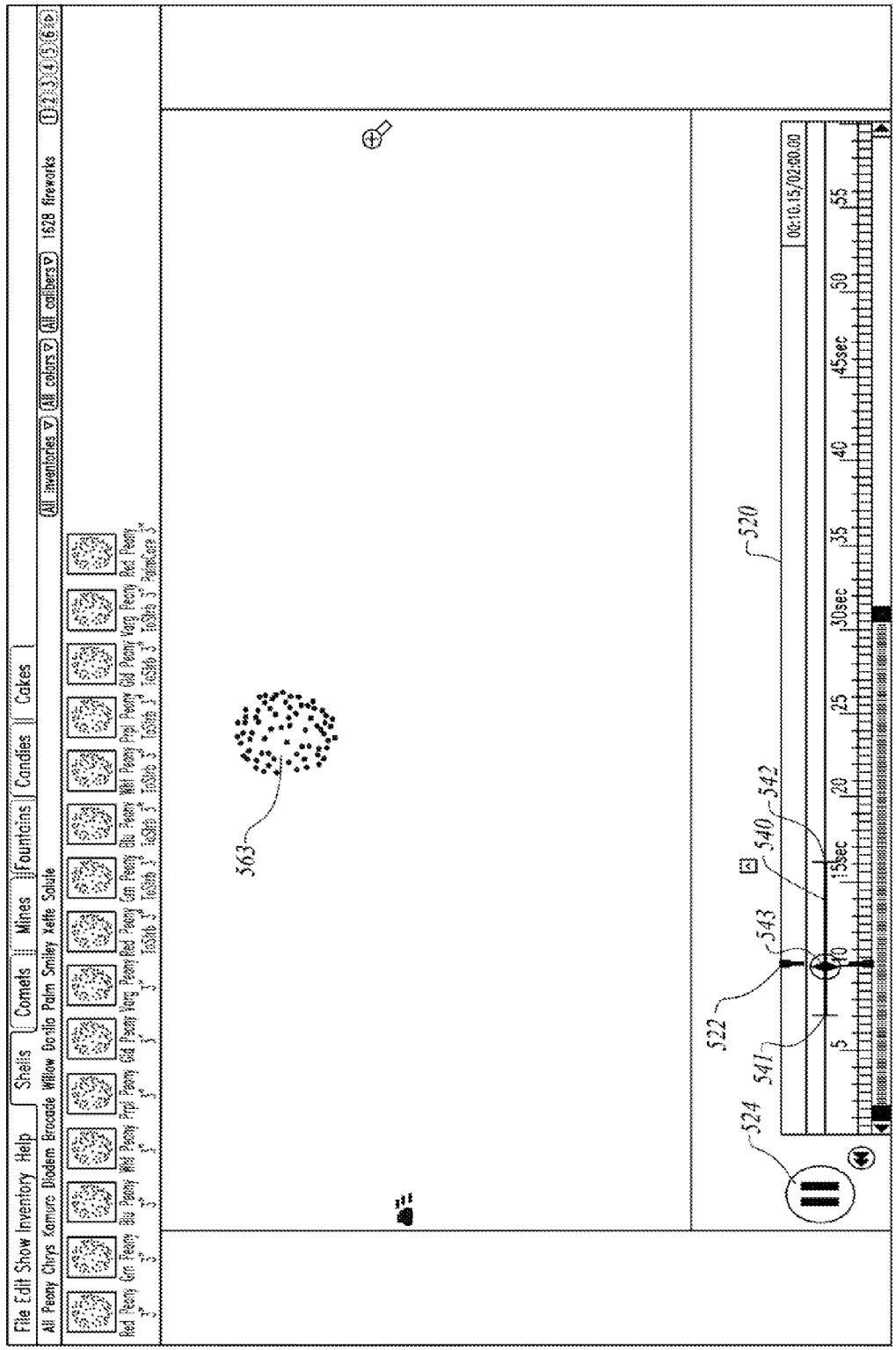
FIGS. 13 and 14 illustrate an image of the break of the firework.
Figure 14:
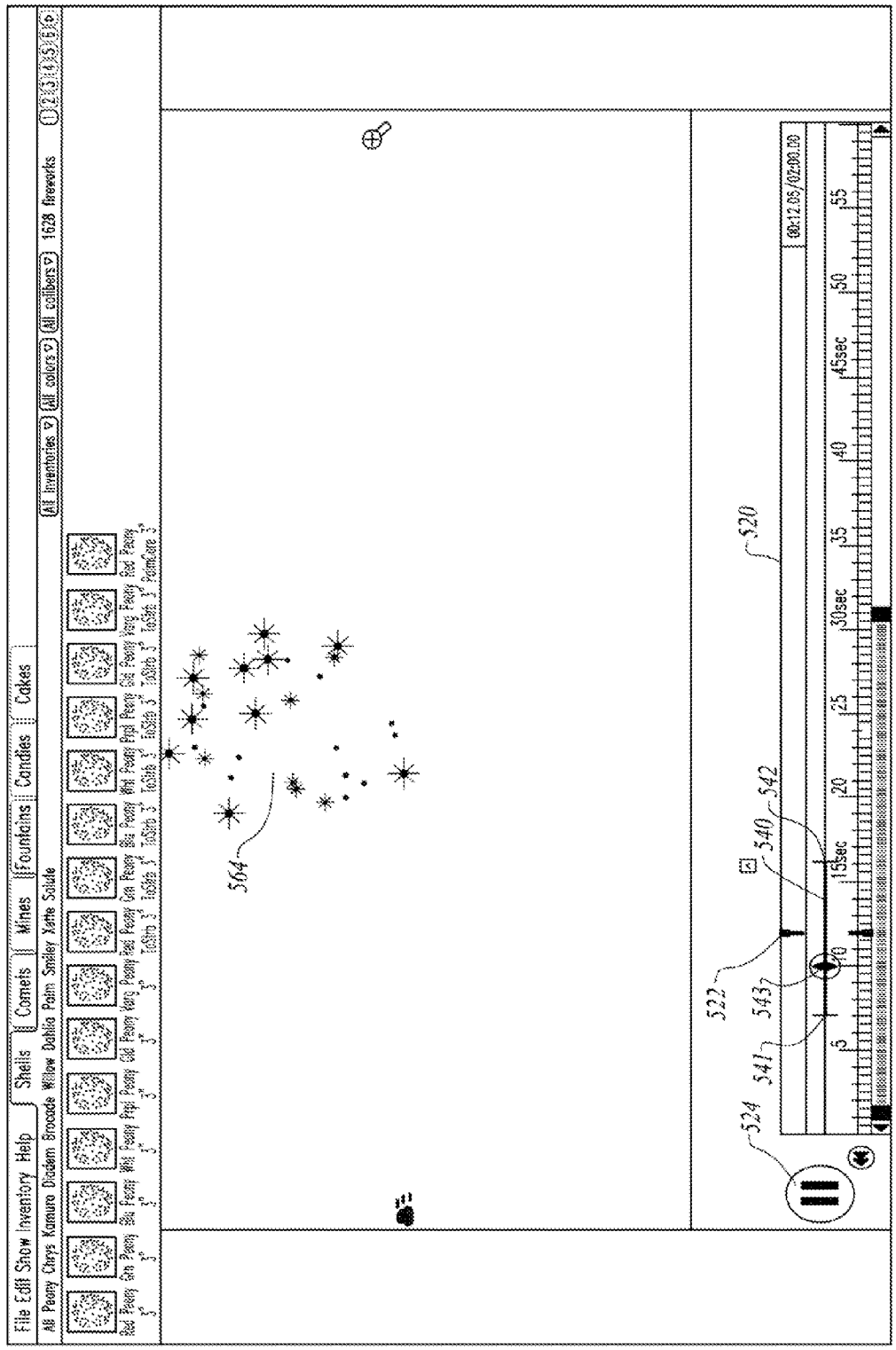
Figure 15:
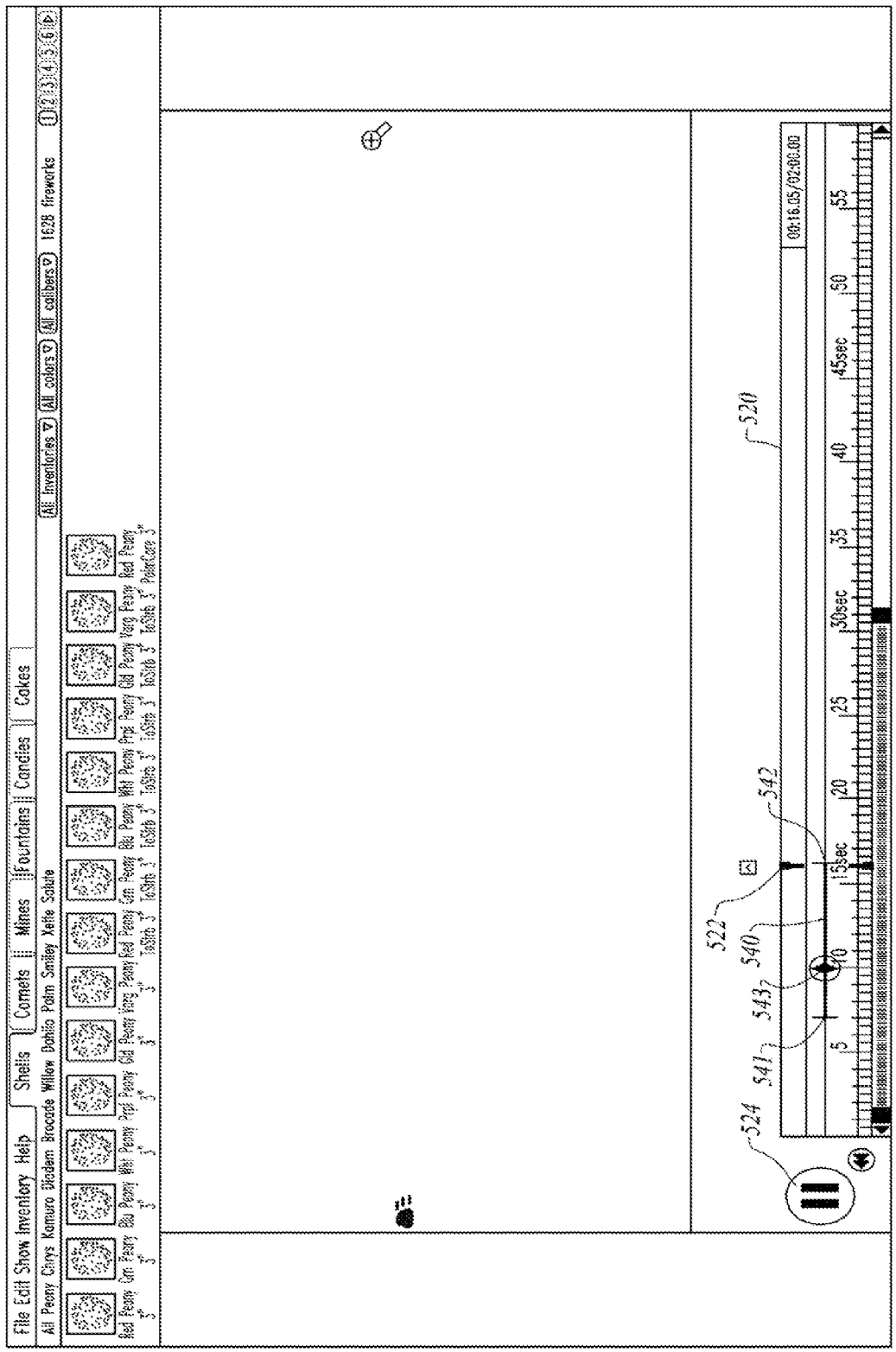
FIG. 15 illustrates the dissipation point when the effect of the firework has ended.

Referring again to FIG. 7, the sample user interface screen illustrates the result after a user has selected a particular firework type from the inventory of individual drag/drop firework types 506 and dragged an icon of the selected firework 534 to a location in the sky field UL element 510. Given the firework 534 placed in the sky field UI element 510 as shown in FIG. 7, FIG. 11 illustrates an example user interface screen shot wherein a user has used the pointing device to move the playhead 522 to a position to the left of the launch time 541 for the firework 534. Once the playhead 522 is so moved, the user can activate the play button 524. The activation of the play button starts the operation of the firework simulator. The playhead 522 begins to move forward in time (left to right on the timeline 520). When the playhead 522 intersects with the launch time 541 for the firework 534, an image 562 of the launch of the firework 534 is displayed as shown in FIG. 12. As the playhead 522 continues to move forward in time, the playhead 522 intersects with the break time 541 for the firework 534. This is shown in FIG. 13. As shown in FIG. 13, the break 563 of firework 534 is shown when the playhead 522 intersects with the break time 541 for the firework 534. As the playhead 522 continues to move forward in time, the playhead 522 passes the break time 541 for the firework 534. This is shown in FIG. 14. As shown in FIG. 14, the break of firework 534 has passed and the post-break activity of the firework 534 is shown. As the playhead 522 continues to move forward in time, the playhead 522 intersects with the dissipation point 542 for the firework 534. The dissipation point 542 is a point in time when the effect of the firework has ended. This is shown in FIG. 15. As shown in FIG. 15, the effect of the firework has ended and no fireworks effects are shown in the sky field UI element 510. Thus, the simulation of a single firework in an example embodiment is described.

Figure 16:
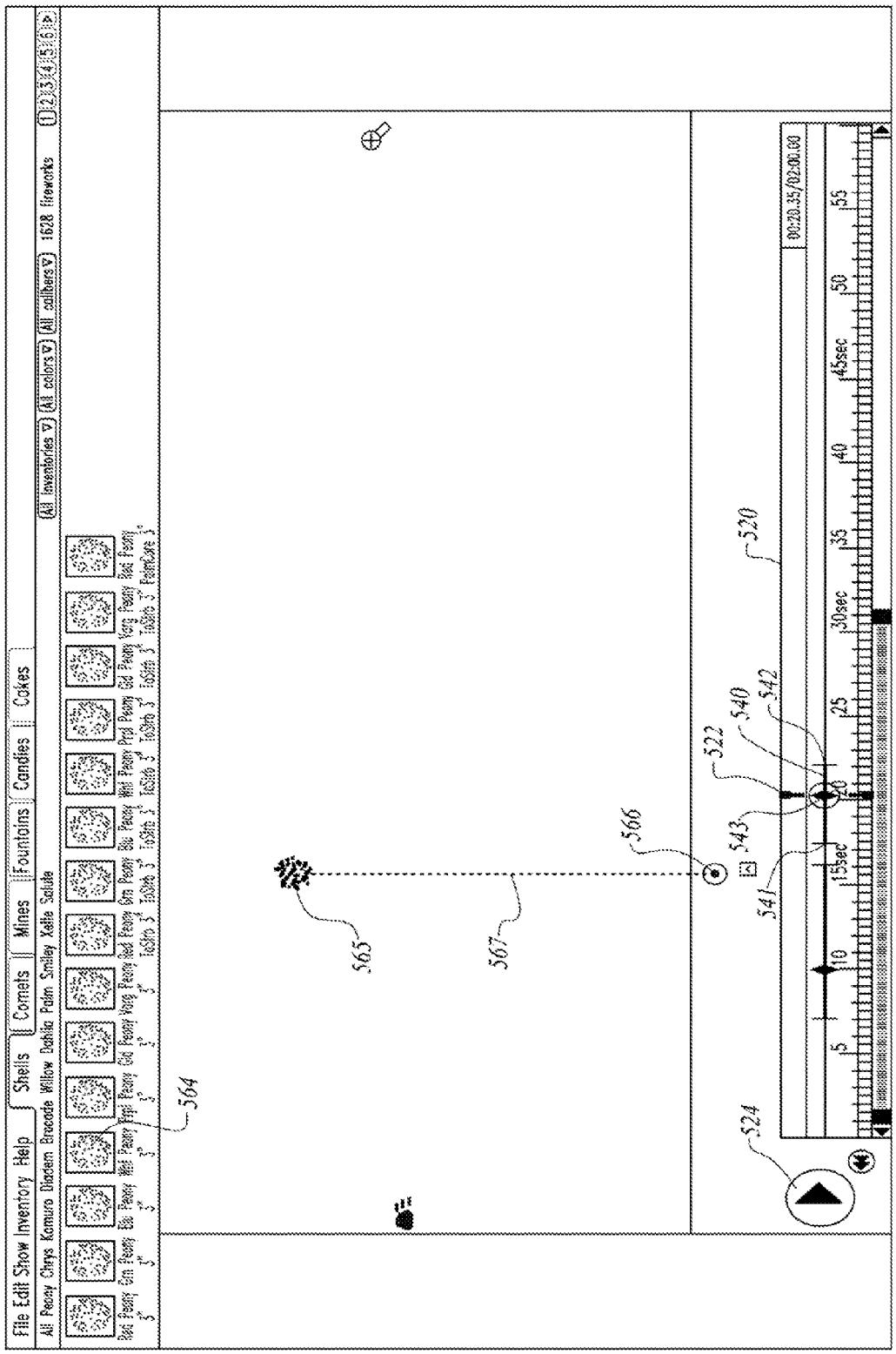
FIG. 16 illustrates the sample user interface screen after a user has selected a second firework from the inventory of individual drag/drop firework types and dragged an icon of the selected firework to a location in the sky field UI element.

Referring now to FIG. 16, the sample user interface screen illustrates the result after a user has selected a second firework 564 from the inventory of individual drag/drop firework types and dragged an icon of the selected firework 565 to a location in the sky field UI element 510. Note that in an example embodiment, the selected firework 565 is displayed with a trajectory indication 567 from a launch position 566 to a break position. The break position indicates the end of the trajectory for fireworks that detonate or expire in the sky, or the approximate height of the particle trajectories for fireworks that emit particles into the sky, such as fountains or mines. In this example, the selected firework 565 has snapped to a default launch position 566. As described in more detail below, the user can also create or move launch positions. Also note in the example of FIG. 16 that the addition of the new firework 565 has caused the system to automatically place a firework timing bar 540 on the timeline 520, along with the firework's ignition or launch point 541, the firework's "blip" 543 indicating its first break, and the firework's dissipation point 542. In one embodiment, the firework's "blip" 543 indicating its first break can be aligned with the playhead 522. In this manner, the user can place a new firework effect at any position on the timeline 520.

Figure 17:
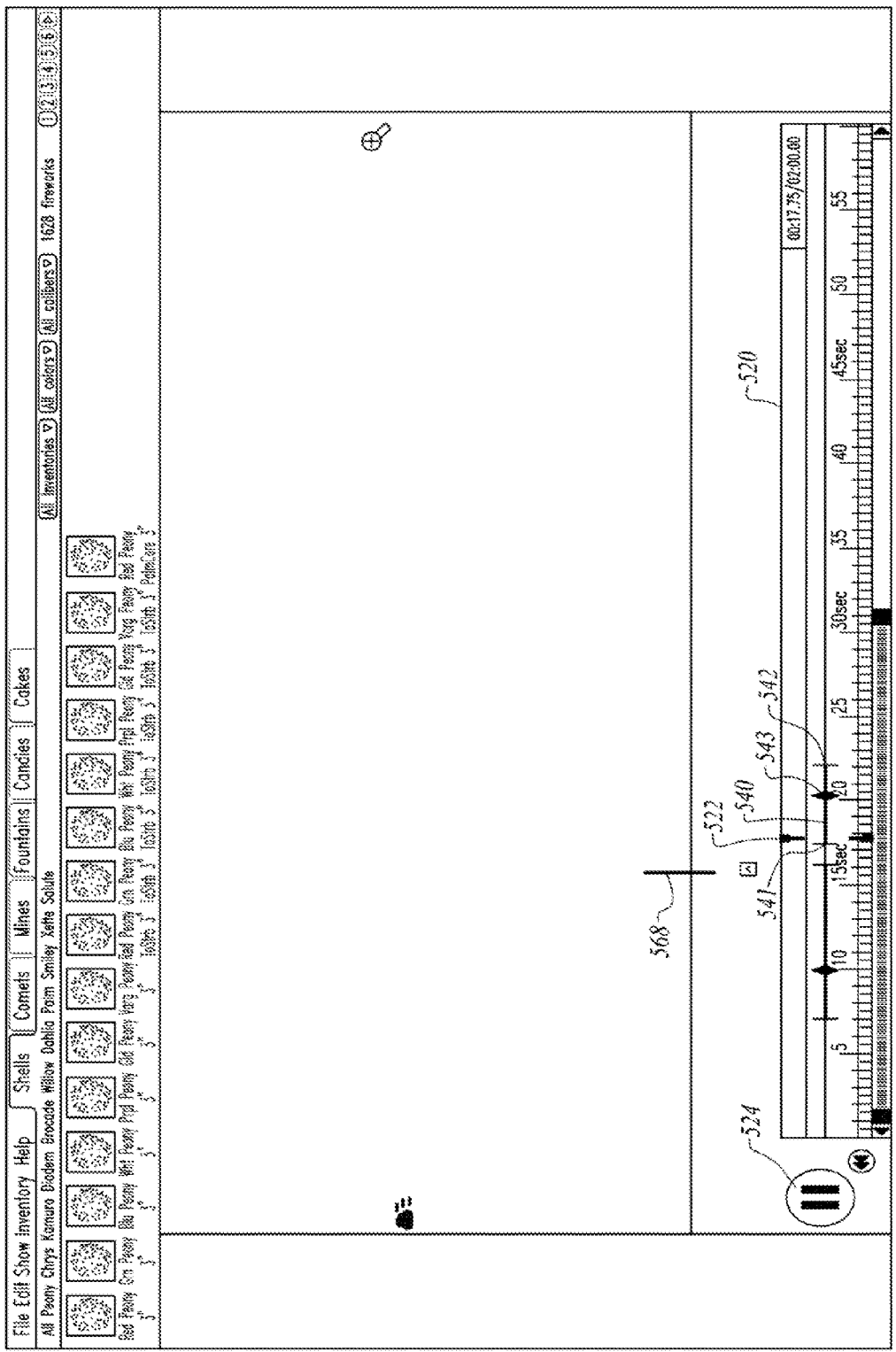
FIG. 17 illustrates an example user interface screen shot wherein a user has used the pointing device to move the playhead to a position to the left of the launch time for the second firework.
Figure 18:
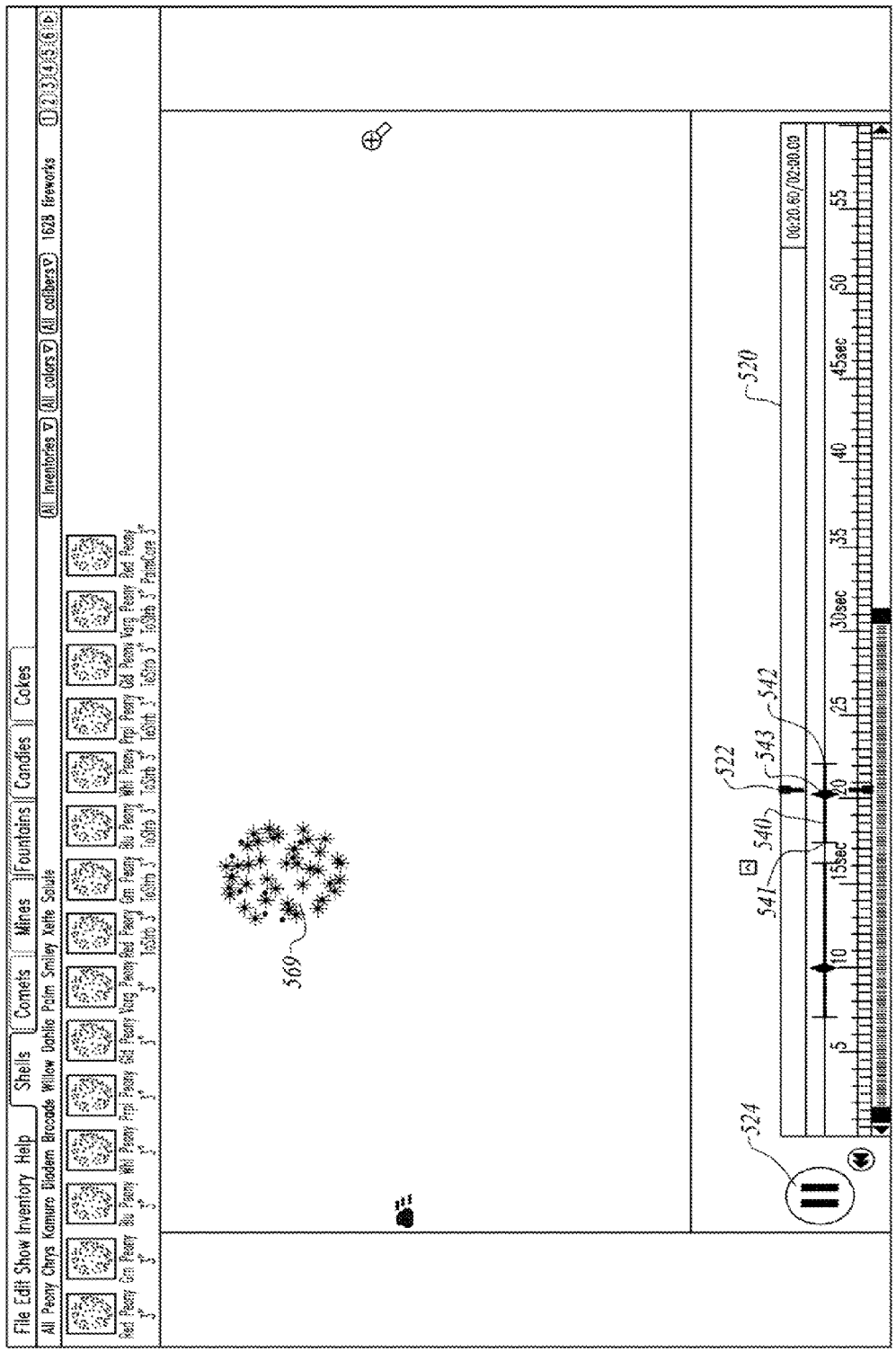
FIG. 18 illustrates as the playhead continues to move forward in time, the playhead intersects with the break time for the second firework.

Given the second firework 565 placed in the sky field UI element 510 as shown in FIG. 16, FIG. 17 illustrates an example user interface screen shot wherein a user has used the pointing device to move the playhead 522 to a position to the left of the launch time 541 for the second firework 565. Once the playhead 522 is so moved, the user can activate the play button 524. The activation of the play button starts the operation of the firework simulator. The playhead 522 begins to move forward in time (left to right on the timeline 520). When the playhead 522 intersects with the launch time 541 for the second firework 565, an image 568 of the launch of the second firework 565 is displayed as shown in FIG. 17. As the playhead 522 continues to move forward in time, the playhead 522 intersects with the break time 541 for the second firework 565. This is shown in FIG. 18. As shown in FIG. 18, the break 563 of second firework 565 is shown when the playhead 522 intersects with the break time 541 for the second firework 565. As the playhead 522 continues to move forward in time, the playhead 522 passes the break time 541 for the second firework 565 and eventually intersects with the dissipation point 542 for the second firework 565. At this point, the effect of the firework has ended and no fireworks effects are shown in the sky field UI element 510. Thus, the simulation of a second firework in an example embodiment is described.

Figure 19:
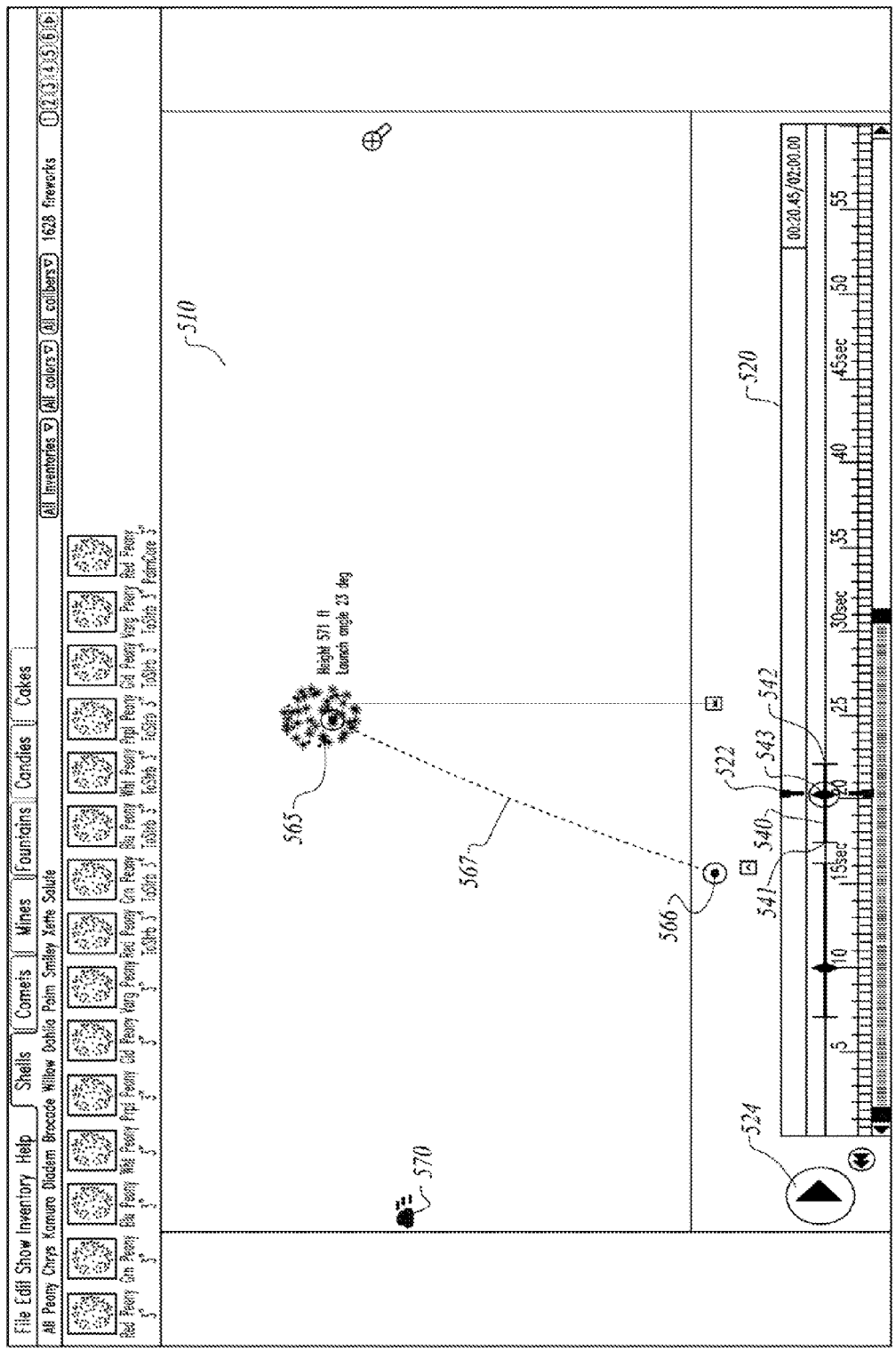
FIG. 19 illustrates that the second firework drawn in the sky field and the timeline blip retfr to the same firework.
Figure 20:
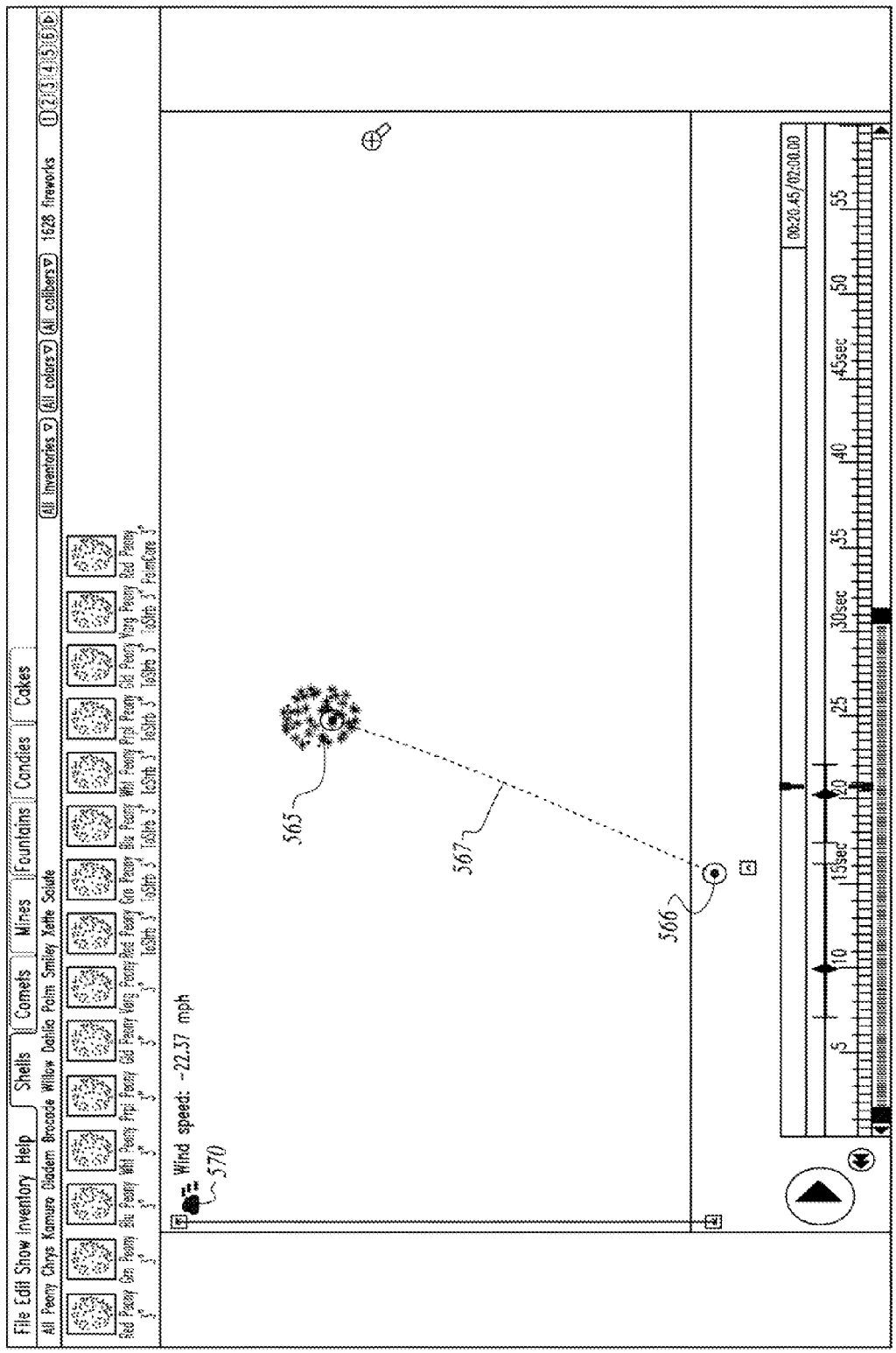
FIGS. 20 and 21 illustrate the operation of the wind setting indicator of an example embodiment.
Figure 21:
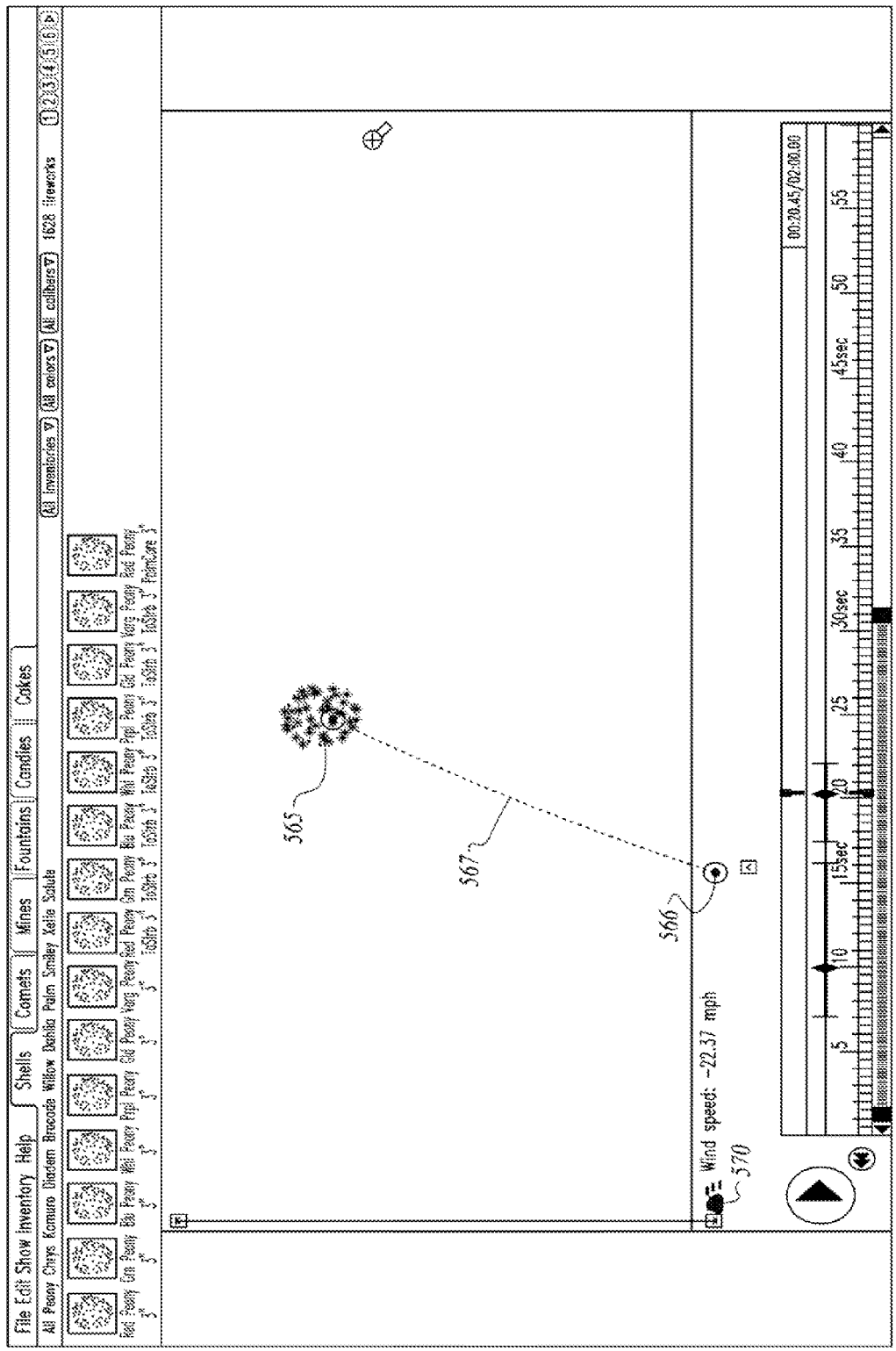

Referring now to FIG. 19, the second firework 565 drawn in the sky field 510 and the timeline blip 543 refer to the same firework. The graphics in the sky field 510 show the location and appearance of the firework. The blip 543 and timing bar 540 in the timeline 520 show the timing aspects of the firework. Similar to moving the spatial location of the firework in the sky field 510, the user can move the temporal location of the firework in the timeline 520 by clicking on and dragging the timeline blip 543 corresponding to the firework left or right on the timeline 520.

Referring again to FIG. 19, the second firework 565 is again shown at its break time 543. Note that in an example embodiment, the selected firework 565 is displayed with a trajectory indication 567 from a launch position 566 to a break position. Given this visual indication of the second firework 565, the user can move the pointing device to click on the second firework 565, the trajectory 567, or the launch position 566. Once clicked, the user can drag the second firework 565 to a new location in the sky field 510. This is shown in FIG. 19. At the new location, the system automatically displays a height and angle indication as shown in FIG. 19. Also shown in FIG. 19 is a wind setting indicator 570. In a particular embodiment, the wind setting indicator 570 can be used to configure a wind condition at the firework show location being simulated. In FIG. 19, the wind setting indicator 570 is positioned at a midpoint between the top and bottom of the sky field 510. In one embodiment, this positioning of the wind setting indicator 570 corresponds to a zero wind condition. The user can use the pointing device to click on the wind setting indicator 570 and move the wind setting indicator 570 up or down to change the wind setting. In an upward movement, the wind setting increases in one direction (e.g., see FIG. 20). Note that the trajectory and break location of the second firework 565 automatically adjusts for the wind setting. Conversely, in a downward movement, the wind setting increases in an opposite direction (e.g., see FIG. 21). Again, note that the trajectory and break location of the second firework 565 automatically adjusts in the opposite direction for the wind setting.

Figure 22:
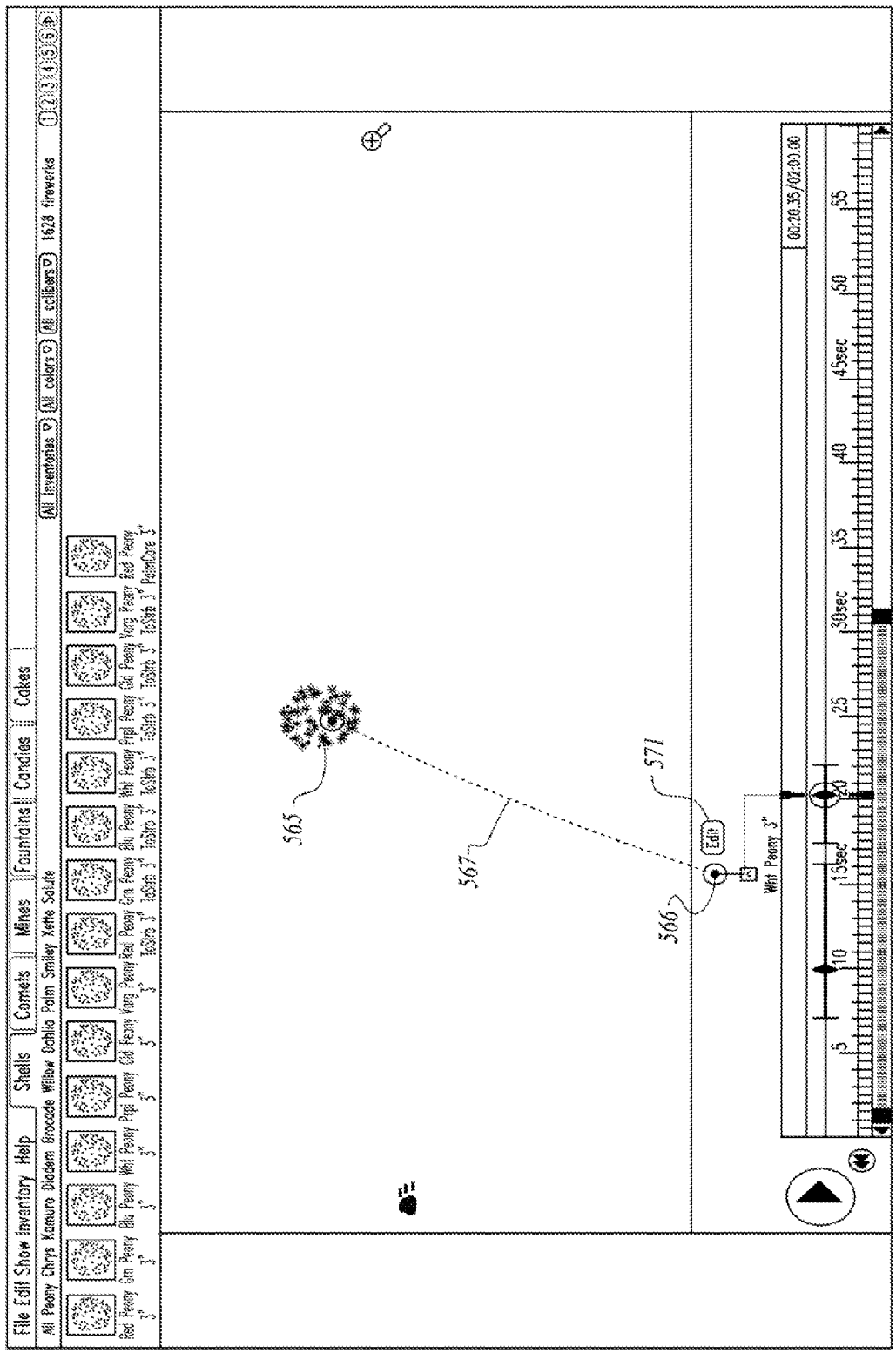
FIG. 22 illustrates the capability for a user to dynamically change the attributes of a articular firework previously selected and dropped into the sky field.
Figure 23:
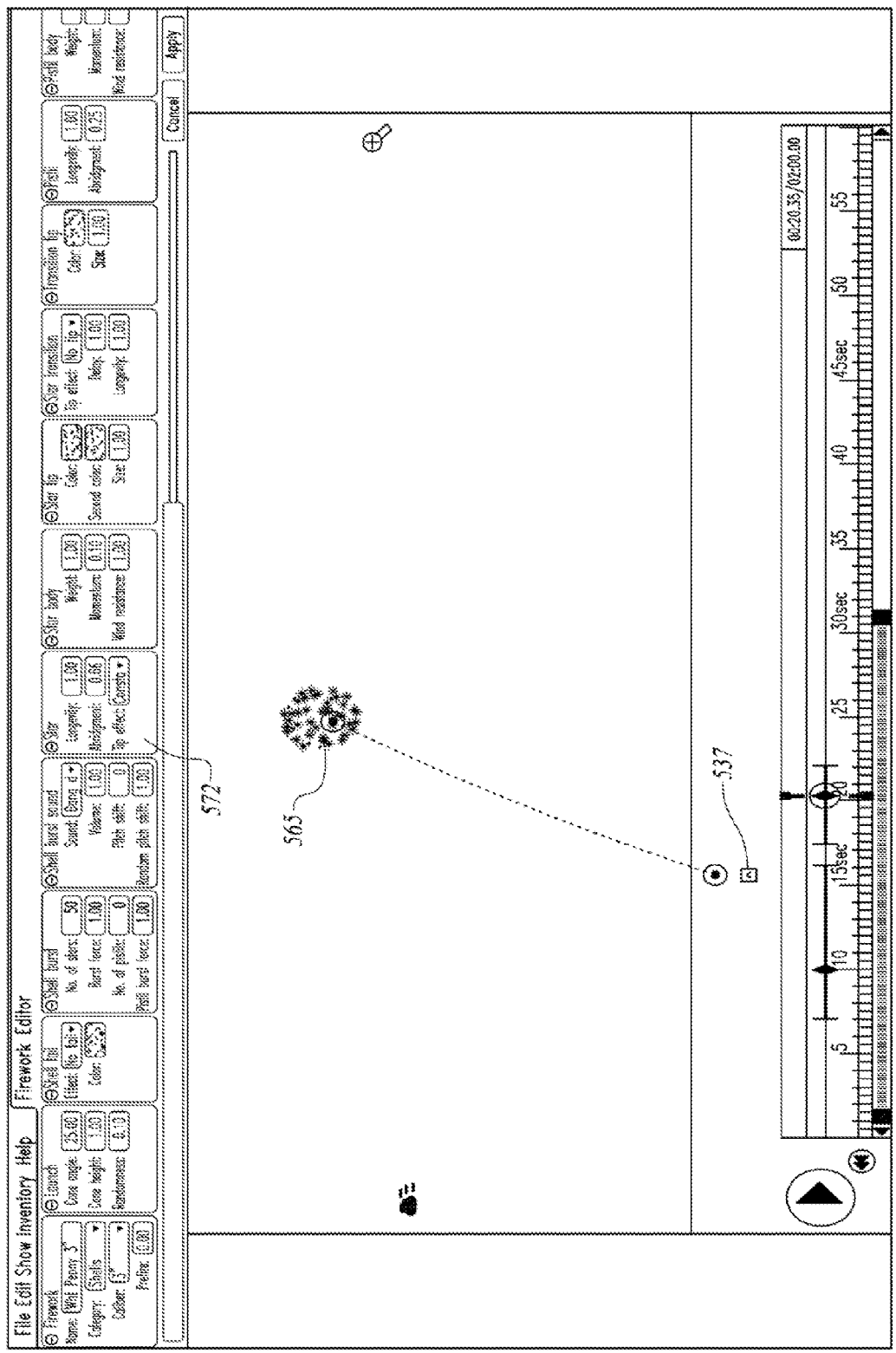
FIG. 23 illustrates the operation of the Edit feature of an example embodiment.

Referring now to FIG. 22, an example embodiment illustrates the capability for a user to dynamically change the attributes of a particular firework previously selected and dropped into the sky field 510. As shown in FIG. 22, a user has used the pointing device to click on the firework 565 or its trajectory indicator 567. As a result, the firework 565 and its trajectory indicator 567 have been highlighted. Additionally, an Edit icon 571 is displayed proximately to the selected firework 565 or its trajectory indicator 567. A user may click on this Edit icon 571. As a result of the user clicking on the Edit icon 571, a user interface screen, such as the example shown in FIG. 23, is displayed for the user. Note that the user interface screen shown in FIG. 23 includes a Firework Editor panel 572. The Firework Editor panel 572 provides a set of user-configurable parameters associated with the previously clicked firework. For example, the user can edit, for the selected firework, parameters including: firework name, type, caliber, pre-fire time, launch angle and height, shell, star and pistil effects, color, longevity, and the like. It will be apparent to those of ordinary skill in the art that a variety of firework parameters can be configured in this manner.

In an example embodiment, the drag and drop techniques described above can be used to add particular fireworks to a firework show in a desired sequence as the firework show is designed and built by a user. As also described above, each firework can be configured for its break location and trajectory using drag and drop techniques. Additionally, drag and drop techniques can be used to add particular fireworks to a "Launch Position". The command option "Show>Add launch position" 551 (shown in FIG. 24) introduces a launch position to the show, which is displayed in the sky field 510 as a little yellow bucket at the bottom of the screen (e.g., see FIG. 25, item 552). This is the launch position. When a firework icon is dragged from the inventory 506 to the launch position 552 (e.g., the yellow bucket), the firework snaps to the launch position 552. Also, if the mouse button is released while the dragged firework icon is in the air (e.g., at a particular location in the sky field 510), the break of the firework ends up at that particular position (the drop position). Then, the launch position for the firework snaps to the nearby launch position 552 based on a projected base of the trajectory of the firework. The system can calculate a launch speed such that the break of the firework happens at the user configured drop position. The system can also use inverse mechanics to take into consideration the user configured simulated wind, which can vary over time. The system can also use physical simulation to calculate the inverse mechanics by guessing the launch velocity, then simulating forward from the initial conditions, then improving the guess based on where the shell ended up breaking, and iterating until the guess results in a break that is within a pre-defined tolerance location. In a particular embodiment, the system can also constrain the firework launch speed based on the size of the firework shell. In a particular embodiment, if a user drags the break position of a firework that is on a launch position, the length of the trajectory will remain approximately constant based on the constant lift charge. In other embodiments, the fireworks not attached to a launch position do not have this constraint. In this embodiment, the length of the trajectory can be arbitrarily set.

Thus, as described above, the various embodiments enable the selection and dragging of a firework by its trajectory in the sky field 510. This drag and drop technique is a user interface improvement over the conventional techniques of choosing a firework from a menu or dialog, rather than dragging and dropping the firework. The system of various embodiments can use physical simulation to generate a path representation of the trajectory of the firework from the user configured launch position to the user configured break location. The trajectory can be represented as a path of dots or a line shown in a first color when selected and a different color when unselected. The trajectory can be tested for cursor clicks and used as a user interface handle for moving the firework.

As also described above, the various embodiments also enable the selection and dragging of a firework's break position in the sky field 510. This drag and drop technique is a user interface improvement over the conventional techniques of configuring a firework break position or launch angle from a menu or dialog, rather than dragging and dropping the firework's break position in the sky field 510. The system of various embodiments can also calculate a launch angle from a user configured launch position, such that the firework break happens at the drop position.

Figure 24:
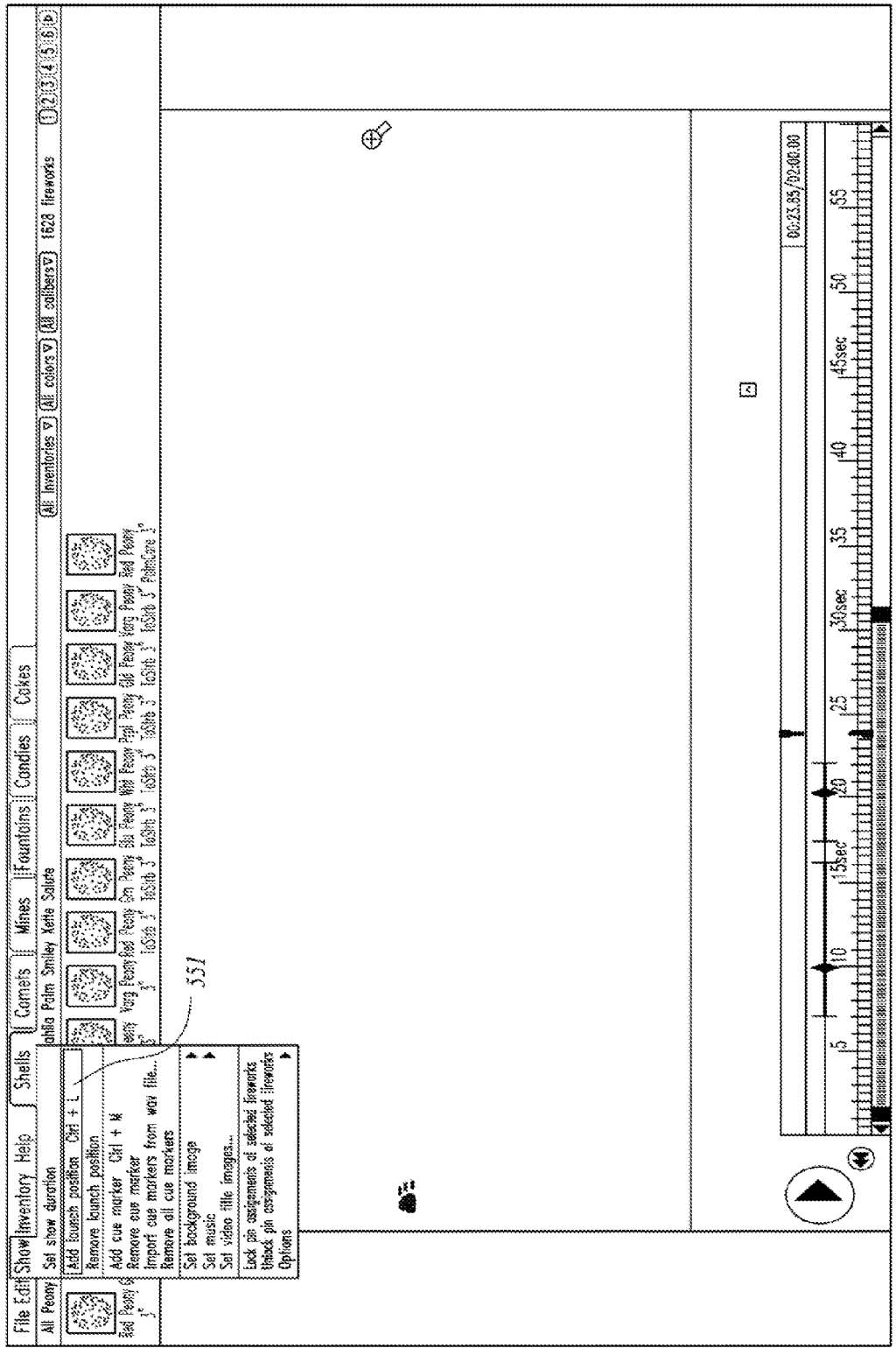
FIGS. 24 through 29 illustrate the user interface features of an example embodiment supporting the configuration of launch positions.
Figure 25:
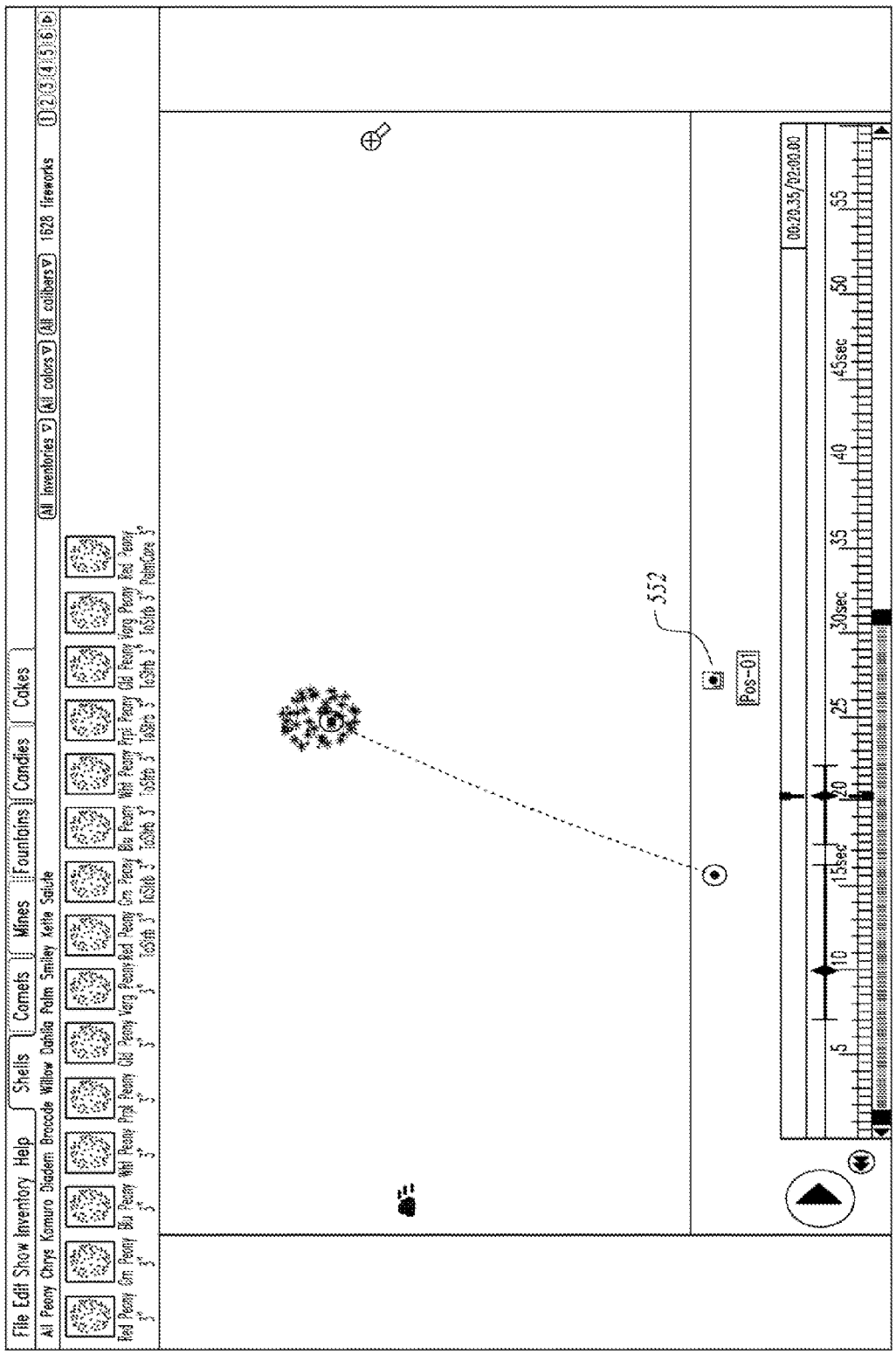

Referring now to FIGS. 24 through 29, the user interface features of an example embodiment supporting the configuration of launch positions is illustrated. Referring to FIG. 24, a user can see the available launch positions or to add a new launch position in an example embodiment, by clicking on the command option "Show>Add launch position" 551 or just pressing control-L on the alphanumeric keyboard. As a result of this command option, a new launch position is created in the sky field 510. The new launch position 552 is shown in FIG. 25. Once the new launch position is created as described above, the new launch position 552 can be configured and positioned as shown in FIGS. 26 through 29.

Figure 26:
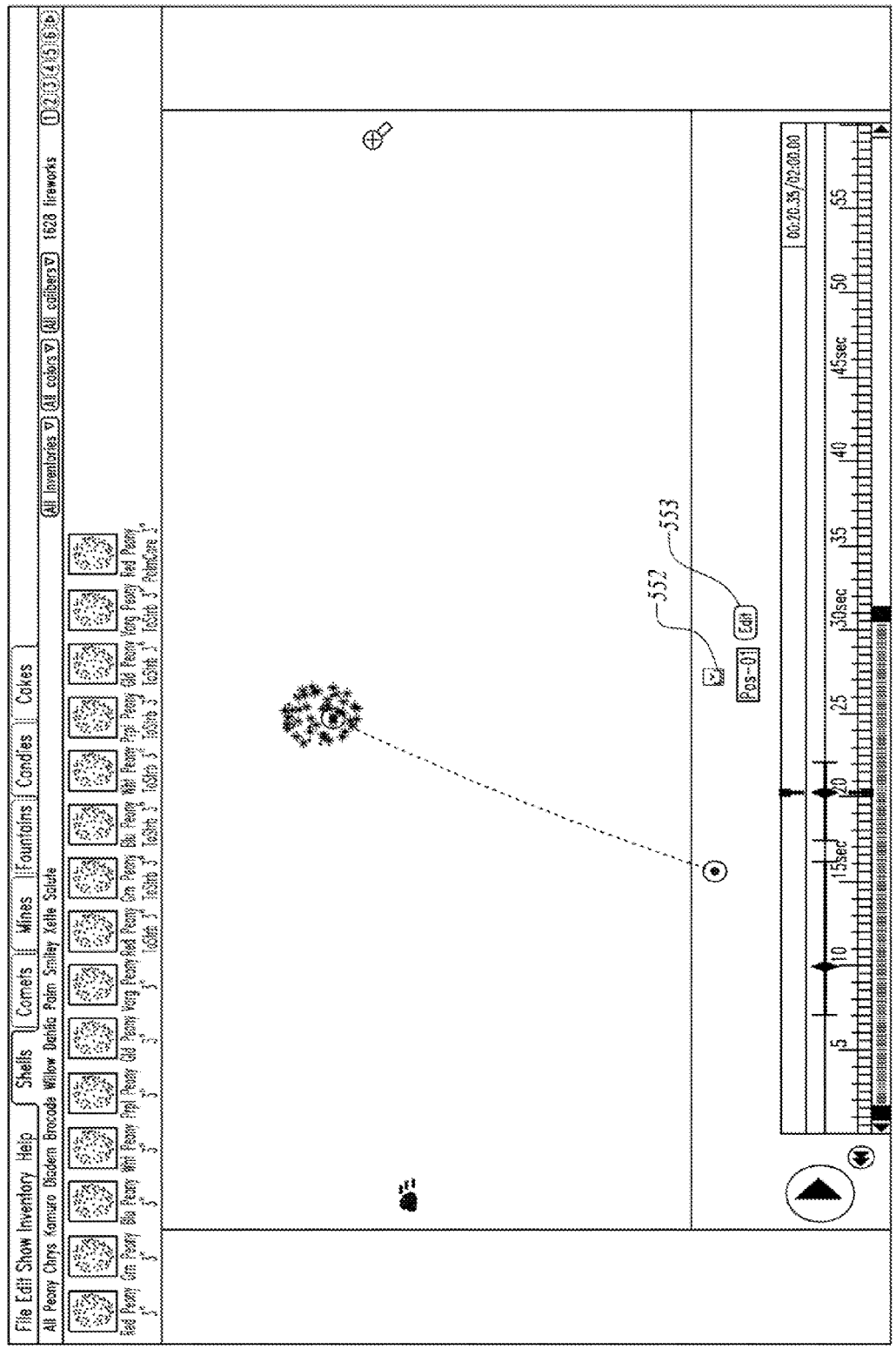
Figure 27:
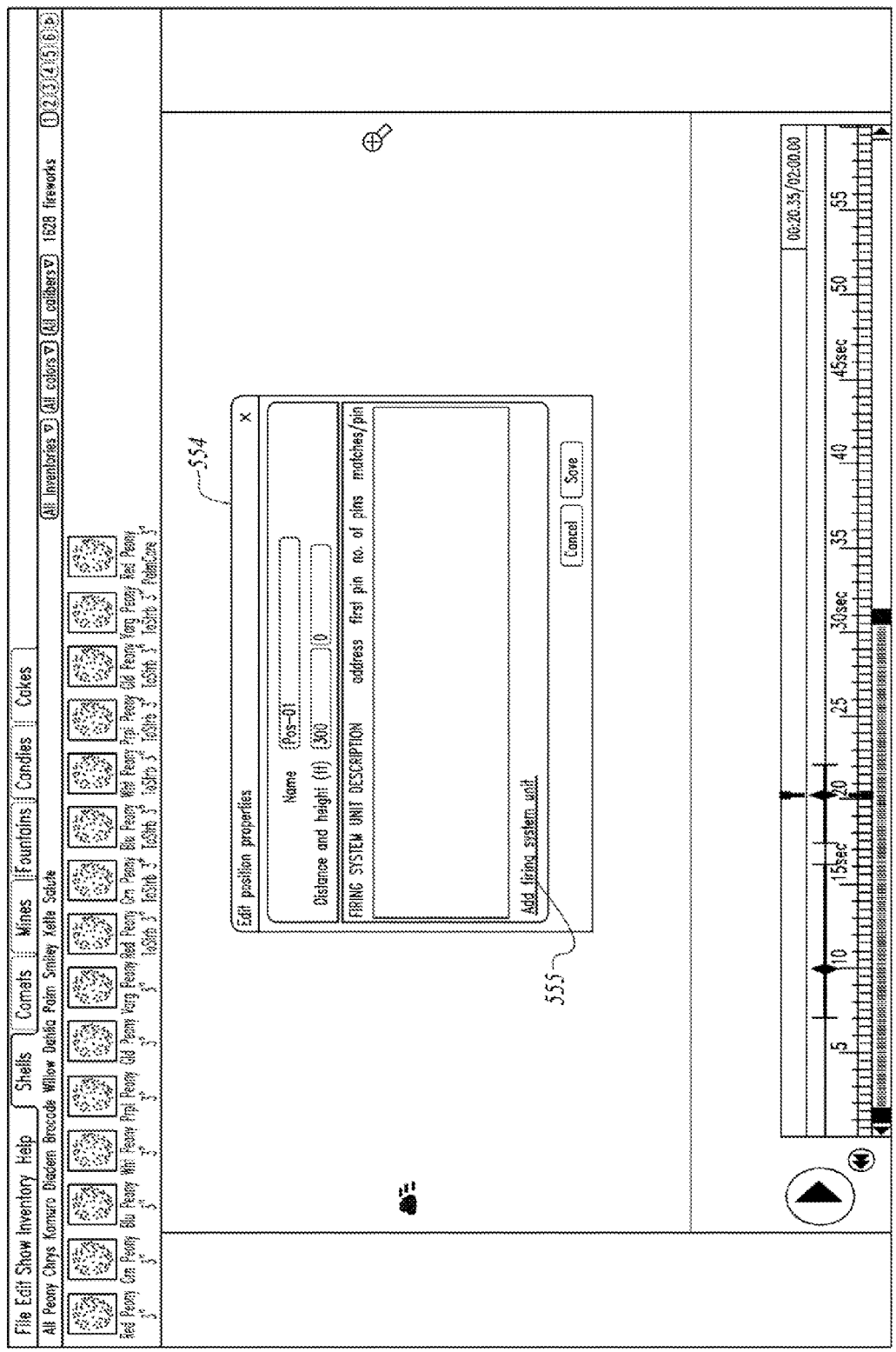
Figure 28:
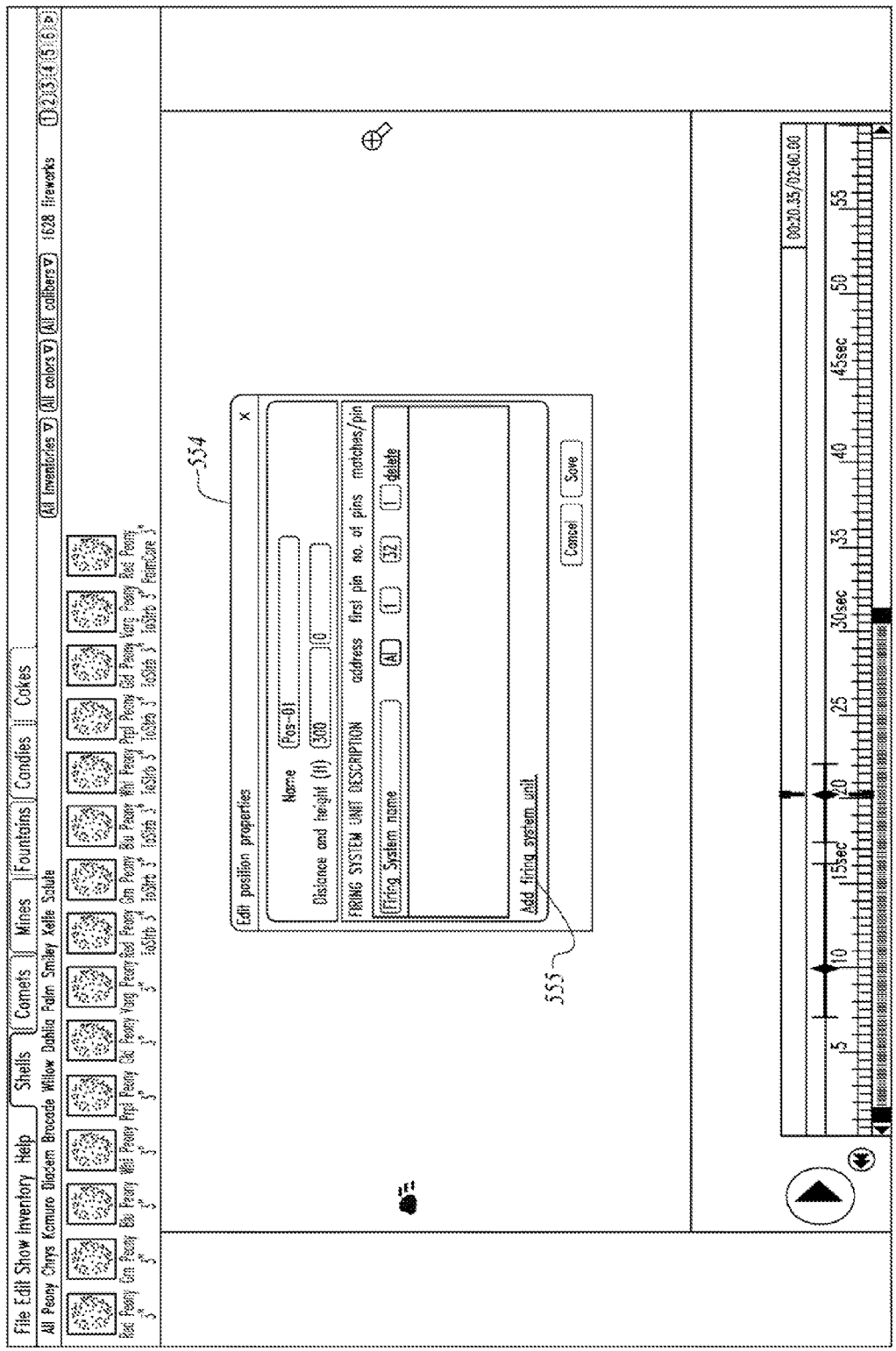

Referring now to FIG. 26, a new launch position 552 has been created and selected using the pointing device. As a result, an Edit icon 553 is displayed for the user. When the user clicks on this Edit icon 553, the user interface screen shown in FIG. 27 is displayed. As shown in FIG. 27, a launch position edit box 554 is displayed in response to user activation of the Edit icon 553. The launch position edit box 554 enables the user to enter a name and position for the new launch position 552. The user can also use the provided button 555 to configure a particular firing system for the new launch position 552. When the user clicks on firing system button 555, the user interface screen shown in FIG. 28 is displayed. As shown in FIG. 28, a particular firing system can be added to the new launch position 552 in response to user activation of the firing system button 555. Additionally, the user can enter the name of the firing system and the pin configuration associated with the firing system. The pins of a firing system are the electrical connection points that attach to the firework fuses and ignite the fireworks when energized with a voltage. As described in more detail below, the automatic determination of firing system pin assignments provided by the various embodiments is important to assure that the appropriate firework is launched when the corresponding pin is energized.

Figure 29:
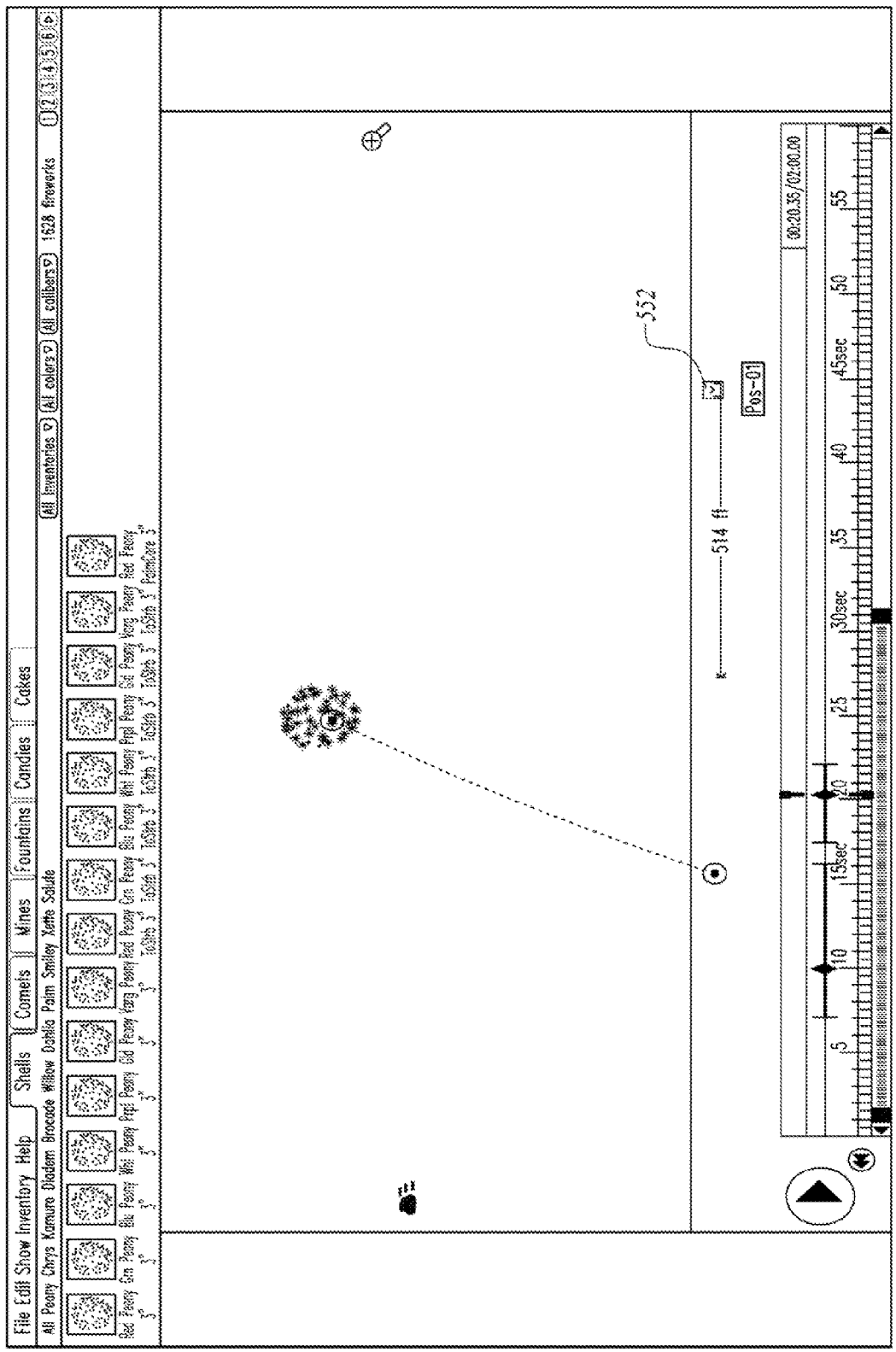

Referring now to FIG. 29, the new launch position 552 has been created and selected using the pointing device. Using drag and drop techniques and as shown in FIG. 29, the user can drag the new launch position 552 to any location in the sky field 510. The system provides a measurement from the previous position to the current position to aid the user in accurately positioning the launch position. This drag and drop technique is a user interface improvement over the conventional techniques of configuring a launch position from a menu or dialog or typing in the launch position coordinates, rather than dragging and dropping the launch position in the sky field 510.

Combining Manual and Automatic Pin Assignments—

Pin assignments are used to specify which pins on a firing system unit to connect to which fireworks. Obviously, when the firing system causes a voltage to be applied to a pin to light a firework, it is important that the correct firework be ignited. Thus, pin assignments are very important. In conventional systems, pyrotechnicians calculated pin assignments either manually, by specifying for each firework, or automatically, by asking a computer program to calculate the pin assignments by considering all of the required ignitions, combining ignitions at the same time and sometimes assigning ignitions to the same pin up to a limit specified by the user (often about 6), determining how many firing system units are required at each launch position, and finally relating the pins of those units to the ignitions at that launch position. The problem is, conventional computer programs that calculated pin assignments would overwrite any manual pin assignments. Even though pyrotechnicians could start with the automatic assignments from a computer program and then modify some assignments manually, if the pyrotechnician wants the computer program to recalculate the assignments and preserve his manual changes, convention systems cannot provide this functionality. An embodiment solves this problem by combining manual and automatic pin assignments.

In an example embodiment, a set of pin assignment constraints is maintained. Then, the automatic pin assignments can be updated in a way that satisfies the pin assignment constraints. The pin assignment constraints can be defined or changed whenever any firework is added, removed, or moved in a fireworks show. If a user makes a manual pin assignment, that manual pin assignment becomes a constraint that the automatic pin assignment process of an embodiment cannot disregard or overwrite. Similarly, if the user specifies specific firing system module configurations at the user configured launch positions, those firing system module configurations become constraints (such as the number of pins on the unit, the maximum number of ignitions per pin, and possible filters such as the requirement that all pins on a particular unit are attached to none other than fireworks of a specific size or launch angle).

In an example embodiment, the basic automatic pin assignment process walks through the firework ignitions in order. For each firework ignition, the process considers a set of existing firing system units at the same launch position that still have available pins. If an assignment to any of the available pins of an existing firing system unit at the same launch position satisfies all the constraints, then the pin assignment is made; otherwise a new firing system unit is added to the launch position to accommodate the ignition. If a user has made a manual assignment of a pin at one launch position, then the automatic pin assignment process must avoid assigning that pin to a launch at a different time. Similarly, if the pin has the capacity for multiple ignitions, then the automatic pin assignment process can assign additional ignitions automatically to the manually assigned pin until the pin's capacity is reached. As another example, sometimes pyrotechnicians choose to ignite a firework at one launch position from a firing system unit at another launch position, running a wire between them. The automatic pin assignment process of an embodiment can support that choice.

Figure 30:
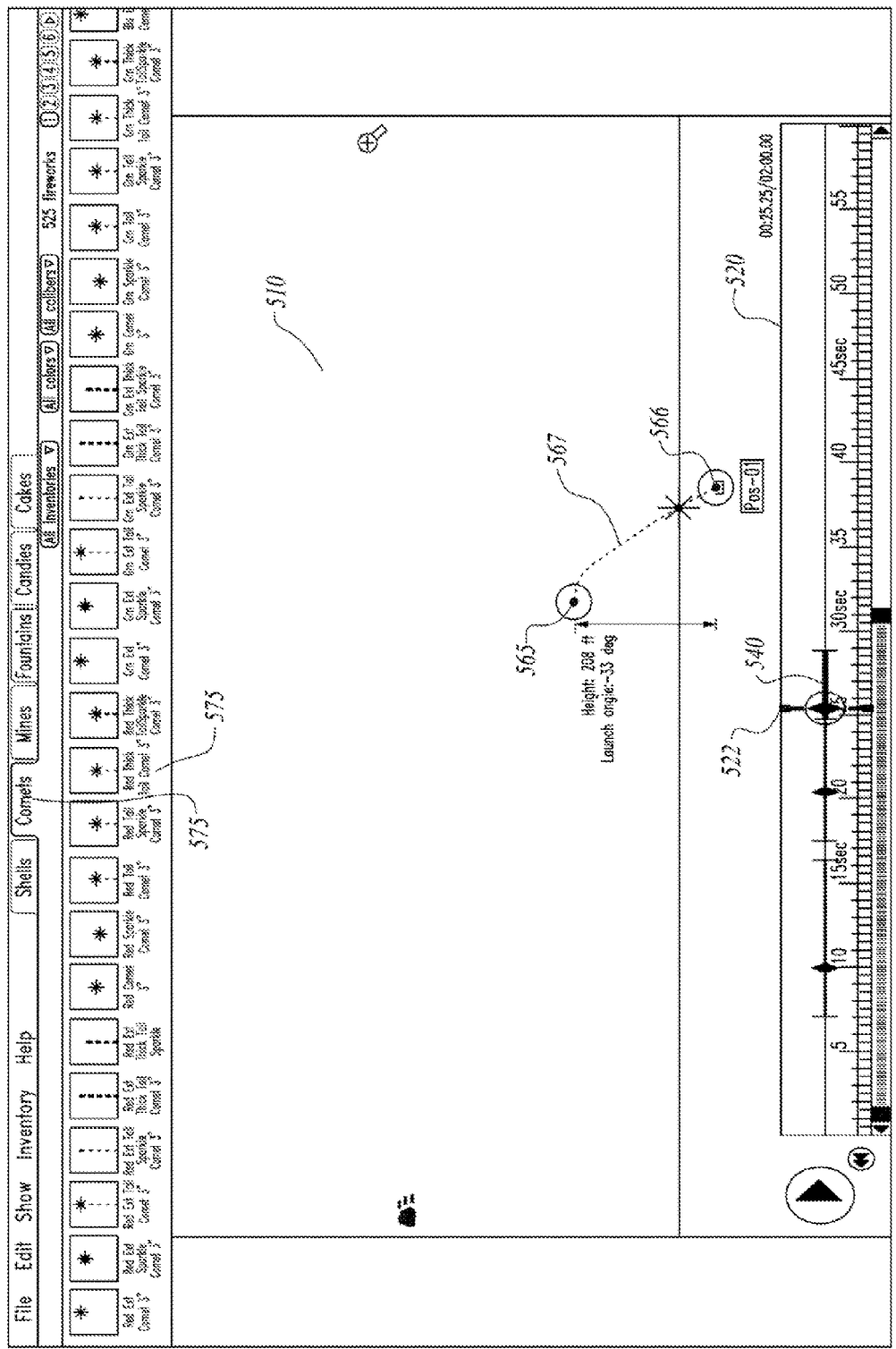
FIG. 30 illustrates the addition of a firework from the inventory of 'comet' type fireworks.
Figure 36:
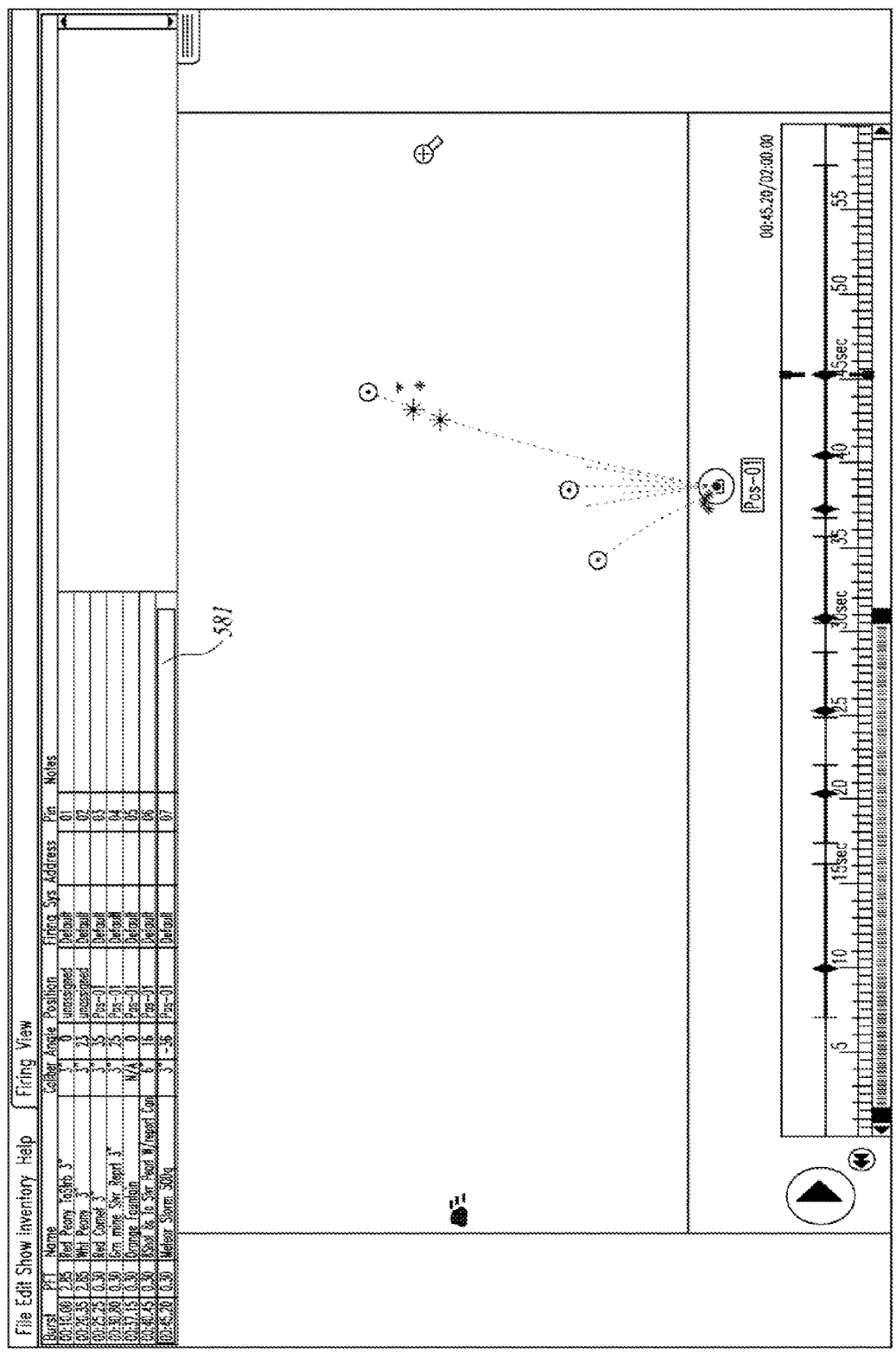
FIG. 36 illustrates the firework firing data set corresponding to the fireworks added to the sample firework show.

Referring now to FIGS. 30 through 34, an example embodiment illustrates the addition of several new fireworks of different types to a sample fireworks show. FIG. 30 illustrates the addition of a firework from the inventory 575 of 'comet' type fireworks. Note that the comet firework can be added by drag and drop techniques to the sky field 510 as described above. Note also that once added, the new firework is displayed in the sky field 510 at a user configured break position 565, from a user configured launch position 566, with a highlighted trajectory 567 as shown in FIG. 30. The firework timing bar 540 is also automatically added to the timeline 520 by the system at the position of the playhead 522. As illustrated in FIG. 36, the system also automatically assigns a firing pin location for the added firework. The pin assignment can be based on the constraints as described above.

Figure 31:
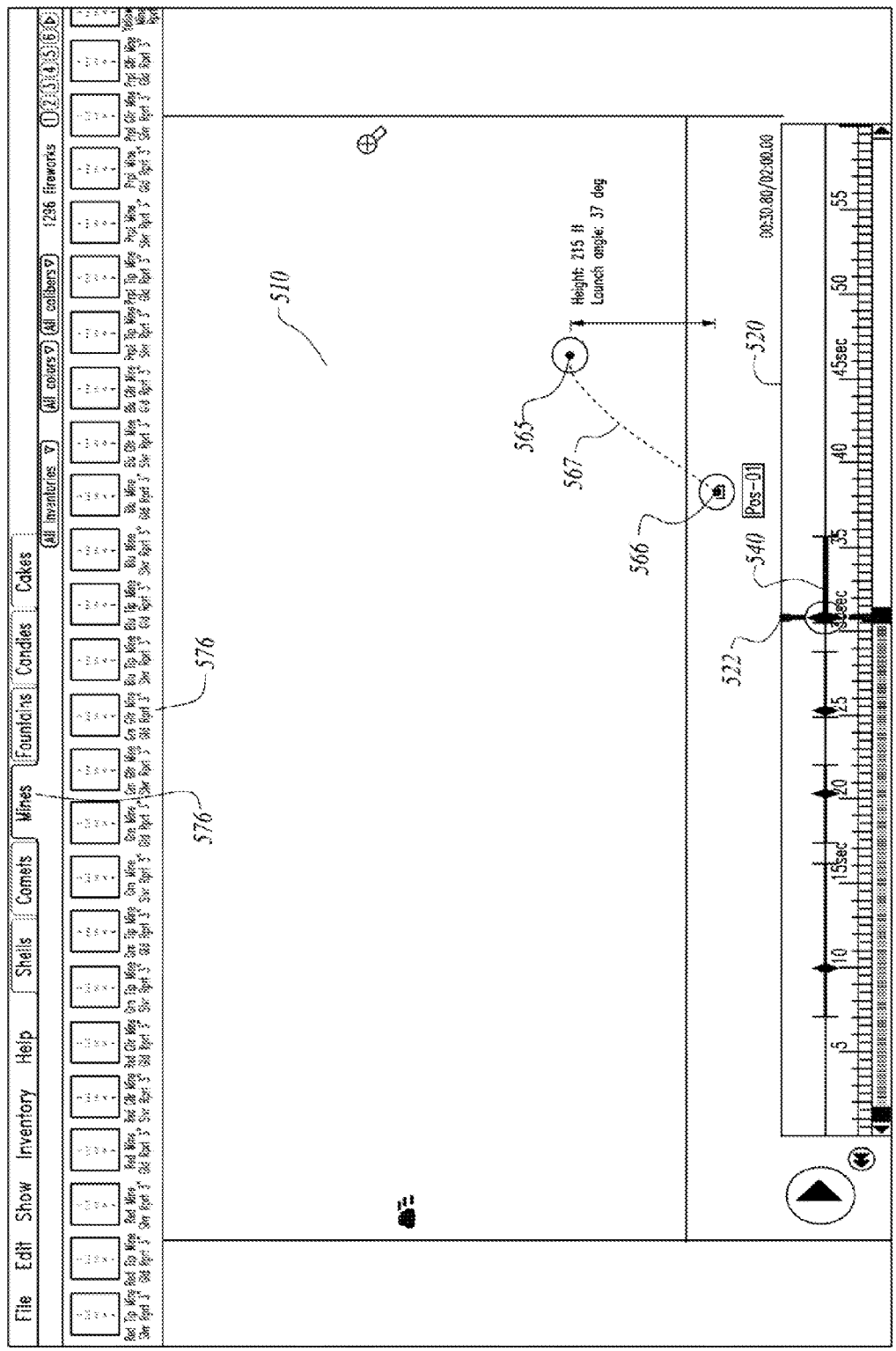
FIG. 31 illustrates the addition of a firework from the inventory of 'mine' type fireworks.

FIG. 31 illustrates the addition of a firework from the inventory 576 of 'mine' type fireworks. Note that the mine firework can be added by drag and drop techniques to the sky field 510 as described above. Note also that once added, the new firework is displayed in the sky field 510 at a user configured break position 565, from a user configured launch position 566, with a highlighted trajectory 567 as shown in FIG. 31. The firework timing bar 540 is also automatically added to the timeline 520 by the system at the position of the playhead 522. As illustrated in FIG. 36, the system also automatically assigns a firing pin location for the added firework. The pin assignment can be based on the constraints as described above.

Figure 32:
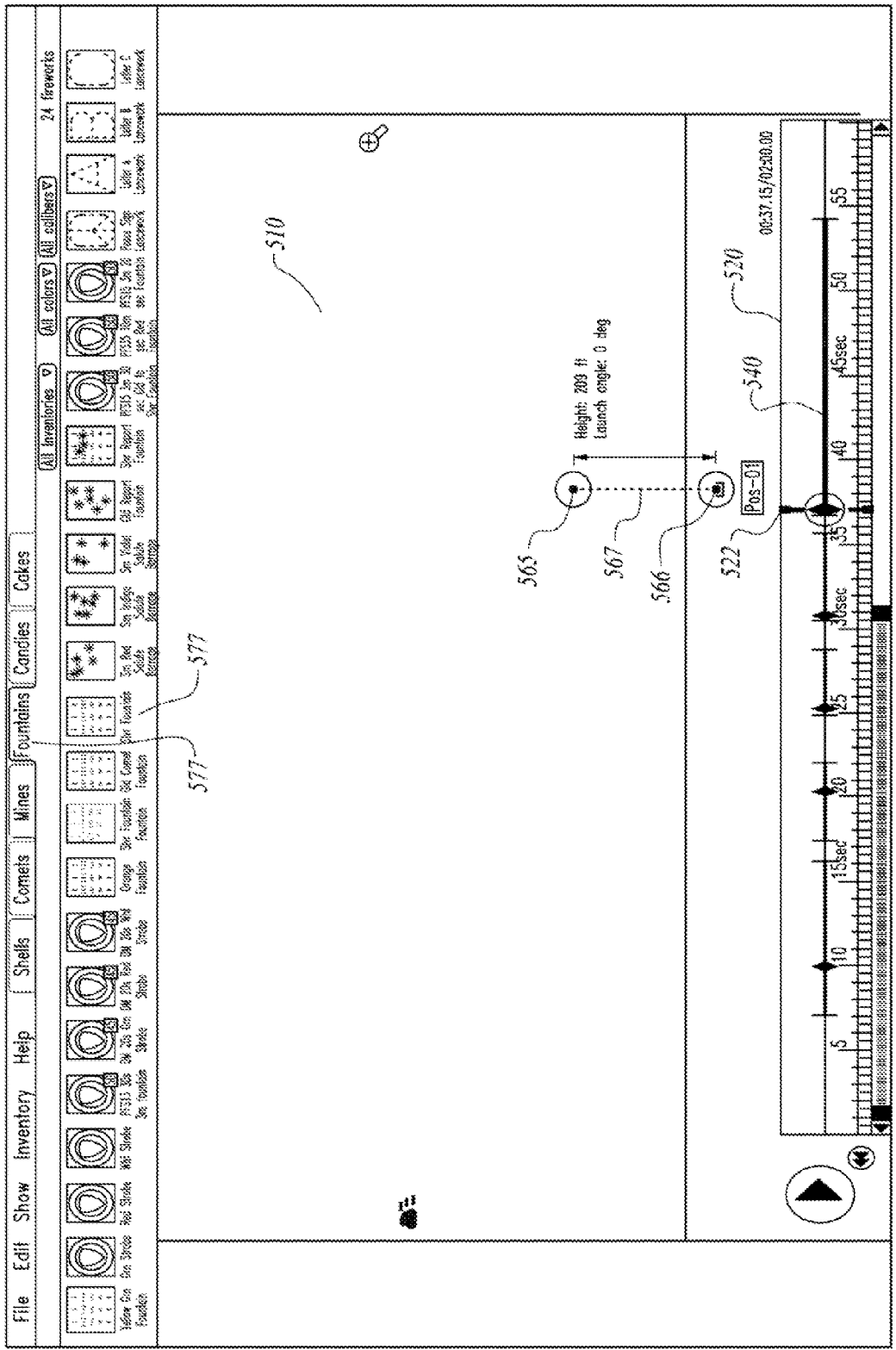
FIG. 32 illustrates the addition of a firework from the inventory of 'fountain' type fireworks.

FIG. 32 illustrates the addition of a firework from the inventory 577 of 'fountain' type fireworks. Note that the fountain firework can be added by drag and drop techniques to the sky field 510 as described above. Note also that once added, the new firework is displayed in the sky field 510 at a user configured break position 565, from a user configured launch position 566, with a highlighted trajectory 567 as shown in FIG. 32. The firework timing bar 540 is also automatically added to the timeline 520 by the system at the position of the playhead 522. As illustrated in FIG. 36, the system also automatically assigns a firing pin location for the added firework. The pin assignment can be based on the constraints as described above.

Figure 33:
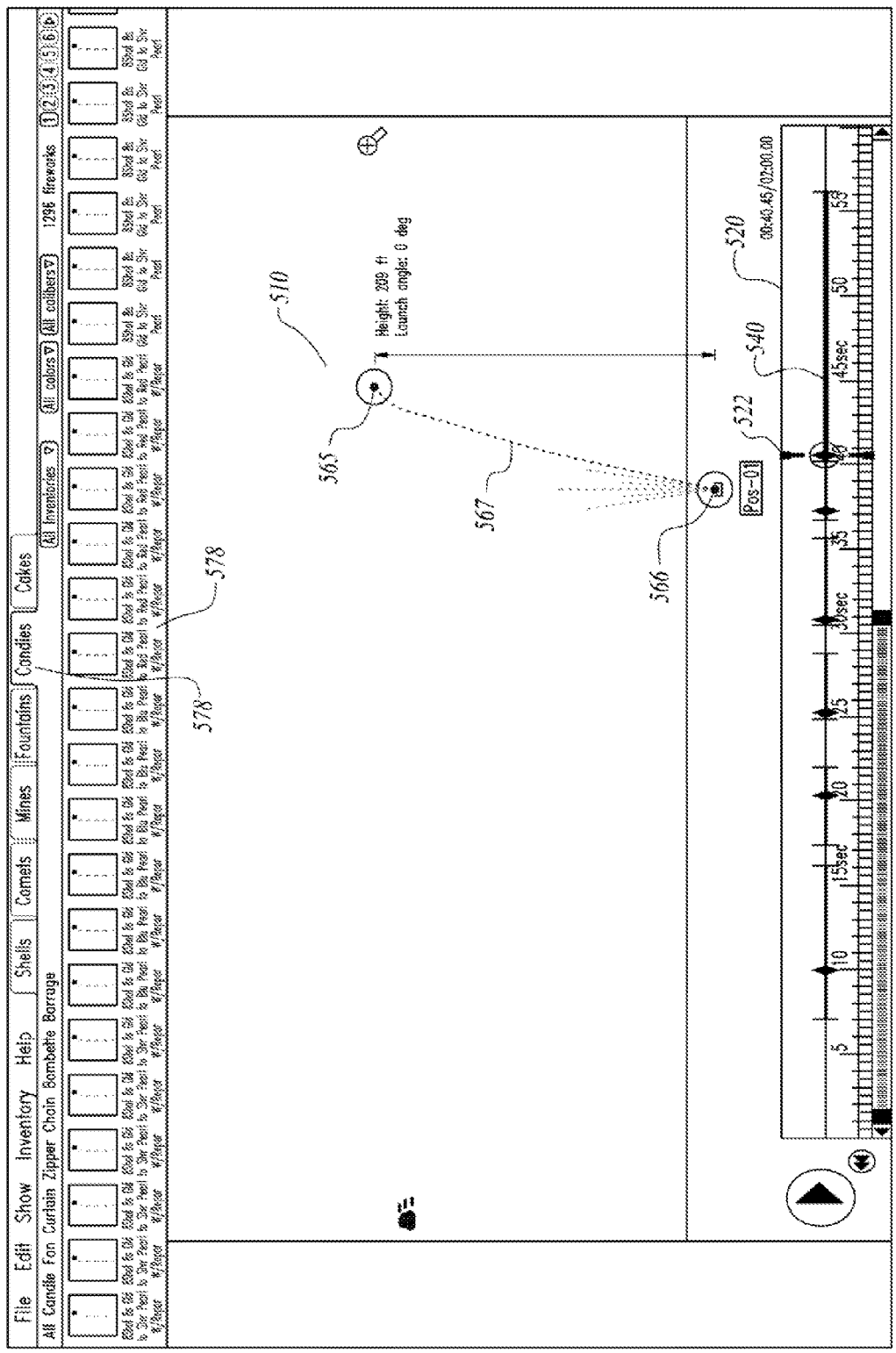
FIG. 33 illustrates the addition of a firework from the inventory of 'candle' type fireworks.

FIG. 33 illustrates the addition of a firework from the inventory 578 of 'candle' type fireworks. Note that the candle firework can be added by drag and drop techniques to the sky field 510 as described above. Note also that once added, the new firework is displayed in the sky field 510 at a user configured break position 565, from a user configured launch position 566, with a highlighted trajectory 567 as shown in FIG. 33. The firework timing bar 540 is also automatically added to the timeline 520 by the system at the position of the playhead 522. As illustrated in FIG. 36, the system also automatically assigns a firing pin location for the added firework. The pin assignment can be based on the constraints as described above.

Figure 34:
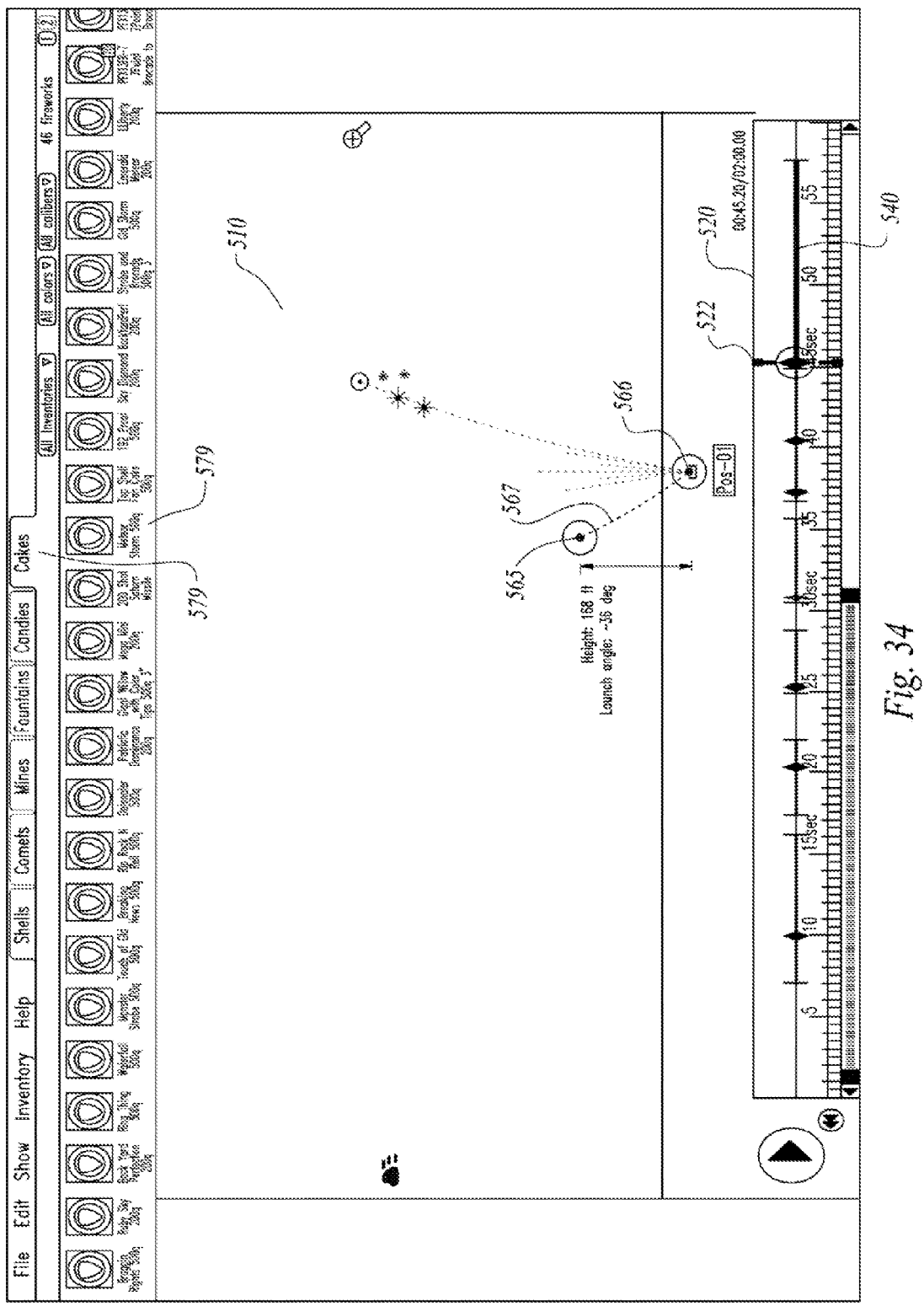
FIG. 34 illustrates the addition of a firework from the inventory of 'cake' type fireworks.

FIG. 34 illustrates the addition of a firework from the inventory 579 of 'cake' type fireworks. Note that the cake firework can be added by drag and drop techniques to the sky field 510 as described above. Note also that once added, the new firework is displayed in the sky field 510 at a user configured break position 565, from a user configured launch position 566, with a highlighted trajectory 567 as shown in FIG. 34. The firework timing bar 540 is also automatically added to the timeline 520 by the system at the position of the playhead 522. As illustrated in FIG. 36, the system also automatically assigns a firing pin location for the added firework. The pin assignment can be based on the constraints as described above.

Figure 35:
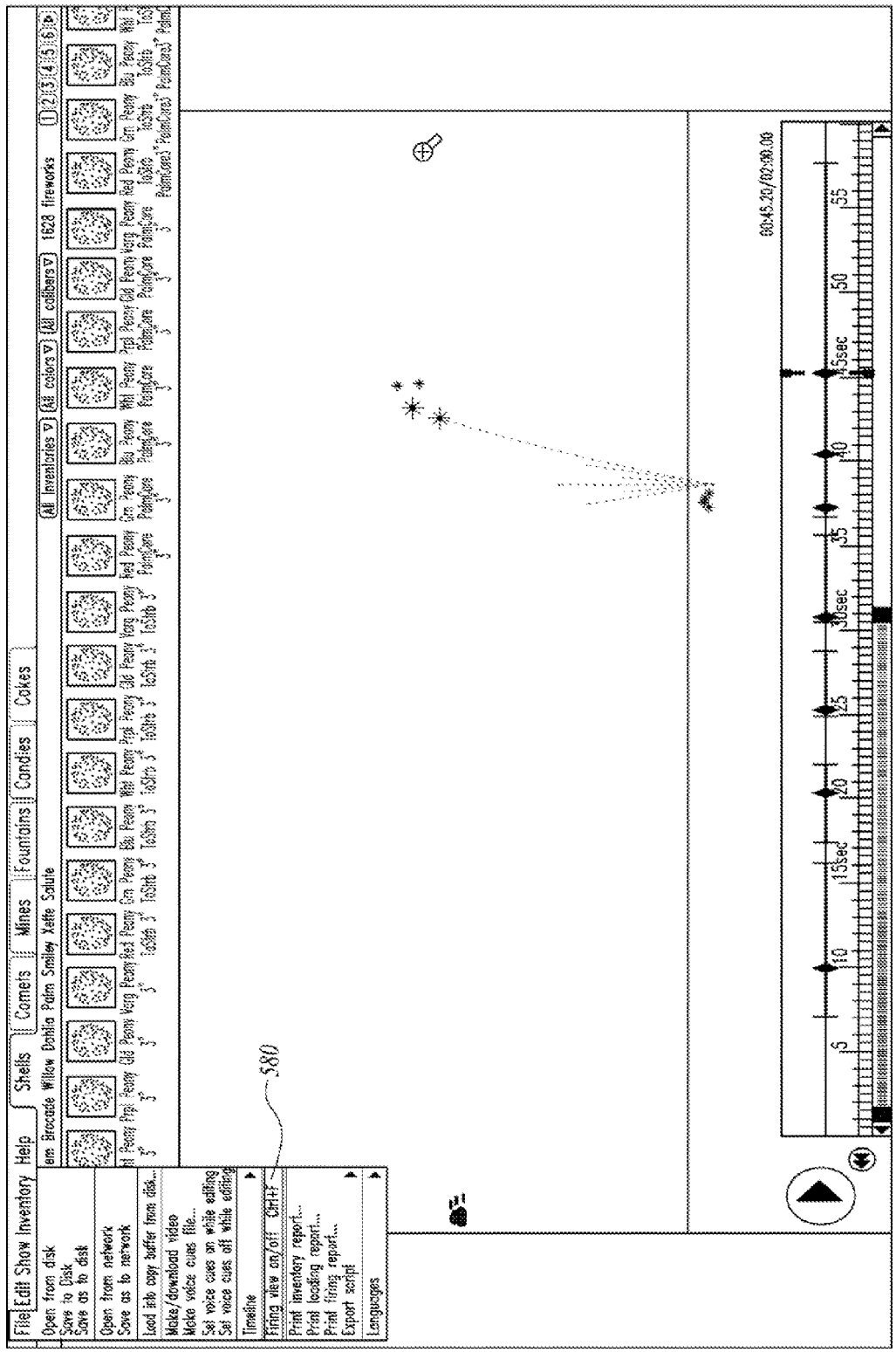
FIG. 35 illustrates the option to view the firing data corresponding to the fireworks added to the sample firework show.

Referring now to FIG. 35 and given the fireworks added to the firework show as illustrated in FIGS. 30 through 34, an example embodiment illustrates the option 580 to view the firing data corresponding to the fireworks added to the sample firework show. As a result of a user selecting the Firing View On command selection 580, the user interface screen shown in the example of FIG. 36 is illustrated. FIG. 36 illustrates the firework firing data set 581 corresponding to the fireworks added to the sample firework show as described above. Note that for each firework in the sample firework show, the firework firing data set 581 includes the burst or break time for the firework, the pre-fire timing (PFT), the caliber of the shell, the launch angle, the launch position, the firing system being used to launch the particular firework, and the address and pin number of the pin used to launch the particular firework. A particular firing system can have several modules, which can each be individually addressed using the 'address' parameter of the firework firing data set 581. Each addressed module can have a plurality of pins, which can be identified using the 'pin' parameter of the firework firing data set 581. In this manner, each pin of the firing system can be uniquely addressed using the 'address' and 'pin' parameters of the firework firing data set 581. The firework firing data set 581 can be automatically generated by the system of various embodiments. The firework firing data set 581 can precisely define the sequence of firework launches from various launch locations, which thereby precisely defines the content of a user configured firework show.

Figure 38:
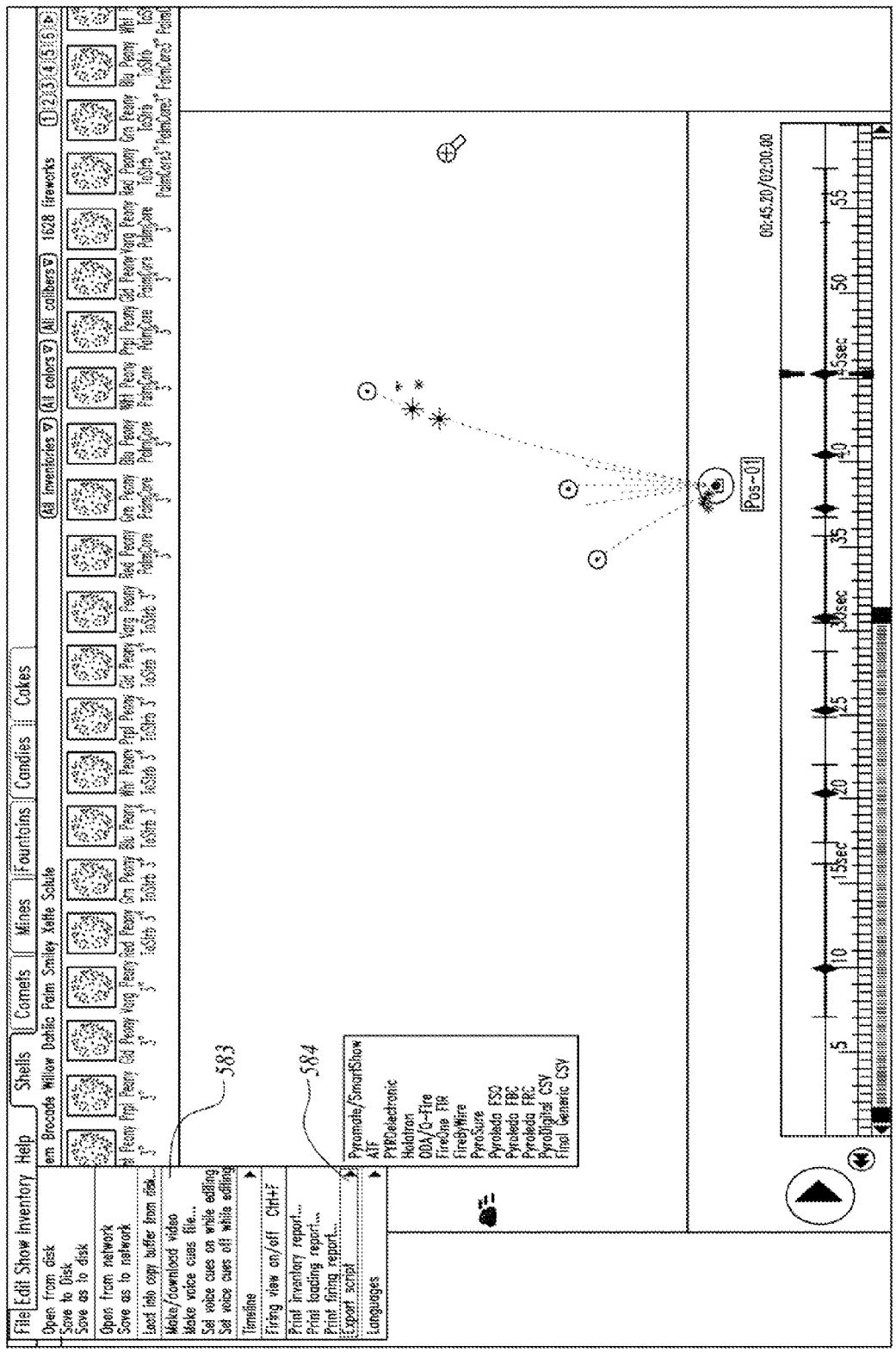
FIG. 38 illustrates an "Export script" menu item with further specification of various script formats for firing system hardware made by various manufacturers.

Referring now to FIG. 38, one embodiment provides an "Export script" menu item 584 with further specification of various script formats for firing system hardware made by various manufacturers. The "Export script" menu item creates a machine readable script file containing timing information and pin assignment information from the firing data set 581, written in a format that firing system hardware devices can read and use to specify and control the sequence of launches. Referring again to FIG. 38, the "Print report" menu items just above the "Export script" menu item 584 similarly create human readable reports based on the firing data set 581, arranged and redacted in formats that are useful for setting up and operating a fireworks show.

Integrating Voice Cues with User Editing—

A voice cues track is an audio file that a pyrotechnician can listen to while shooting a show manually. The audio file tells the pyrotechnician when to ignite each firework, to keep time with the music and the design of the show. Because fireworks have a delay between when they are ignited (launched) and their point of visual impact (break), the audio file's cues must account for that delay, prompting the pyrotechnician to ignite the firework in advance of the time that the visual impact is desired. Conventional firework software programs have had the capability to create voice cue tracks for a firework show design. Pyrotechnicians could select a menu item in the software to generate a voice cue track for an existing show design. The problem with that approach is that the show design might yield a voice cues track with some voice cues that are too close together for a human to distinguish. This problem may not be obvious at the time of designing and editing the show; because, the delays of different fireworks can be different lengths. Thus, while designing a show with conventional systems, it may appear that two fireworks have their visual impact sufficiently far apart while in fact the differences in the pre-fire delays of the fireworks can cause their ignitions to occur very close together. Thus, the practical considerations of being able to coordinate the firing of fireworks in accordance with a voice cues track may need to influence the design of the show. However, generating the voice cues track after the show design is done is too late.

Figure 37:
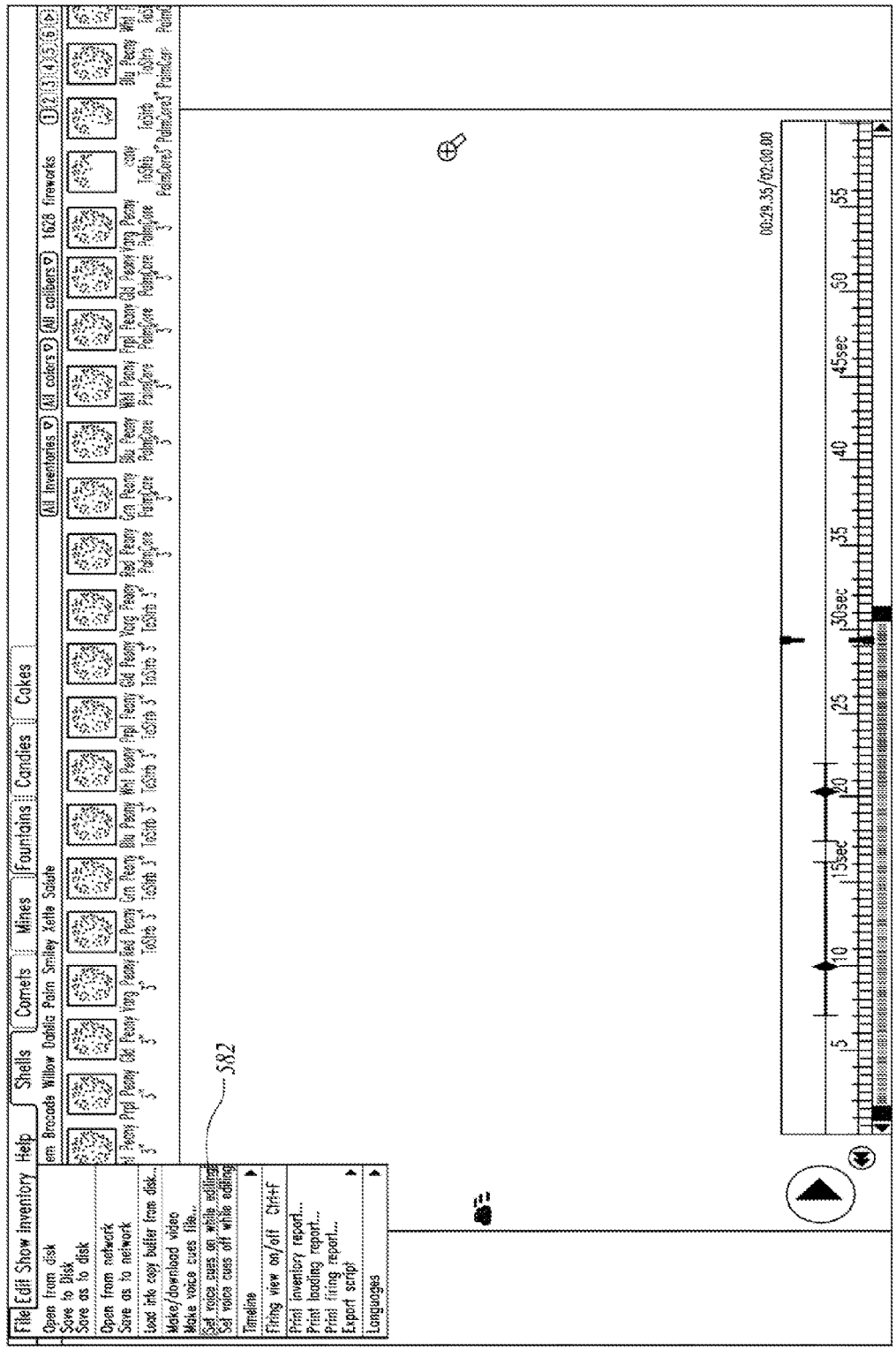
FIG. 37 illustrates a command option to 'Set Voice Cues On While Editing'.

Referring now to FIG. 37, an example embodiment provides a command option 582 to 'Set Voice Cues On While Editing'. This option allows a firework show designer to integrate the generation of the voice cues track with the user firework show editing process. As a result, an embodiment can regenerate the voice cues track automatically during the editing process whenever fireworks are added, removed, or shifted in time during the design of the fireworks show. Whenever the user plays the firework show simulation in the editing process starting from the playhead (CTM) position, an embodiment cues the voice cues track to that time and starts playing the voice cues along with the simulation. In this manner, the user can determine if the editing changes result in a practical voice cues track, and can modify the changes to make the voice cues track practical if it is not.

Generating and Hosting Videos of Fireworks Show Simulations Over a Network—

Fireworks display salesmen benefit from being able to show a video of their past fireworks shows and simulations of prospective fireworks shows to potential customers. Simulation videos are thus a valuable sales tool. If simulations are easy enough to make, a salesman can make and show the client multiple simulations exploring various possibilities at different prices, and thereby convince the client to buy a particular show based on a visual understanding of how much better it would be than the alternatives. Conventional fireworks design software have offered the feature of creating video simulations created on the designer's own personal computer that is running the design software. However, the problems with this approach are that the video files are large and therefore difficult to send to the client electronically; also, it may not be legally or technologically practical to integrate the technology to create compressed video files in the desired formats on the user's personal computer. An embodiment solves this problem with a system by which users can upload a show simulation script and the related multi-media assets such as sound tracks, and the like to a host site. As illustrated in FIG. 38, a user can select a command option 583 to make a video. The host site can combine the assets and simulation script on the host site server to generate a video, which the host site can then compress either on its own computers or using an third party service over a network to generate a compressed video file. The host site can then allow the user to download the compressed video file. Additionally, the host site can host the video for streamed viewing on its own webservers, so a salesman can send a client the link, or web address, of the video and the client can see the video without downloading anything. The salesman can choose to make the link public, or the salesman can attach a password requirement or other access privilege restriction to it so the video cannot be seen by the salesman's competitors.

Figure 39:
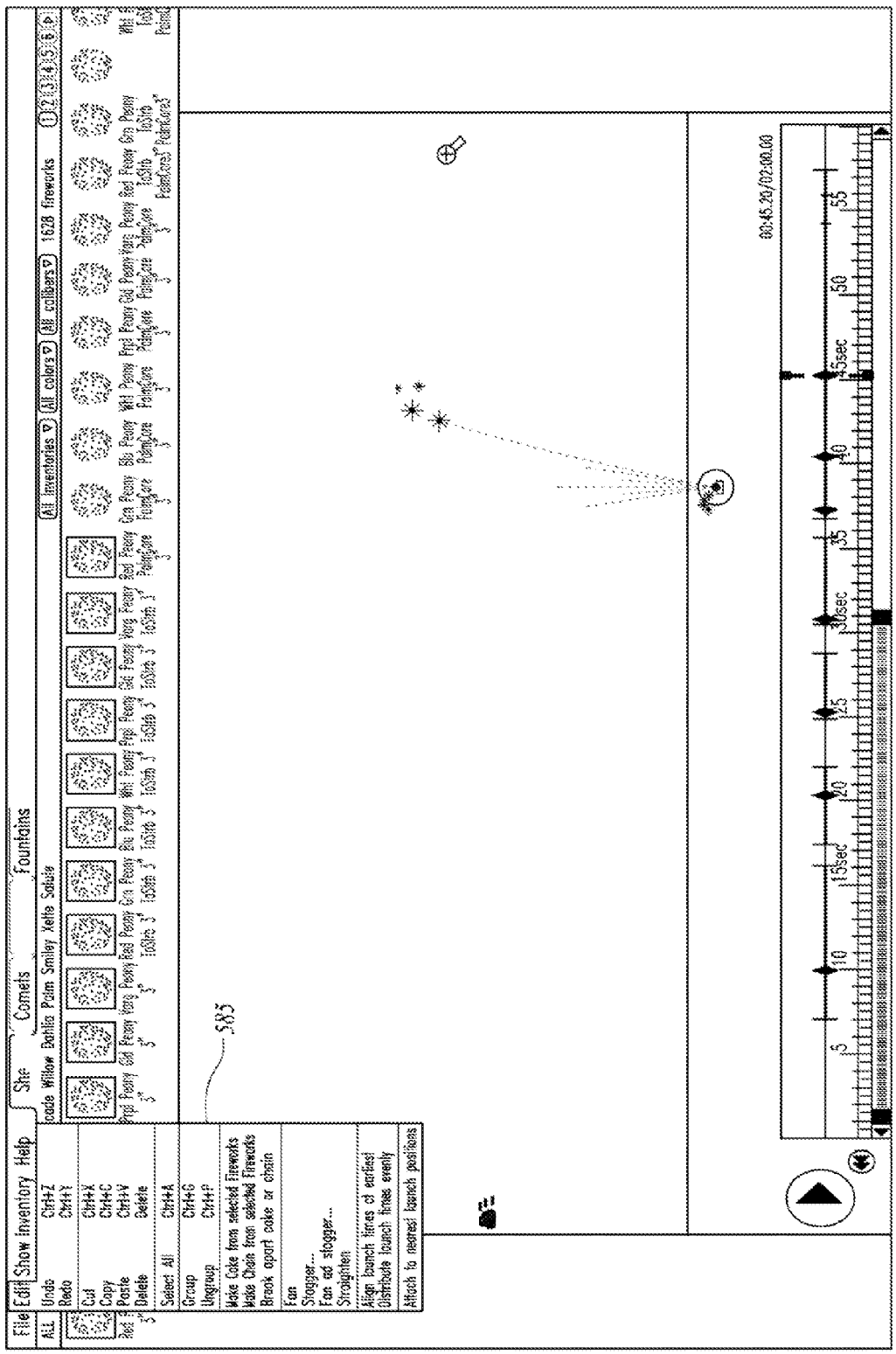
FIG. 39 illustrates an additional set of command options available to a user under an Edit tab on the user interface screen.

FIG. 39 illustrates an additional set of command options available to a user under an Edit tab on the user interface screen.

Figure 40:
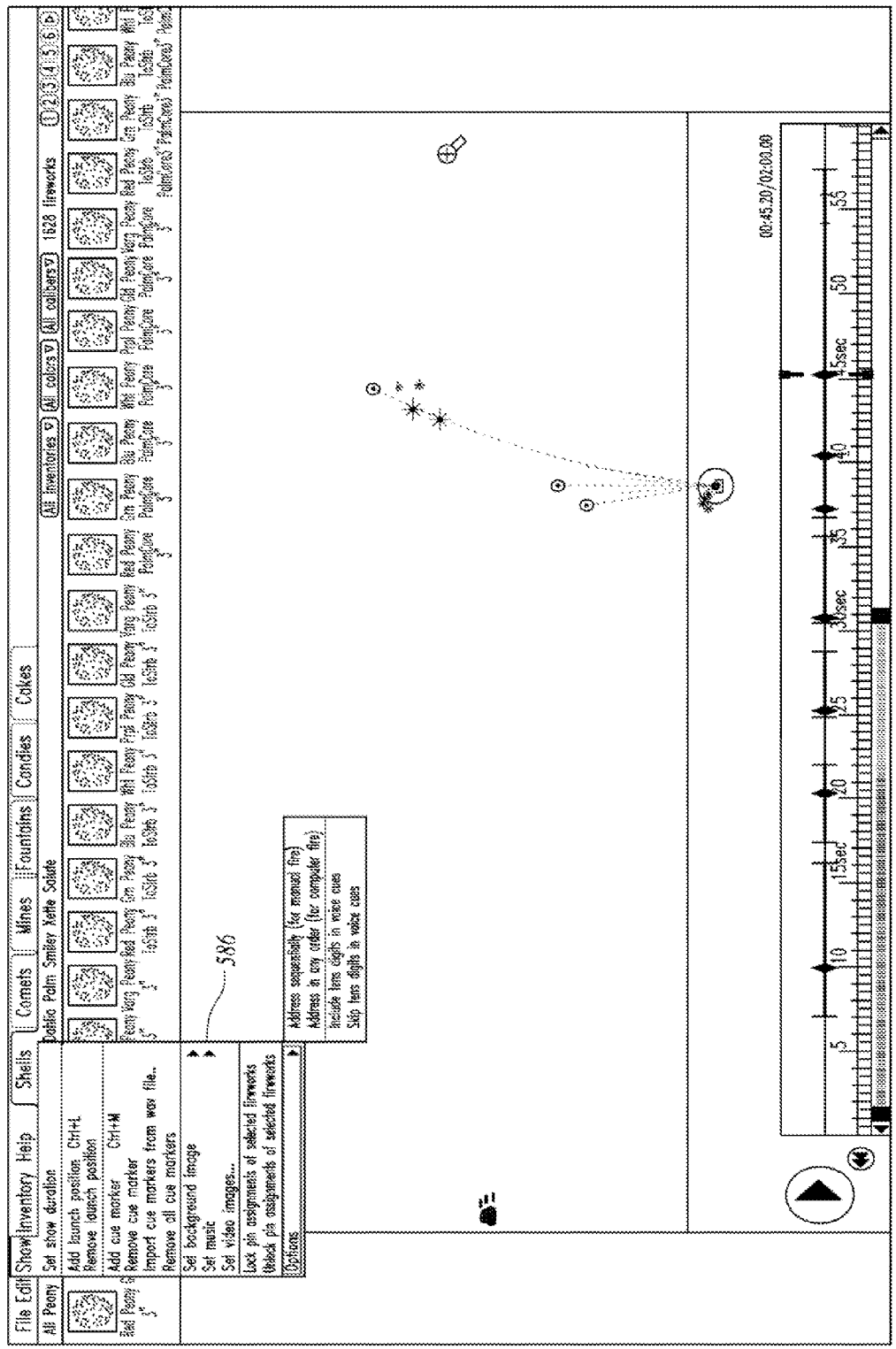
FIG. 40 illustrates an additional set of command options available to a user under a Show tab on the user interface screen.

FIG. 40 illustrates an additional set of command options available to a user under a Show tab on the user interface screen.

Figure 41:
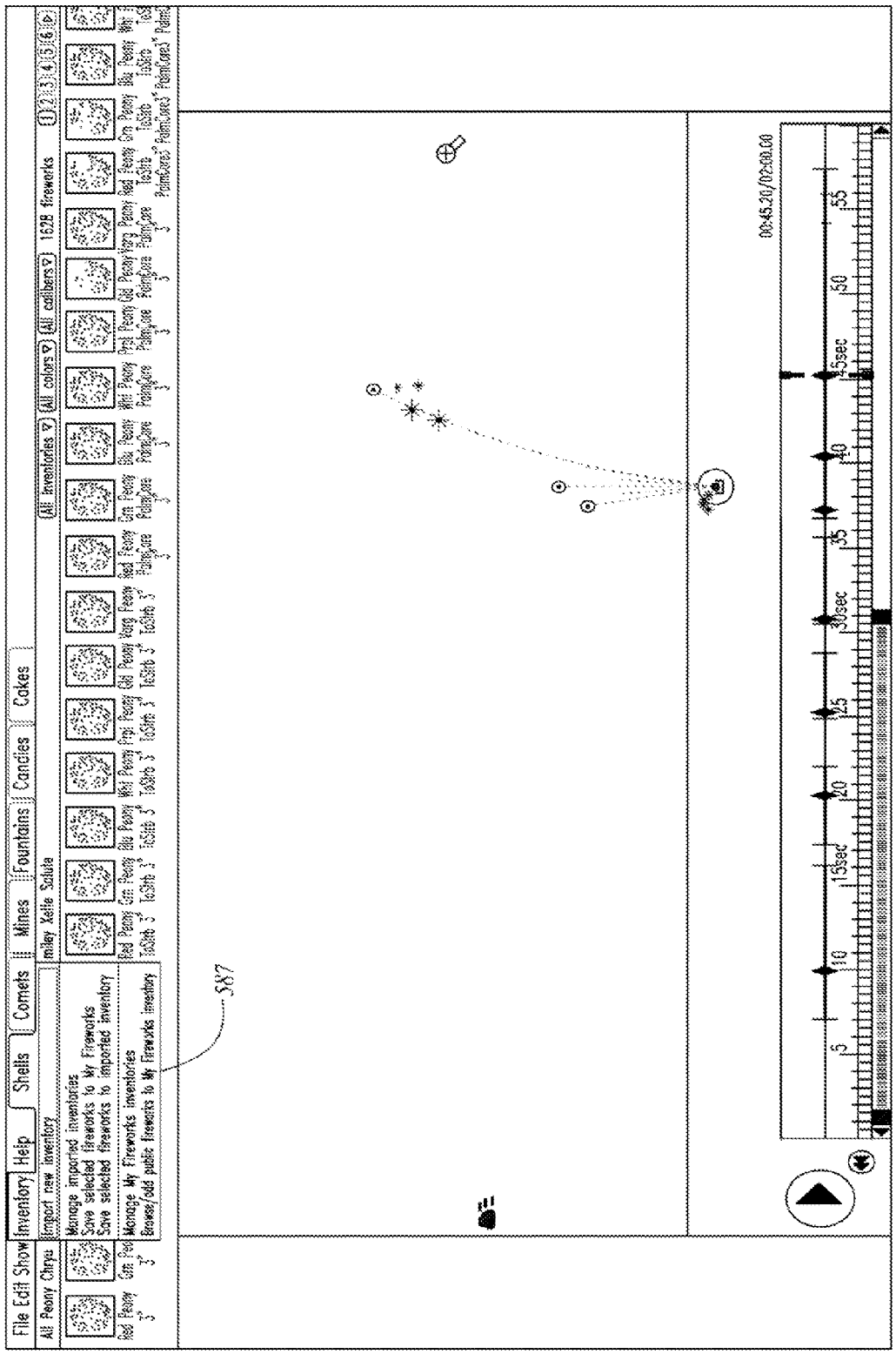
FIG. 41 illustrates an additional set of command options available to a user under an Inventory tab on the user interface screen.
Figure 42:
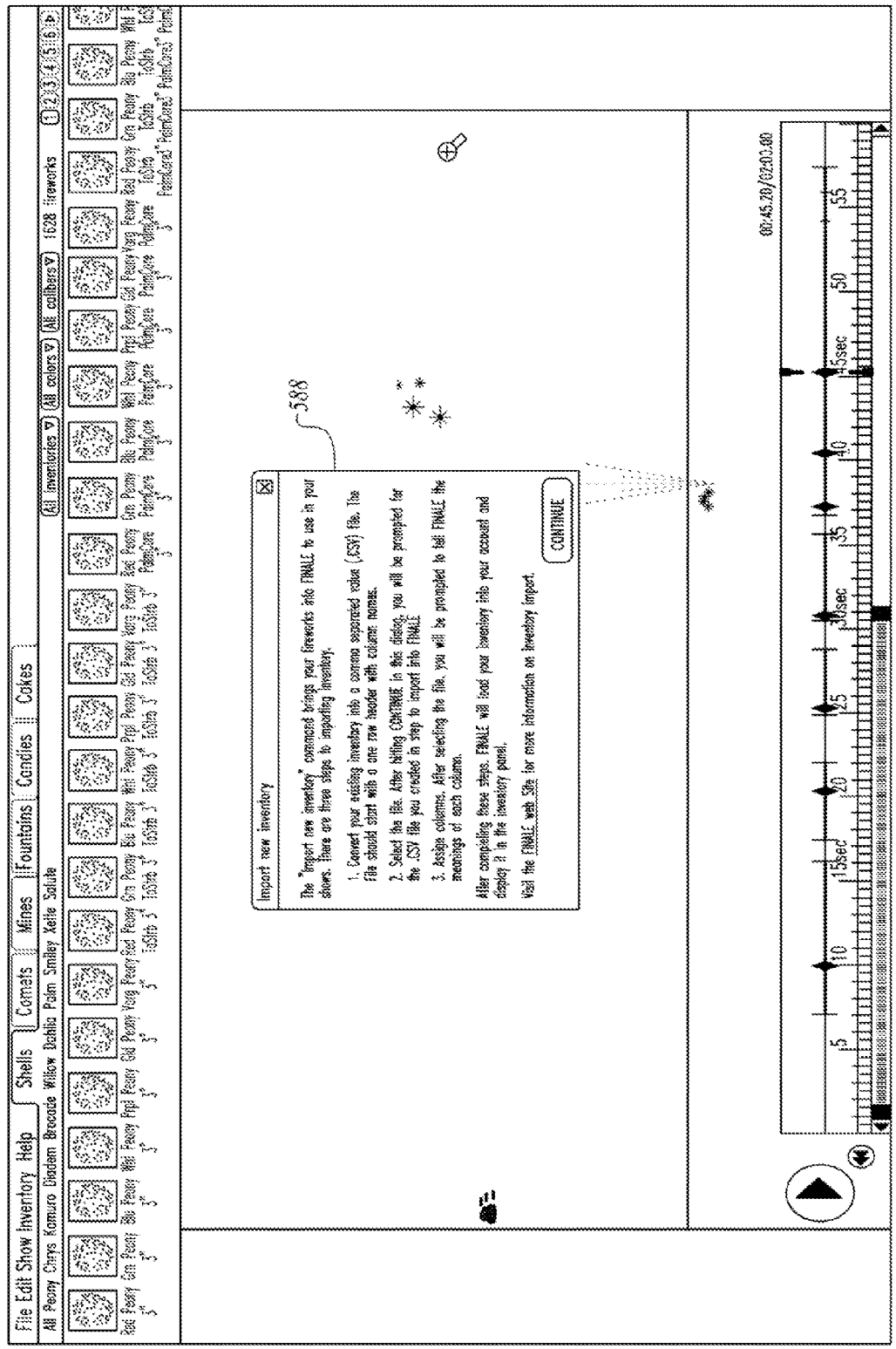
FIG. 42 illustrates a feature and process in an example embodiment wherein a user can import new firework inventory into the database.

FIG. 41 illustrates an additional set of command options available to a user under an Inventory tab on the user interface screen. FIG. 42 illustrates a feature and process in an example embodiment wherein a user can import new firework inventory into the database 105.

Figure 43:
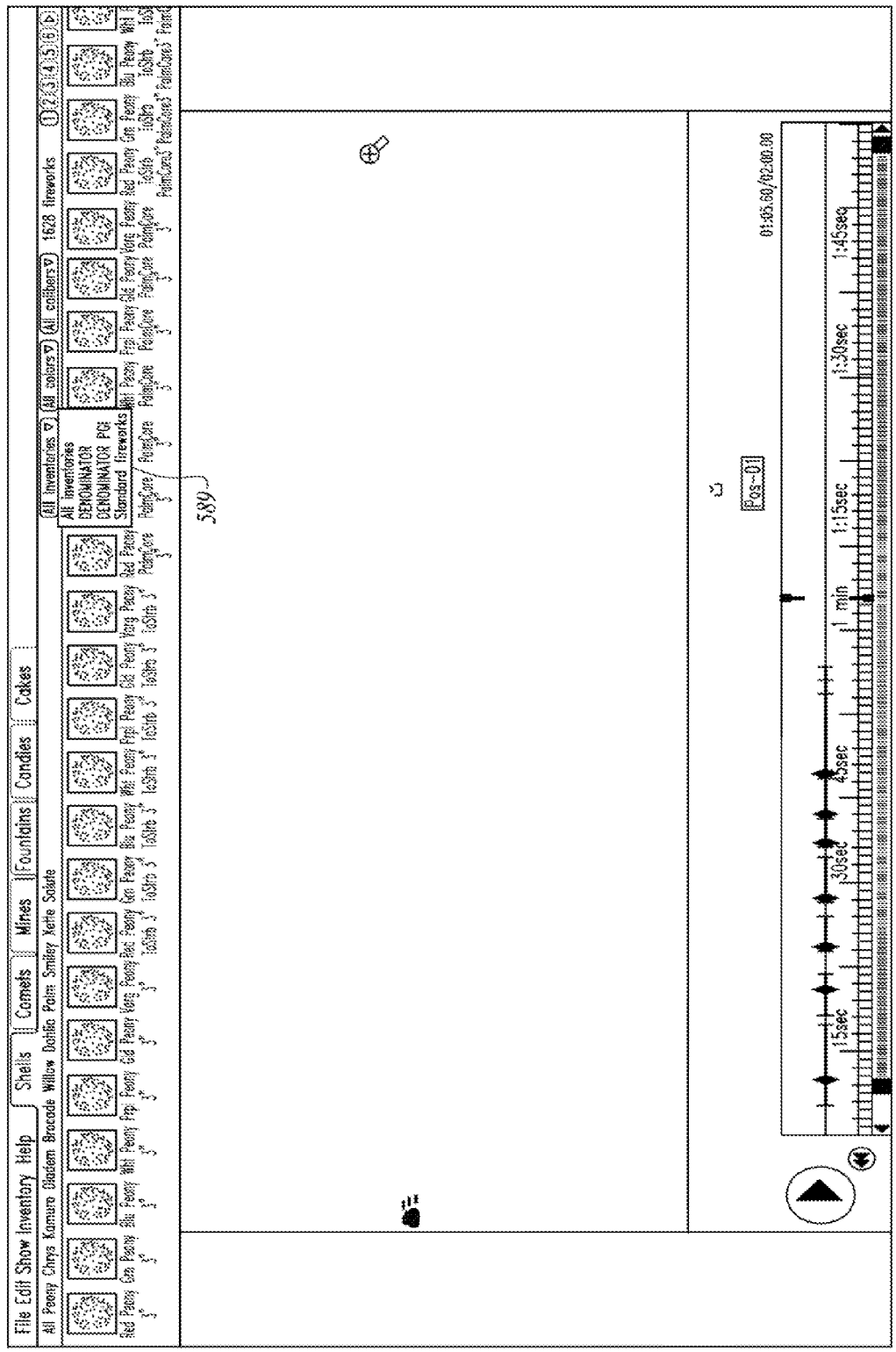
FIG. 43 illustrates an additional set of command options available to a user under an Inventory drop down item on the user interface screen.

FIG. 43 illustrates an additional set of command options available to a user under an Inventory drop down item 589 on the user interface screen.

Figure 44:
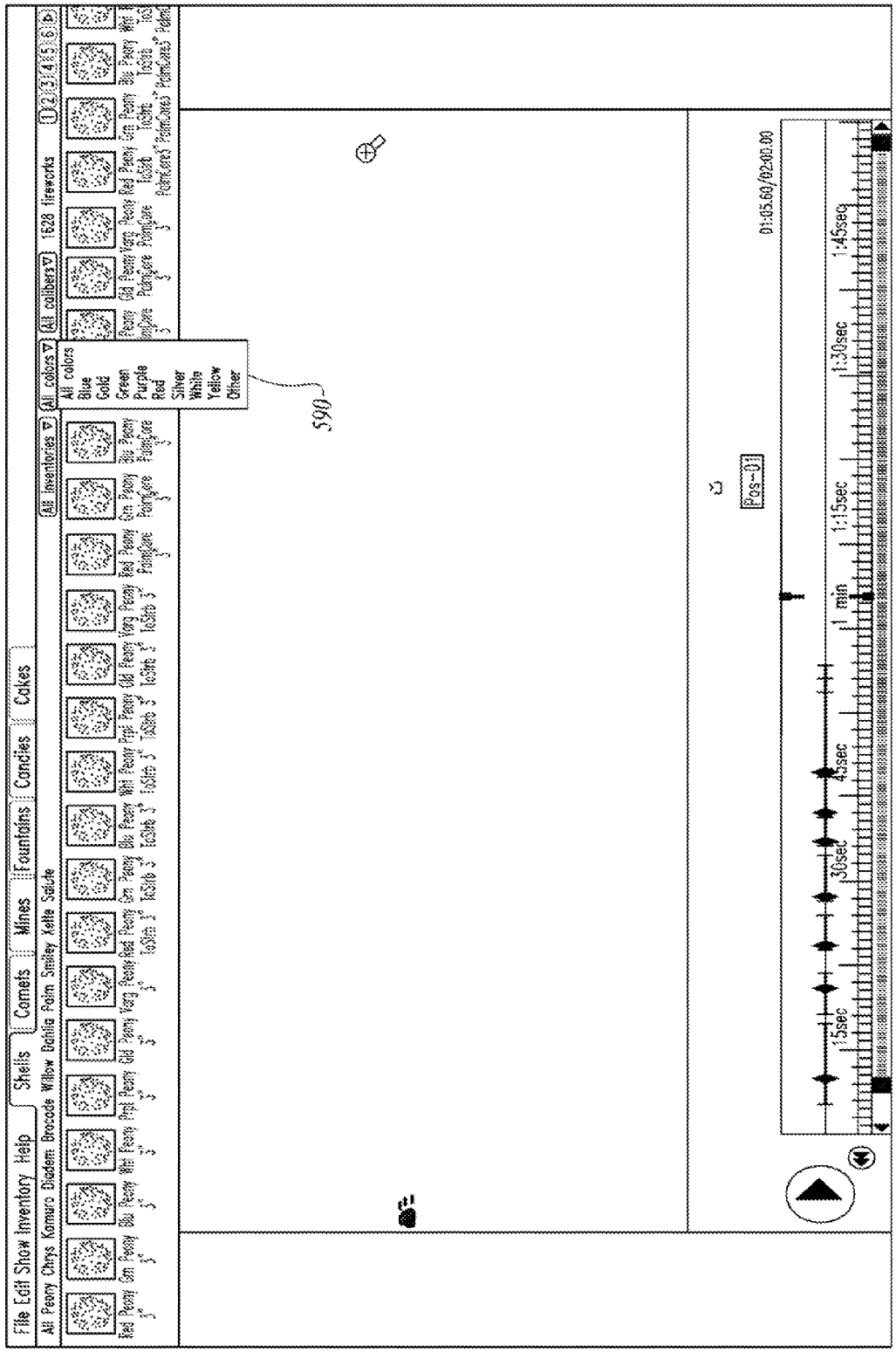
FIG. 44 illustrates an additional set of command options available to a user under a Color drop down item on the user interface screen.

FIG. 44 illustrates an additional set of command options available to a user under an Color drop down item 590 on the user interface screen.

Figure 45:
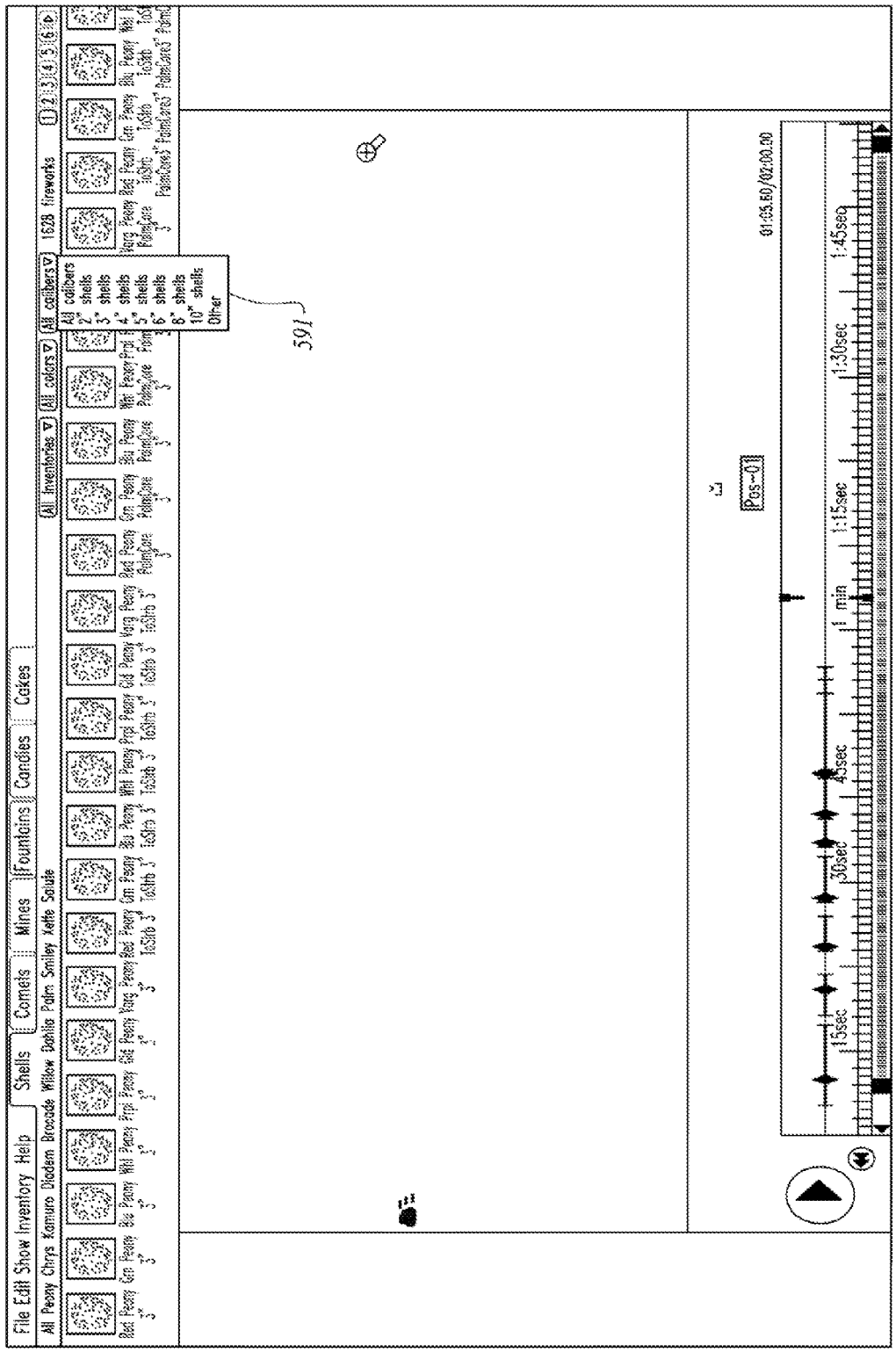
FIG. 45 illustrates an additional set of command options available to a user under a Caliber drop down item on the user interface screen.

FIG. 45 illustrates an additional set of command options available to a user under an Caliber drop down item 591 on the user interface screen.

Importing a Dataset that Defines a Complete Show—

An embodiment includes a feature for importing a dataset (e.g., a spreadsheet) that defines a complete firework show, meaning both the inventory of fireworks used in the show and the precise times, locations, and angles at which those fireworks are launched. The content of this show import can include an imported firework inventory plus an imported firework show. The imported firework inventory can be stored in the database 150. The imported firework show can be stored in the database 153. Alternatively, the data can be stored in a combined form. In one embodiment, the firework inventory data and the firework show data can look very similar. In one embodiment, the main differences between the inventory data and the show data is that the show data typically has approximately one row per event at a given time, whereas the inventory data has one row per type of firework. The rows in the show data thus have a "launch time" or "break time" column, or both. The inventory data does not. The rows in the inventory data optionally have a "number of pieces" or "quantity" field for each type of firework.

Referring to FIG. 46, an example portion of a firework show data set or spreadsheet is shown. The columns in this spreadsheet example indicate the firework break and launch time. The pre-fire time is the length of time between the launch time and the break time. The rail and cue data, in this example, refer to the address of the firing module of the firing system, and the pin number on that module (cue). The position indicates a named launch position in the sample show. The product number refers to the manufacturer's product number. The "Req" field is the number of pieces being shot at that time. The shell description and shell size are self explanatory. An embodiment can construct a new firework simulation based on the shell description, size, and pre-fire time. An embodiment can look up an existing simulation, which might be provided by the manufacturer or might be uploaded by a current user or another user, for the specific product number.

In one embodiment, the fireworks show development system 200 can run over a network. However, other embodiments can run the fireworks show development system 200 as a stand-alone program. FIGS. 1, 3-4, and 47 illustrate a networked implementation of the fireworks show development system 200 of various embodiments. FIG. 48 illustrates a stand-alone program implementation of the fireworks show development system 200 of a particular embodiment. For the networked implementation of the fireworks show development system 200, network connectivity may be required for the on-line or game features of various embodiments that use reviews and feedback. However, the development and operation of a fireworks show on a stand-alone system can also be beneficial where network connectivity may not be available or convenient.

Figure 47:
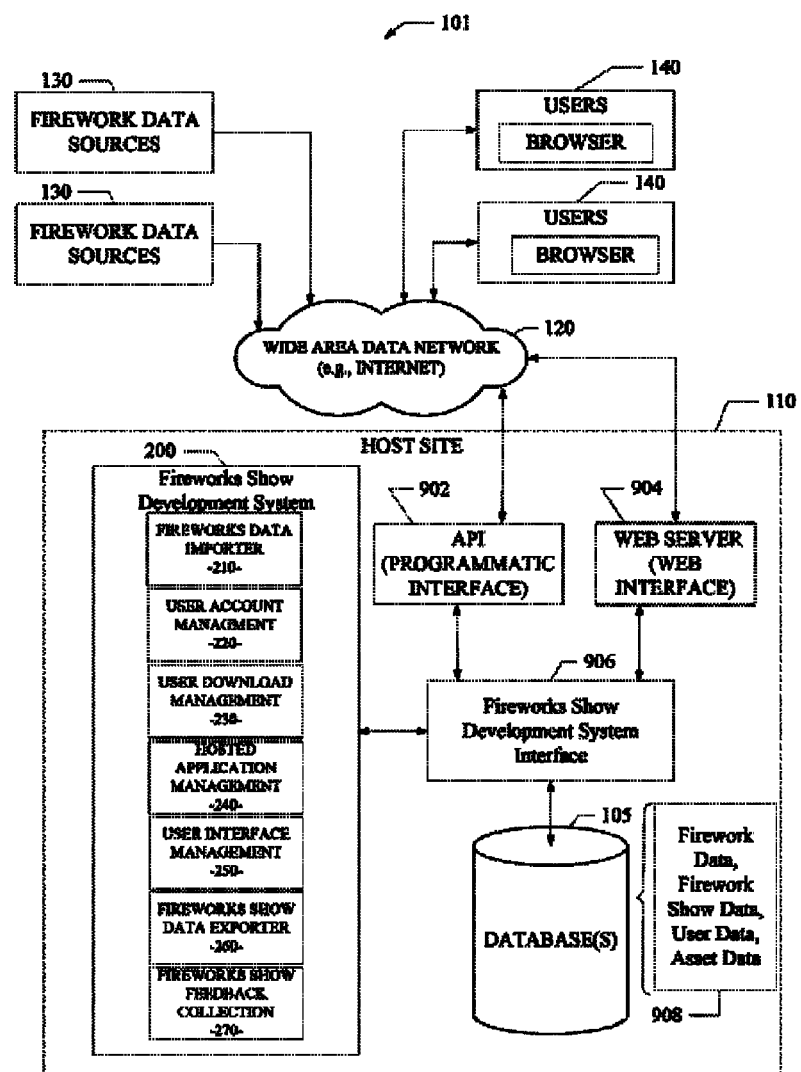
FIG. 47 illustrates another example embodiment of a networked system in which various embodiments may operate.
Figure 48:
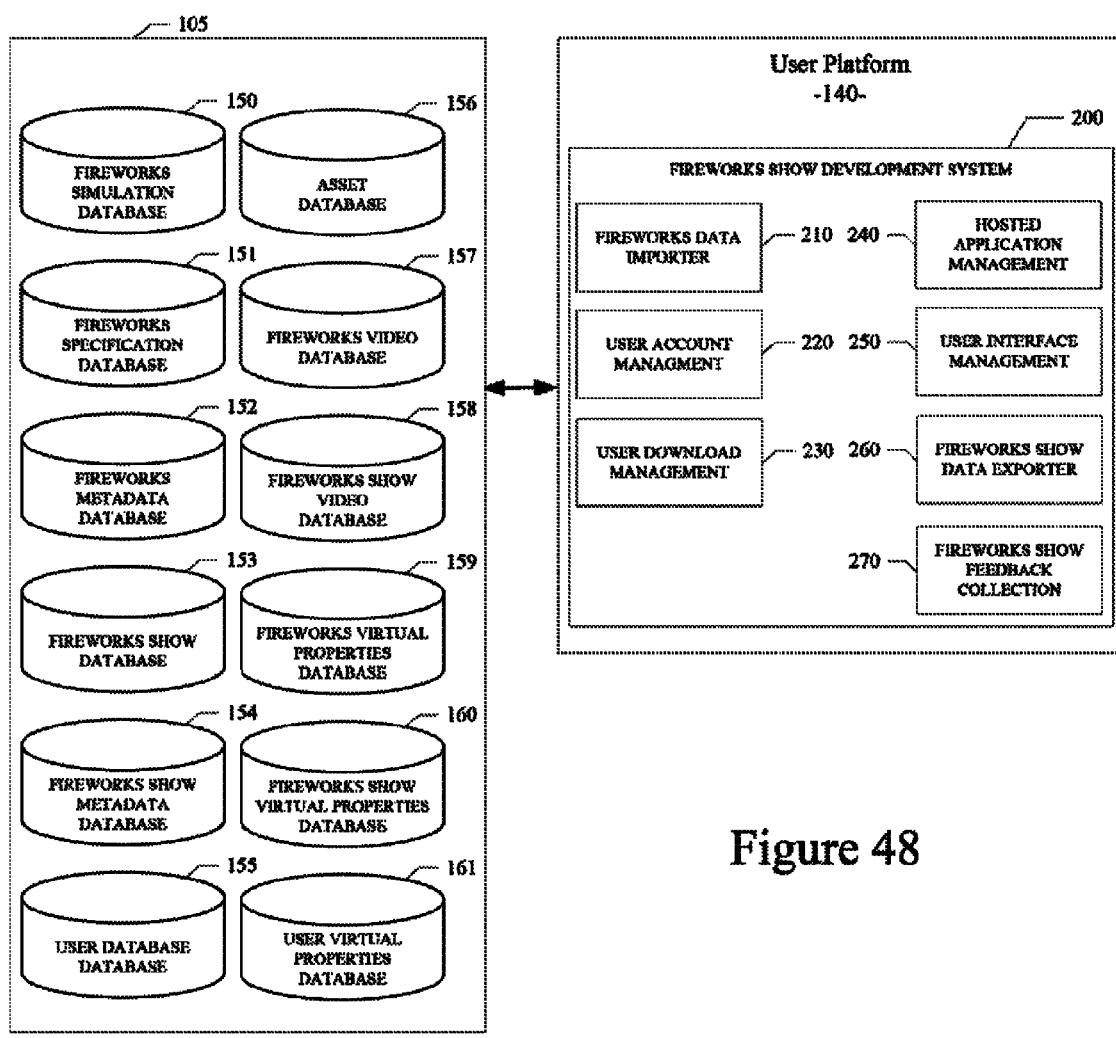
FIG. 48 illustrates an example embodiment of a standalone system in which various embodiments may operate.

Referring now to FIG. 47, another example embodiment 101 of a networked system in which various embodiments may operate is illustrated. In the embodiment illustrated, the host site 110 is shown to include the fireworks show development system 200. The fireworks show development system 200 is shown to include the functional components 210-270, as described above. In a particular embodiment, the host site 110 may also include a web server 904, having a web interface with which users may interact with the host site 110 via a user interface or web interface. The host site 110 may also include an application programming interface (API) 902 with which the host site 110 may interact with other network entities on a programmatic or automated data transfer level. The API 902 and web interface 904 may be configured to interact with the fireworks show development system 200 either directly or via an interface 906. The fireworks show development system 200 may be configured to access a data storage device 105 either directly or via the interface 906.

Referring now to FIG. 48, a stand-alone program implementation of the fireworks show development system 200 of a particular embodiment is illustrated. In this embodiment, the fireworks show development system 200 can be downloaded to or installed on a user platform 140. The functionality of the fireworks show development system 200 as described herein can be executed directly on the client machine of the user platform 140. The database 105 can also be locally accessible to the user platform 140 and the fireworks show development system 200 executing thereon.

Figure 49:
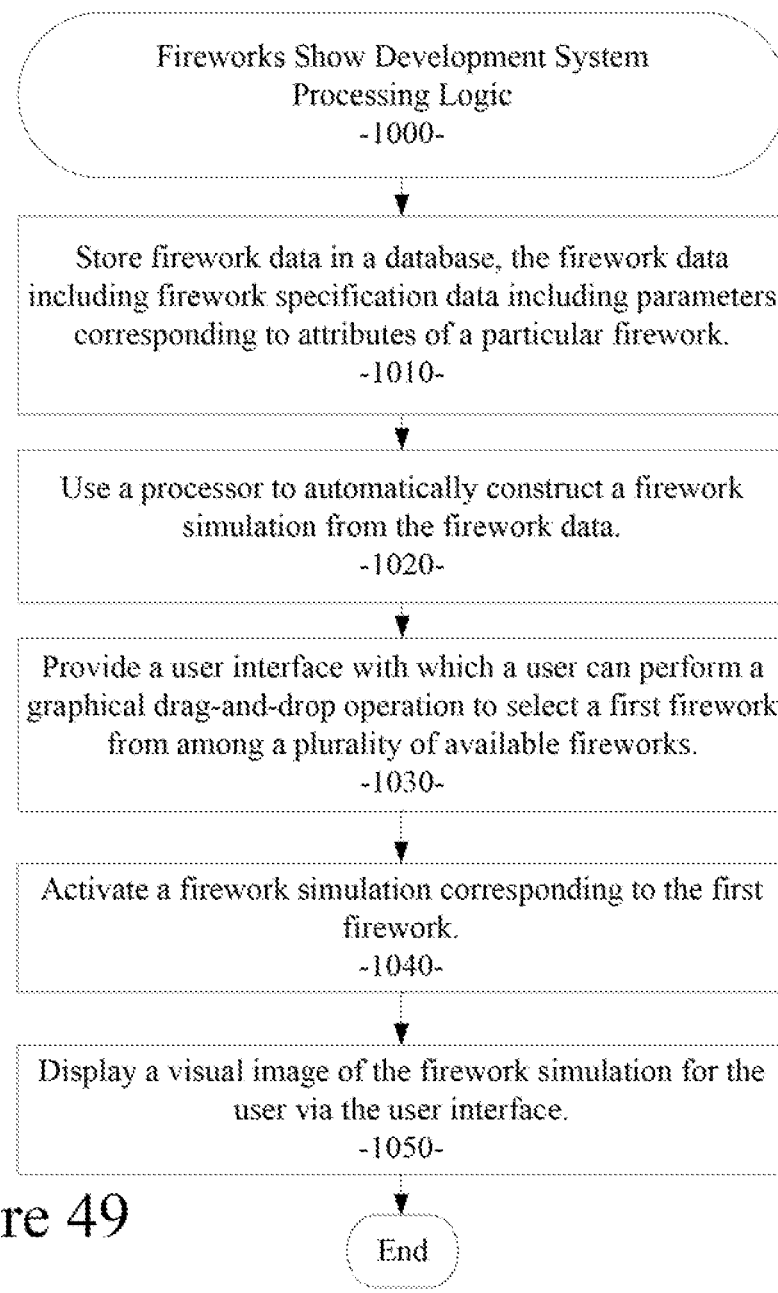
FIG. 49 is a processing flow chart illustrating an example embodiment of a fireworks show development system as described herein.

Referring now to FIG. 49, a processing flow diagram illustrates an example embodiment of a fireworks show development system 200 as described herein. The method of an example embodiment includes: storing firework data in a database, the firework data including firework specification data including parameters corresponding to attributes of a particular firework (processing block 1010); using a processor to automatically construct a firework simulation from the firework data (processing block 1020); providing a user interface with which a user can perform a graphical drag-and-drop operation to select a first firework from among a plurality of available fireworks (processing block 1030); activating a firework simulation corresponding to the first firework (processing block 1040); and displaying a visual image of the firework simulation for the user via the user interface (processing block 1050).

Figure 50:
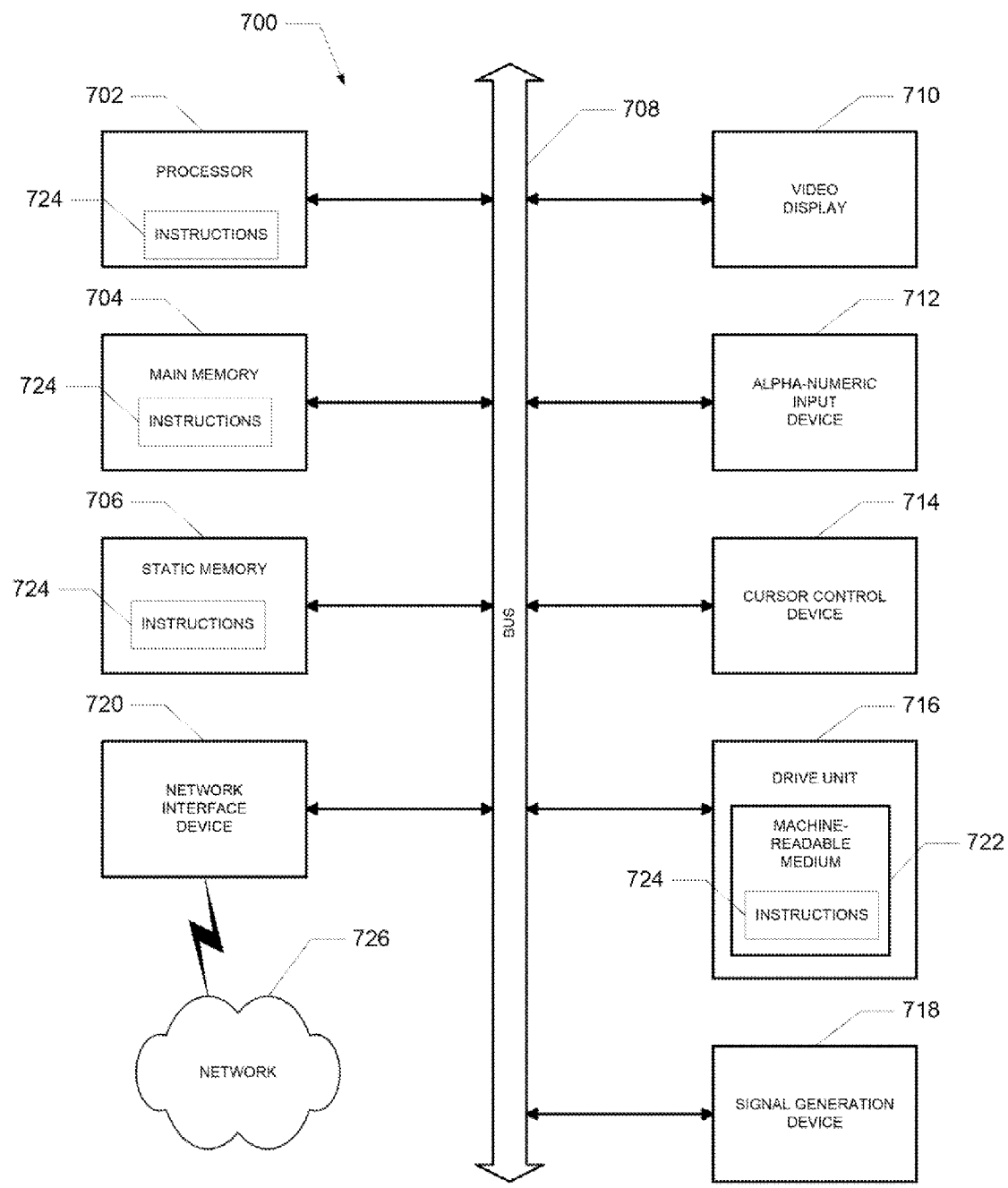
FIG. 50 shows a diagrammatic representation of machine in the example form of a computer system within which a set of instructions when executed may cause the machine to perform any one or more of the methodologies discussed herein.

FIG. 50 shows a diagrammatic representation of a machine in the example form of a computer system 700 within which a set of instructions when executed may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" can also be taken to include any medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method, comprising:
   storing firework data in a database, the firework data including firework specification data including parameters corresponding to attributes of a particular firework;
   using a processor to automatically construct in a user interface a visual firework simulation from the firework data, the visual firework simulation including visual elements that are also part of the user interface, the visual firework simulation depicting a sky field representing a location of a fireworks show and the spatial location of visual elements therein, the visual elements including fireworks, launch positions, and trajectories being simulated by the visual firework simulation;
   using the user interface to directly manipulate the visual elements of the visual firework simulation, including dragging the visual elements in the sky field of the visual firework simulation;
   using the processor to automatically adjust the firework data according to the user's direct manipulation of the visual elements; and
   using the processor to automatically update the visual firework simulation and the visual elements in real time in response to the user's direct manipulation of the visual elements and the adjustment of the firework data.

2. The method as claimed in claim 1 wherein the visual elements include a first firework, which can be dragged to a drop location in the sky field, the drop location being a break location corresponding to the first firework.

3. The method as claimed in claim 1 wherein the visual elements include a first firework, which can be moved in the sky field by performing a drag-and-drop operation on a display object corresponding to a break location of the first firework.

4. The method as claimed in claim 1 wherein the visual elements include a first firework, which can be moved in the sky field by performing a drag-and-drop operation on a display object corresponding to a trajectory of the first firework.

5. The method as claimed in claim 1 including automatically displaying a firework timing bar on a timeline, the firework timing bar extending from a first firework's ignition point to a dissipation point.

6. The method as claimed in claim 5 wherein the firework timing bar includes a blip indicating a first break of the first firework.

7. The method as claimed in claim 6 including shifting the temporal attributes of the first firework by performing a drag-and-drop operation on the blip of the first firework and moving the blip on the timeline.

8. The method as claimed in claim 1 including providing a command option to add a cue marker to a timeline.

9. The method as claimed in claim 8 including aligning a plurality of fireworks attached to the cue marker such that all of the plurality of fireworks are launched at the same time and the earliest break time of the plurality of fireworks is aligned at the cue marker.

10. The method as claimed in claim 1 including providing a timeline expander bar that expands or contracts the magnification level of a timeline.

11. The method as claimed in claim 1 including automatically producing firework ignition pin assignments based on a set of pre-determined constraints.

12. The method as claimed in claim 1 including providing a command option to integrate a voice cue track while editing.

13. A system, comprising:
   a processor;
   a database, in data communication with the processor, for storage of firework data, the firework data including firework specification data including parameters corresponding to attributes of a particular firework; and
   a fireworks show development module, executable by the processor, to:
      automatically construct in a user interface a visual firework simulation from the firework data, the visual firework simulation including visual elements that are also part of the user interface, the visual firework simulation depicting a sky field representing a location of a fireworks show and the spatial location of visual elements therein, the visual elements including fireworks, launch positions, and trajectories being simulated by the visual firework simulation;
      use the user interface to directly manipulate the visual elements of the visual firework simulation, including dragging the visual elements in the sky field of the visual firework simulation;
      use the processor to automatically adjust the firework data according to the user's direct manipulation of the visual elements; and
      use the processor to automatically update the visual firework simulation and the visual elements in real time in response to the user's direct manipulation of the visual elements and the adjustment of the firework data.

14. The system as claimed in claim 13 wherein the visual elements include a first firework, which can be dragged to a drop location in the sky field, the drop location being a break location corresponding to the first firework.

15. The system as claimed in claim 13 wherein the visual elements include a first firework, which can be moved in the sky field by performing a drag-and-drop operation on a display object corresponding to a break location of the first firework.

16. The system as claimed in claim 13 wherein the visual elements include a first firework, which can be moved in the sky field by performing a drag-and-drop operation on a display object corresponding to a trajectory of the first firework.

17. The system as claimed in claim 13 being further configured to automatically display a firework timing bar on a timeline, the firework timing bar extending from a first firework's ignition point to a dissipation point.

18. The system as claimed in claim 17 wherein the firework timing bar includes a blip indicating a first break of the first firework.

19. The system as claimed in claim 18 being further configured to shift the temporal attributes of the first firework by enabling a drag-and-drop operation on the blip of the first firework and moving the blip on the timeline.

20. The system as claimed in claim 13 being further configured to provide a command option to add a cue marker to a timeline.

21. The system as claimed in claim 20 being further configured to align a plurality of fireworks attached to the cue marker such that all of the plurality of fireworks are launched at the same time and the earliest break time of the plurality of fireworks is aligned at the cue marker.

22. The system as claimed in claim 13 being further configured to provide a timeline expander bar that expands or contracts the magnification level of a timeline.

23. The system as claimed in claim 13 being further configured to automatically produce firework ignition pin assignments based on a set of pre-determined constraints.

24. The system as claimed in claim 13 being further configured to provide a command option to integrate a voice cue track while editing.

25. A non-transitory machine-useable storage medium embodying instructions which, when executed by a machine, cause the machine to:
   store firework data in a database, the firework data including firework specification data including parameters corresponding to attributes of a particular firework;
   automatically construct in a user interface a visual firework simulation from the firework data, the visual firework simulation including visual elements that are also part of the user interface, the visual firework simulation depicting a sky field representing a location of a fireworks show and the spatial location of visual elements therein, the visual elements including fireworks, launch positions, and trajectories being simulated by the visual firework simulation;
   use the user interface to directly manipulate the visual elements of the visual firework simulation, including dragging the visual elements in the sky field of the visual firework simulation;
   use the processor to automatically adjust the firework data according to the user's direct manipulation of the visual elements; and
   use the processor to automatically update the visual firework simulation and the visual elements in real time in response to the user's direct manipulation of the visual elements and the adjustment of the firework data.

26. The non-transitory machine-useable storage medium as claimed in claim 25 wherein the visual elements include a first firework, which can be dragged to a drop location in the sky field, the drop location being a break location corresponding to the first firework.

\* \* \* \* \*